US009474291B2

(12) United States Patent
Young

(10) Patent No.: US 9,474,291 B2
(45) Date of Patent: *Oct. 25, 2016

(54) PROCESS FOR PRODUCING COMPACTED GROUND ROAST COFFEE TABLET

(75) Inventor: Jerry Douglas Young, Medina, OH (US)

(73) Assignee: THE FOLGER COFFEE COMPANY, Orrville, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 13/478,150

(22) Filed: May 23, 2012

(65) Prior Publication Data

US 2012/0231137 A1 Sep. 13, 2012

Related U.S. Application Data

(62) Division of application No. 12/753,332, filed on Apr. 2, 2010.

(60) Provisional application No. 61/168,027, filed on Apr. 9, 2009, provisional application No. 61/318,028, filed on Mar. 26, 2010.

(51) Int. Cl.
*A23F 5/12* (2006.01)
*A23F 5/38* (2006.01)

(52) U.S. Cl.
CPC ............ *A23F 5/125* (2013.01); *A23F 5/385* (2013.01); *A23F 2200/00* (2013.01)

(58) Field of Classification Search
USPC .......................... 426/454, 466, 242; 424/408
See application file for complete search history.

(56) References Cited

U.S. PATENT DOCUMENTS

| 1,210,542 | A | 1/1917 | Savageau |
| 1,243,501 | A | 10/1917 | Fraser |
| 1,525,233 | A | 4/1925 | McColl et al. |
| 1,762,690 | A | 6/1930 | Kopf |
| 1,951,357 | A | 3/1934 | Hall |
| 2,053,106 | A | 9/1936 | Piacentini |
| 2,235,315 | A | 3/1941 | Donnelly |
| 2,345,320 | A | 3/1944 | Brenzinger |

(Continued)

FOREIGN PATENT DOCUMENTS

| CA | 808588 | * | 3/1969 |
| CA | 1042707 | | 11/1978 |

(Continued)

OTHER PUBLICATIONS

Office Action from Chinese Patent Application No. 201080026382.5, dated Sep. 17, 2012.

(Continued)

*Primary Examiner* — Tamra L Dicus
(74) *Attorney, Agent, or Firm* — Michael A. Olshavsky; Keith J. Marcinowski; Christopher L. Smith

(57) ABSTRACT

A ground roast coffee tablet which is capable of being brewed in a conventional automatic drip coffee maker, and which exhibits sufficient strength to withstand all aspects of manufacture, handling, packaging, transport without breakage but also readily disintegrates when contacted with hot water during brewing, is made by subjecting conventional ground, roasted coffee to a multi-step compaction process in which at least two compression steps are carried out in the same compaction die.

12 Claims, 5 Drawing Sheets

(56) References Cited

U.S. PATENT DOCUMENTS

| | | | |
|---|---|---|---|
| 2,371,093 A | 3/1945 | Willison | |
| 2,724,145 A | 11/1955 | Hall | |
| 2,725,160 A | 11/1955 | Ahlstrom | |
| 2,931,727 A | 4/1960 | Kraut | |
| 2,931,728 A | 4/1960 | Franck | |
| 3,121,635 A | 2/1964 | Eldred | |
| 3,186,137 A | 6/1965 | Eitzen | |
| 3,186,139 A | 6/1965 | Clauss | |
| 3,186,141 A | 6/1965 | Zimmerman | |
| 3,192,684 A | 7/1965 | Iannucci | |
| 3,293,042 A | 12/1966 | Eitzen | |
| 3,459,558 A | 8/1969 | Farmer et al. | |
| 3,511,666 A | 5/1970 | Willie et al. | |
| 3,579,350 A | 5/1971 | Rudd et al. | |
| 3,607,299 A | 9/1971 | Bolt | |
| 3,653,914 A | 4/1972 | Schmitt | |
| 3,660,107 A | 5/1972 | Mayer | |
| 3,667,962 A | 6/1972 | Fitzberg et al. | |
| 3,691,718 A | 9/1972 | Woodruff et al. | |
| D225,627 S | 12/1972 | Gomel et al. | |
| 3,736,722 A | 6/1973 | Rosenberg | |
| 3,762,930 A | 10/1973 | Mahlmann | |
| 3,770,457 A | 11/1973 | Makwinski et al. | |
| 3,772,038 A | 11/1973 | Ayres et al. | |
| 3,800,690 A | 4/1974 | Molenaar et al. | |
| 3,869,555 A | 3/1975 | Heonis | |
| 3,888,999 A | 6/1975 | Jones et al. | |
| 3,889,000 A | 6/1975 | Cante et al. | |
| 3,892,867 A | 7/1975 | Schoonman | |
| 3,901,977 A | 8/1975 | Rebane | |
| 3,937,134 A | 2/1976 | Molenaar et al. | |
| 3,978,246 A | 8/1976 | Chozianin et al. | |
| 4,047,866 A | 9/1977 | Shah | |
| 4,121,289 A * | 10/1978 | Stiel | 702/84 |
| 4,139,589 A * | 2/1979 | Beringer et al. | 264/250 |
| 4,254,694 A | 3/1981 | Illy | |
| 4,275,083 A | 6/1981 | Colten et al. | |
| 4,298,563 A | 11/1981 | DeSantis et al. | |
| 4,364,967 A | 12/1982 | Black | |
| 4,384,005 A | 5/1983 | McSweeney | |
| 4,394,395 A | 7/1983 | Rostagno et al. | |
| 4,501,761 A | 2/1985 | Mahlmann et al. | |
| 4,555,894 A | 12/1985 | Illy | |
| 4,594,256 A | 6/1986 | Zemelman et al. | |
| 4,602,558 A | 7/1986 | Kaper et al. | |
| 4,605,561 A | 8/1986 | Lang | |
| 4,664,927 A | 5/1987 | Finkel | |
| 4,673,578 A | 6/1987 | Becker et al. | |
| 4,747,250 A | 5/1988 | Rossi | |
| 4,762,725 A | 8/1988 | Player et al. | |
| 4,767,632 A | 8/1988 | Meier | |
| 4,852,333 A | 8/1989 | Illy | |
| 4,861,611 A | 8/1989 | Baba et al. | |
| 4,975,295 A | 12/1990 | Sierra | |
| 4,980,192 A | 12/1990 | Finkel | |
| 5,102,680 A | 4/1992 | Glass et al. | |
| 5,106,644 A | 4/1992 | El-Nokaly | |
| 5,188,858 A | 2/1993 | Stipp et al. | |
| 5,227,188 A | 7/1993 | Leppla et al. | |
| 5,240,734 A | 8/1993 | Izzo et al. | |
| D340,120 S | 10/1993 | Rosenstein | |
| 5,316,781 A | 5/1994 | Lussi et al. | |
| 5,348,758 A | 9/1994 | Fuisz et al. | |
| D351,931 S | 11/1994 | Russo | |
| 5,441,753 A | 8/1995 | McGinley et al. | |
| 5,445,843 A | 8/1995 | Beckett | |
| 5,455,059 A | 10/1995 | McFeaters | |
| 5,505,982 A | 4/1996 | Krawczyk et al. | |
| 5,532,022 A | 7/1996 | Miller et al. | |
| D372,738 S | 8/1996 | Akerlind | |
| 5,560,955 A | 10/1996 | Izzo et al. | |
| 5,585,135 A | 12/1996 | Patterson et al. | |
| 5,591,477 A | 1/1997 | Boyce et al. | |
| 5,649,412 A | 7/1997 | Binacchi | |
| 5,698,238 A | 12/1997 | Fabbri | |
| D389,635 S | 1/1998 | Henderson | |
| 5,721,005 A | 2/1998 | Gutwein et al. | |
| 5,725,898 A | 3/1998 | Murphy et al. | |
| 5,731,020 A | 3/1998 | Russo | |
| 5,741,538 A | 4/1998 | Stipp et al. | |
| 5,770,254 A | 6/1998 | Izzo et al. | |
| 5,776,527 A | 7/1998 | Blanc | |
| D396,537 S | 8/1998 | Stanton | |
| 5,824,358 A | 10/1998 | Bye et al. | |
| 5,853,788 A | 12/1998 | Murphy et al. | |
| 5,885,646 A | 3/1999 | Wong et al. | |
| 5,910,454 A | 6/1999 | Sprules | |
| 5,928,590 A | 7/1999 | Fabbri | |
| 5,939,121 A | 8/1999 | Gutwein et al. | |
| 5,942,275 A | 8/1999 | Wong et al. | |
| 5,948,455 A | 9/1999 | Schaeffer et al. | |
| 5,958,471 A | 9/1999 | Schwarz et al. | |
| 5,976,600 A | 11/1999 | Ruszkay et al. | |
| 6,025,000 A | 2/2000 | Fond et al. | |
| 6,068,871 A | 5/2000 | Fond et al. | |
| 6,090,431 A | 7/2000 | Franklin et al. | |
| D429,056 S | 8/2000 | Aftoora | |
| 6,095,032 A | 8/2000 | Barnett et al. | |
| 6,153,247 A | 11/2000 | Stoddard | |
| 6,251,448 B1 | 6/2001 | DeStephen et al. | |
| 6,277,407 B1 | 8/2001 | Marius | |
| 6,277,428 B1 | 8/2001 | Franklin et al. | |
| D447,835 S | 9/2001 | Whitaker et al. | |
| 6,287,596 B1 | 9/2001 | Murakami et al. | |
| D449,728 S | 10/2001 | Illy | |
| 6,322,813 B1 * | 11/2001 | Green et al. | 424/465 |
| 6,447,833 B1 | 9/2002 | Widlak | |
| 6,482,338 B1 * | 11/2002 | Levin et al. | 264/40.1 |
| 6,488,979 B1 | 12/2002 | Davila et al. | |
| 6,497,911 B1 | 12/2002 | Hansen et al. | |
| 6,586,035 B2 | 7/2003 | Rosse | |
| 6,623,783 B1 | 9/2003 | Wong et al. | |
| 6,686,329 B1 | 2/2004 | Salager | |
| 6,692,789 B2 | 2/2004 | Ethington et al. | |
| 6,699,518 B2 | 3/2004 | Zeller et al. | |
| 6,739,240 B2 | 5/2004 | De Koning et al. | |
| 6,749,882 B2 | 6/2004 | Fortune, Jr. | |
| 6,759,069 B2 | 7/2004 | Gray | |
| 6,773,744 B1 | 8/2004 | Ward et al. | |
| 6,805,883 B2 | 10/2004 | Chevaux et al. | |
| 6,838,110 B2 | 1/2005 | Wragg et al. | |
| 6,841,186 B2 | 1/2005 | Davila et al. | |
| 6,953,592 B2 | 10/2005 | Darbyshire et al. | |
| 6,982,101 B2 | 1/2006 | Liu et al. | |
| 7,329,429 B2 | 2/2008 | Chimel et al. | |
| 7,498,050 B2 | 3/2009 | Kincaid et al. | |
| 2002/0009533 A1 | 1/2002 | Fortune, Jr. | |
| 2002/0016317 A1 | 2/2002 | Schul et al. | |
| 2002/0155209 A1 | 10/2002 | Hardesty et al. | |
| 2003/0026873 A1 | 2/2003 | Collins et al. | |
| 2003/0077359 A1 | 4/2003 | Fond et al. | |
| 2003/0082291 A1 | 5/2003 | Davila et al. | |
| 2003/0170355 A1 | 9/2003 | Glazier et al. | |
| 2003/0175400 A1 | 9/2003 | Schlosser et al. | |
| 2003/0198712 A1 | 10/2003 | Klug et al. | |
| 2004/0013776 A1 | 1/2004 | Whitehouse et al. | |
| 2004/0081744 A1 | 4/2004 | Liu et al. | |
| 2004/0121048 A1 | 6/2004 | Kretchman | |
| 2004/0166142 A1 | 8/2004 | Chevaux et al. | |
| 2004/0265472 A1 | 12/2004 | Corfman et al. | |
| 2005/0069625 A1 | 3/2005 | Chimel et al. | |
| 2005/0113279 A1 | 5/2005 | Desmarescaux et al. | |
| 2005/0129833 A1 | 6/2005 | Kincaid et al. | |
| 2005/0175740 A1 | 8/2005 | McWatters et al. | |
| 2005/0181019 A1 | 8/2005 | Palmer et al. | |
| 2005/0214414 A1 | 9/2005 | Miranda et al. | |
| 2005/0214433 A1 | 9/2005 | Hardesty et al. | |
| 2005/0266123 A1 | 12/2005 | Collins et al. | |
| 2006/0024420 A1 | 2/2006 | Kessler | |
| 2006/0035000 A1 | 2/2006 | Bunke et al. | |
| 2006/0040035 A1 | 2/2006 | Thompson | |
| 2006/0045938 A1 | 3/2006 | Slesinski et al. | |
| 2006/0093727 A1 | 5/2006 | Whited et al. | |
| 2006/0121175 A1 | 6/2006 | Hanselmann | |

(56) References Cited

U.S. PATENT DOCUMENTS

| | | |
|---|---|---|
| 2006/0159827 A1 | 7/2006 | Ha |
| 2006/0165845 A1* | 7/2006 | Kaku et al. .................. 426/45 |
| 2006/0207619 A1 | 9/2006 | Conti |
| 2007/0003643 A1 | 1/2007 | Sakai |
| 2007/0141204 A1 | 6/2007 | Xiong et al. |
| 2007/0209524 A1 | 9/2007 | Kim |
| 2007/0212476 A1 | 9/2007 | Destephen et al. |
| 2008/0039317 A1 | 2/2008 | Branlard et al. |
| 2008/0075830 A1 | 3/2008 | Wen et al. |
| 2008/0081092 A1 | 4/2008 | Garter et al. |
| 2008/0152779 A1 | 6/2008 | De Groote et al. |
| 2008/0283144 A1* | 11/2008 | Rapparini .................. 141/73 |
| 2008/0286409 A1 | 11/2008 | Topsoe et al. |
| 2008/0299262 A1* | 12/2008 | Reati ........................ 426/84 |
| 2008/0317891 A1 | 12/2008 | Anderson et al. |
| 2009/0175985 A1 | 7/2009 | Canham |
| 2009/0246326 A1 | 10/2009 | Cary et al. |
| 2009/0252838 A1 | 10/2009 | Campbell |
| 2009/0324791 A1 | 12/2009 | Ohresser et al. |
| 2010/0098789 A1 | 4/2010 | Balambika et al. |
| 2010/0119685 A1 | 5/2010 | Van Bergen |
| 2010/0297320 A1* | 11/2010 | Branlard et al. .............. 426/512 |

FOREIGN PATENT DOCUMENTS

| | | | |
|---|---|---|---|
| CA | 2678485 | * | 9/2008 |
| CH | 572313 A5 | | 6/1976 |
| DE | 2227875 A1 | | 1/1974 |
| DE | 60308935 | | 9/2007 |
| EP | 0159754 | | 10/1985 |
| EP | 0229920 A1 | * | 11/1986 |
| EP | 0229920 | * | 7/1987 |
| EP | 0229920 | | 7/1991 |
| EP | 0671125 | | 9/1995 |
| EP | 0780310 | | 6/1997 |
| EP | 0813816 | | 11/1999 |
| EP | 1352949 | | 10/2003 |
| EP | 1227978 | | 4/2004 |
| EP | 1600285 | | 11/2005 |
| EP | 1352949 | | 10/2006 |
| EP | 1682411 | | 10/2007 |
| EP | 1980155 | | 10/2008 |
| EP | 2119368 | | 11/2009 |
| FR | 2838131 | | 10/2003 |
| FR | 2870777 | | 12/2005 |
| FR | 2873113 | | 1/2006 |
| FR | 2883186 | | 9/2006 |
| FR | 2903996 | | 1/2008 |
| FR | 2906801 | | 4/2008 |
| FR | 2912876 | | 8/2008 |
| FR | 2912877 | | 8/2008 |
| GB | 23379 | | 0/1902 |
| GB | 588354 | | 5/1947 |
| GB | 1189011 | | 4/1970 |
| GB | 1276437 | | 6/1972 |
| GB | 1293989 | | 10/1972 |
| GB | 1401013 | | 7/1975 |
| JP | 60-78545 | | 5/1985 |
| JP | 2001-128619 | | 5/2001 |
| JP | 2001-231452 | | 8/2001 |
| JP | 2004-136522 | | 5/2004 |
| JP | 2005-46005 | | 2/2005 |
| JP | 200801879959 | | 8/2008 |
| WO | 8600787 A1 | | 2/1986 |
| WO | 9221252 A1 | | 12/1992 |
| WO | 9406309 A1 | | 3/1994 |
| WO | 97/06694 | | 2/1997 |
| WO | 9706694 A1 | | 2/1997 |
| WO | 9921439 A1 | | 5/1999 |
| WO | 9921440 A1 | | 5/1999 |
| WO | 9934694 A1 | | 7/1999 |
| WO | 9945797 | | 9/1999 |
| WO | 01/34475 | | 5/2001 |
| WO | 01/64829 | | 9/2001 |
| WO | 0197632 | | 12/2001 |
| WO | 2004/034798 | | 4/2004 |
| WO | 2004093558 A2 | | 11/2004 |
| WO | 2005002353 A1 | | 1/2005 |
| WO | 2005006890 A2 | | 1/2005 |
| WO | 2005/047111 | | 5/2005 |
| WO | 2006000030 A1 | | 1/2006 |
| WO | 2006/016073 | | 2/2006 |
| WO | 2006018077 A1 | | 2/2006 |
| WO | 2006/097612 | | 9/2006 |
| WO | 2007113843 A1 | | 10/2007 |
| WO | 2008/009604 | | 1/2008 |
| WO | 2008/040884 | | 4/2008 |
| WO | 2008042836 A2 | | 4/2008 |
| WO | 2008079927 A1 | | 7/2008 |
| WO | 2008/107342 | | 9/2008 |
| WO | 2008106787 A1 | | 9/2008 |
| WO | 2008/123775 | | 10/2008 |
| WO | 2008123775 A1 | | 10/2008 |
| WO | WO 2008123775 A1 * | | 10/2008 |
| WO | 2008157039 A1 | | 12/2008 |
| WO | 2009/047322 | | 4/2009 |
| WO | 2010047748 A1 | | 4/2010 |

OTHER PUBLICATIONS

Office Action from U.S. Appl. No. 13/072,981 dated May 17, 2012.
International Search Report from International Application No. PCT/US10/29746, dated May 12, 2010.
Written Opinion from International Application No. PCT/US10/29746, dated May 12, 2010.
Office Action from U.S. Appl. No. 13/072,981, mailed Mar. 18, 2013.
Response to Office Action from U.S. Appl. No. 13/072,981, filed Sep. 18, 2013.
Office Action from CN Patent Appln. No. 201080026382.5, issued Sep. 17, 2012.
Response to Chinese Office Action from CN Patent Appln. No. 201080026382.5, filed Apr. 1. 2013.
Office Action from U.S. Appl. No. 13/478,146, mailed Mar. 15, 2013.
Response to Office Action from U.S. Appl. No. 13/478,146, filed Aug. 15, 2013.
Office Action from U.S. Appl. No. 12/753,332, mailed Mar. 15, 2013.
Response to Office Action from U.S. Appl. No. 12/753.332, filed Sep. 16, 2013.
Office Action from U.S. Appl. No. 12/753,332, mailed Oct. 24, 2013.
Office Action from U.S. Appl. No. 13/072,981, mailed Oct. 25, 2013.
Office Action from U.S. Appl. No. 13/478,146, mailed Nov. 21, 2013.
Response to Office Action from U.S. Appl. No. 13/478,146, filed May 16, 2014.
Extended European Search Report EP Application No. 10762241.7, dated Nov. 11, 2013.
Office Action dated Feb. 8, 2016, in corresponding European Patent Application No. 10762241.7-1358.
Office Action from EP Patent Application No. 10 762 241.7-1358, mailed May 13, 2015.
Response to Office Action from EP Patent Application No. 10 762 241.7-1358, filed May 21, 2015.
Office Action from Mexican Patent Appln. No. MX/a/2011/010622, issued Oct. 20, 2014.
Response to Mexican Office Action from MX Patent Appln. No. MX/a/2011/010622, filed Mar. 4, 2015.
Office Action from U.S. Appl. No. 13/478,146, mailed Dec. 24, 2014.
Office Action from Chinese Patent Appln. No. 201310292207.6, issued Apr. 30, 2015.
Office Action dated Jun. 23, 2014 in corresponding Chinese Patent Application No. 201310292207.6.
Response filed Dec. 23, 2014 to Office Action dated Jun. 23, 2014 in corresponding Chinese Patent Application No. 201310292207.6.

(56) References Cited

OTHER PUBLICATIONS

Response filed Jun. 19, 2015 to Office Action dated Apr. 30, 2015 in corresponding Chinese Patent Application No. 201310292207.6.
Office Action dated Oct. 19, 2015 in corresponding Chinese Patent Application No. 201310292207.6.
Response filed Mar. 2, 2016 to Office Action dated Oct. 19, 2015 in corresponding Chinese Patent Application No. 201310292207.6.
Office Action dated Dec. 14, 2015 in corresponding European Patent Application No. 10762241.7.
Response filed Dec. 22, 2015 to Office Action dated Dec. 12, 2015 in corresponding European Patent Application No. 10762241.7.
Response filed Apr. 14, 2016 to Office Action dated Feb. 8, 2016 in corresponding European Patent Application No. 10762241.7.
Response filed Nov. 16, 2012 to Office Action dated May 17, 2012 in corresponding U.S. Appl. No. 13/072,981.
Response filed Mar. 18, 2016 to Office Action dated Oct. 25, 2013 in corresponding U.S. Appl. No. 13/072,981.
Office Action dated Jul. 6, 2015 in corresponding U.S Appl. No. 14/261,035.
Response filed Jan. 6, 2016 to Office Action dated Jul. 6, 2015 in corresponding U.S. Appl. No. 14/261,035.
Final Office Action dated Apr. 27, 2016 in corresponding U.S. Appl. No. 14/261,035.
Office Action dated Jul. 14, 2015 in corresponding U.S. Appl. No. 14/262,059.
Response filed Jan. 14, 2016 to Office Action dated Jul. 14, 2015 in corresponding U.S. Appl. No. 14/262,059.
Final Office Action dated Feb. 2, 2016 in corresponding U.S Appl. No. 14/262,059.
Response filed Mar. 24, 2016 to Final Office Action dated Feb. 2, 2016 in corresponding U.S. Appl. No. 14/262,059.
Office Action dated Apr. 14, 2016 in corresponding U.S. Appl. No. 14/262,059.
Response filed Nov. 16, 2012 to Office Action dated May 17, 2012 in corresponding U.S. Appl. No. 12/753,332.
Response filed Jun. 24, 2015 to Office Action dated Dec. 24, 2014 in corresponding U.S. Appl. No. 13/478,146.
Final Office Action dated Mar. 17, 2016 in corresponding U.S Appl. No. 13/478,146.
Office Action dated May 3, 2016 in corresponding Canadian Patent Application No. 2758250.
Office Action dated Jul. 1, 2016 in corresponding Chinese Patent Application No. 2013102922076.
Search Report dated Jul. 4, 2016 in corresponding European Patent Application No. 16181341.
Supplemental Office Action dated May 17, 2016 in corresponding U.S. Appl. No. 14/262,059.
Rajesh V. Potineni et al: "Influence of Flavor Solvent on Flavor Release and Perception in Sugar-Free Chewing Gum", Journal of Agricultural and Food Chemistry, vol. 56, No. 9, May 1, 2008, pp. 3254-3259, XP55091252; (cited in EP EP16168134.1 Search Report dated Jul. 4, 2016; Online Abstract of article: http://pubs.acs.org/doi/abs/10.1021/jf072783e).
Office Action dated May 17, 2012 in corresponding U.S Appl. No. 13/072,981.

\* cited by examiner

PROCESS FOR PRODUCING COMPACTED GROUND ROAST COFFEE TABLET

CROSS-REFERENCE TO RELATED APPLICATIONS

This application is a divisional of, and claims priority to, U.S. Non-Provisional patent application Ser. No. 12/753,332, entitled GROUND ROAST COFFEE TABLET and filed Apr. 2, 2010, which claims priority to, and any other benefit of, U.S. Provisional Patent Application Ser. No. 61/168,027, entitled GROUND ROAST COFFEE TABLET and filed Apr. 9, 2009, and U.S. Provisional Patent Application Ser. No. 61/318,028, entitled GROUND ROAST COFFEE TABLET and filed Mar. 26, 2010, the entire disclosures of both of which are fully incorporated herein by reference.

BACKGROUND

Automatic Drip Coffee makers ("ADCs") are designed for processing "ground roast coffee" or "coffee," i.e., granulated coffee obtained by grinding previously roasted coffee beans. Because of differences in flavor strength among different coffees, as well as variations in personal taste, consumers may find it difficult to determine the correct dose (amount) of coffee to use for brewing pots of different sizes.

To deal with this problem, a number of products have been introduced in which the coffee is provided in standardized doses. For example, filter packs in which a predetermined amount of coffee, e.g., enough coffee to brew 4, 10 or 12 servings of brewed coffee, is provided in a filter paper container. However, this approach cannot be used for brewing one, or only a few, servings of coffee, as the consumer is required to make the amount of servings for which the filter pack is designed. In addition, it is difficult to change the strength of the brewed coffee.

In an alternate approach, single serving "pods" have been provided in which enough ground roast coffee for brewing only a single serving is housed in a filter paper container. However, single serving pods must have a specific configuration to fit brewer(s) for which they are designed. Machines used to brew coffee with these pods are fundamentally different from automatic drip coffee makers. They are also limited to making a single cup at a time, which limits their usefulness in making larger amounts of brewed coffee.

A further approach combines the idea of a single cup brew is found in products such as Folgers® coffee singles. These can be made with mixtures of instant and ground roast coffee. While they do not have to fit a particular brewer, they still are designed for only a single cup of coffee.

In still another approach, separate "tablets" are provided which are made solely out of instant coffee (also referred to as soluble coffee). However, instant coffee is not preferred by some consumers.

SUMMARY

In accordance with this invention, coffee tablets for use in a conventional automatic drip coffee maker are provided.

A first exemplary coffee tablet is made by a multi-step compaction process in which at least a first compression and a separate second compression are carried out in the same compaction die in such a manner that the coffee tablet obtained exhibits a hardness of at least about 30 N (Newtons), a friability of no greater than about 10%, and readily disintegrates when contacted with hot water during brewing in an automatic drip coffee maker (ADC).

A second exemplary coffee tablet is made by a multi-step compaction process in which a pre-compression step is carried out at a lower compaction force but in the same compaction die as the main compression step so that the coffee tablet obtained exhibits a hardness of at least about 30 N (Newtons), a friability of no greater than about 10%, and readily disintegrates when contacted with hot water during brewing in an ADC.

A third exemplary coffee tablet comprises at least about 91% ground roast coffee, has a density of at least 0.95 g/cm$^3$, and exhibits a hardness of at least about 30 N (Newtons), a friability of no greater than about 10%, and readily disintegrates when contacted with hot water during brewing in an ADC.

A fourth exemplary coffee tablet comprises at least about 91% ground roast coffee and at least 1.5 wt. % propylene glycol, and exhibits a hardness of at least about 30 N (Newtons), a friability of no greater than about 10%, and readily disintegrates when contacted with hot water during brewing in an ADC.

A fifth exemplary coffee tablet comprises at least about 91% ground roast coffee and at least 1.5 wt. % of a liquid flavor carrier, and exhibits a hardness of at least about 30 N (Newtons), a friability of no greater than about 10%, and readily disintegrates when contacted with hot water during brewing in an ADC.

A sixth exemplary coffee tablet comprises at least about 91% ground roast coffee and an amount of instant coffee large enough to improve at least one mechanical property of the tablet selected from binding strength, ease of disintegration, and brewing efficiency (as determined by the amount of coffee solids extracted from the tablet when subjected to brewing in an ADC).

A seventh exemplary coffee tablet comprises at least about 91% ground roast coffee, and exhibits a hardness of at least about 50 N (Newtons) and a friability of no greater than about 3.5%, and readily disintegrates when contacted with hot water during brewing in an ADC.

An eighth exemplary coffee tablet comprises at least about 91% ground roast coffee, has a mass less than about 4 g, and exhibits a friability of no greater than about 6% and readily disintegrates when contacted with hot water during brewing in an ADC having a water delivery rate of approximately 2.5-3.1 g/sec, wherein ten (10) of the tablets, unbroken, are capable of brewing with 1420 ml of water in an automatic drip coffee maker a consumable coffee beverage having an absorbance of 1.1-3.5 or 1.25-2.75 or 1.7-2.5, and wherein the coffee tablets exhibit a yield greater than 26% when brewed in the ADC.

A ninth exemplary coffee tablet comprises at least about 91% ground roast coffee and exhibits a friability of no greater than about 6%, and readily disintegrates when contacted with hot water during brewing in an ADC having a water delivery rate of approximately 2.5-3.1 g/sec, wherein ten (10) of the tablets, unbroken, are capable of brewing with 1420 ml of water in an automatic drip coffee maker a consumable coffee beverage having an absorbance per gram of >0.07 or >0.09, and wherein the coffee tablets exhibit a yield greater than 26% when brewed in the ADC.

A tenth exemplary coffee tablet is made by a multi-step compaction process in which at least a first compression and a separate second compression are carried out in the same compaction die in such a manner that the coffee tablet obtained exhibits a hardness of at least about 40 N (Newtons) and a friability of no greater than about 6%, and readily disintegrates when contacted with hot water during brewing in an ADC.

An eleventh exemplary coffee tablet is made by a multi-step compaction process in which a pre-compression step is carried out at a lower compaction force but in the same compaction die as the main compression step wherein the pre-compression compaction force is ~20% to <100%, ~30% to ~90%, ~40% to ~80%, or ~50% to ~75%, or ~50% to ~60% of the compaction force used in the main compression step.

A twelfth exemplary coffee tablet is made by a multi-step compaction process in which a pre-compression step is carried out at a lower compaction force but in the same compaction die as the main compression step wherein the pre-compression pressure is ~20% to <100%, ~30% to ~90%, ~40% to ~80%, or ~50% to ~75%, or ~50% to ~60% of the pressure used in the main compression step.

An exemplary process for producing a coffee tablet includes subjecting ground roast coffee to a multi-step compaction process including a pre-compression step and a subsequent main compression step, the pre-compression step being carried out at a lower compaction force but in the same compaction die as the main compression step so as to produce a coffee tablet exhibiting a hardness when dry of at least about 30 N (Newtons), a friability when dry of no greater than about 10%, and readily disintegrates when contacted with hot water during brewing in the ADC.

BRIEF DESCRIPTION OF THE DRAWINGS

This invention may be more readily understood by reference to the following drawings wherein.

DETAILED DESCRIPTION

Terminology

Figure 1:
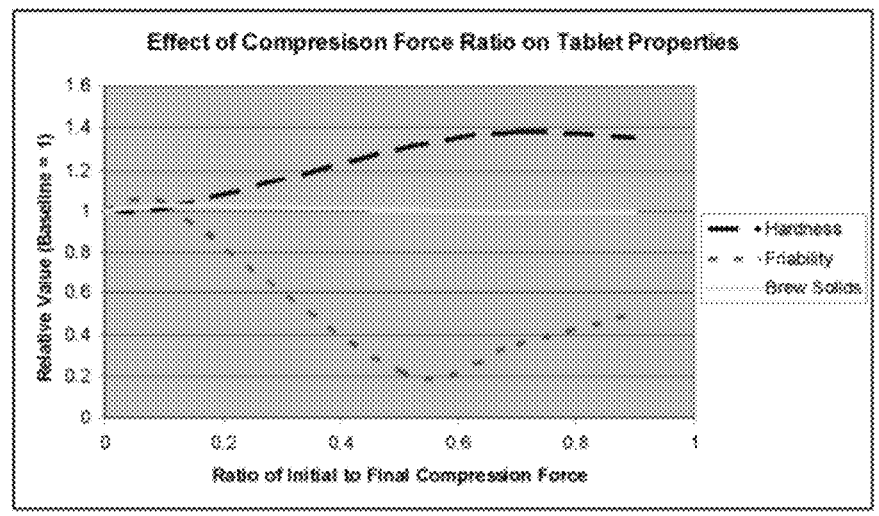
FIG. 1 illustrates the effect achieved on the hardness, friability and extraction efficiency of the inventive coffee tablets when the pre-compression force used in the inventive manufacturing process is altered.

Unless otherwise indicated expressly or from context, the following terms will have the following meanings:

"Binder" means a material which improves the strength of the ground roast coffee tablets made in accordance with this invention. "Binder" does not include ingredients which, although providing some binding activity, provide some other function in significant amount such as contributing to taste, health effects, etc.

"Brewed coffee" means a liquid coffee drink formed by extracting coffee solids from ground, roasted coffee beans or substitutes. "Brewed coffee" includes coffee drinks formed from regular coffee, decaffeinated coffee, instant coffee and coffee substitutes such as chicory.

"Coffee," "regular coffee," and "ground roast coffee" mean a mass of solid, non-decaffeinated particles derived by comminuting roasted coffee beans.

"Coffee product" means any product derived from coffee beans.

"Coffee substitute" refers to a substance which is customarily used as a replacement for coffee such as ground roast chicory, roasted soybeans, and roasted grains such as corn/maize, barley, rye, oats, rice, wheat germ, spelt, buckwheat, and millet.

"Decaffeinated coffee" refers to a solid derived from coffee bean's, both roasted and unroasted, which contain a substantially reduced concentration of caffeine.

"Density," as it relates to ground roast coffee and unless otherwise indicated, refers to the number of ounces of that coffee that are needed to fill a container having a predetermined standard volume. Historically in the United States, one pound (16 ounces or 454 g) of ground roast coffee had a standard density of ~0.4 g/cc and a conventional moisture content of about 1-7%. However, technologies have allowed lower density coffees to be made, so today a more standard density is ~0.33 g/cc. Even lower densities are possible, such as ~0.263 g/cc.

"Free-standing" in reference to a coffee tablet means that the coffee tablet is not housed in a filter paper container (or other container made from a similar material) which is intended to remain in place, around the tablet, when the tablet is contacted with hot water for brewing.

"Flavor Carrier" refers to a material for containing, carrying, or otherwise being mixed with coffee flavorant to facilitate using the coffee flavorant. Coffee flavorants are normally added to coffee products by means of such flavor carriers, which are provided to make dispensing, metering and mixing of the flavorant with the coffee product easier. For example flavorants may be added to a flavor carrier in a proportion so that a consistent weight percentage (e.g., 3%) of the final carrier-containing flavorant compositions can be added to ground roast coffee regardless of the particular flavorant or flavor carrier. Flavor carriers can be in dry, liquid, or paste forms and carrier-containing flavorant compositions added to ground roast coffee can be in dry, liquid, or paste forms.

"Instant coffee" refers to a flowable, particulate coffee product that has been made by evaporating water from a previously made brewed coffee, usually by concentration and drying. Typical drying means, such as spray drying and freeze drying are known in the art. An example of instant coffee production may be found in U.S. Pat. No. 3,700,466, the entire disclosure of which is incorporated herein by reference.

"Standard serving of brewed coffee" refers, for each country of the world, brewed coffee as customarily served in that country. For example, in the United States, brewed coffee is served in two different ways, regular strength and espresso strength. In both cases, about 3-5 grams of ground roast coffee is used to make the brewed coffee. An exemplary Folgers brand medium roast, ADC ground coffee is brewed using about 3 grams of the ground roast coffee having a density of about 0.33 g/cc to make the brew. Regular strength coffee is made with about 5-6 fluid ounces (~150-175 ml) of water, while espresso strength coffee is made with about 1.9 fluid ounces (~55 ml) of water. Thus, in the United States, a "standard serving of brewed coffee" will be understood as referring to 5-6 fluid ounces (~150-175 ml) of regular strength brewed coffee as well as to roughly 1.9 fluid ounces (~55 ml) of espresso strength brewed coffee.

Automatic Drip Coffee Makers

This invention is intended for use with any automatic drip coffee maker ("ADC") designed for producing brewed coffee by hot water extraction in which hot water is dripped onto a bed of ground roast coffee. While hot water at a wide range of temperatures may be employed, exemplary temperature ranges for hot water for brewing may include about 70-120° C., about 80-110° C., about 80-100° C., or about 90-100° C.

Normally, the ground roast coffee is deposited in a "brew basket," i.e., a container having an open top and a floor defining one or more outlet openings, the brew basket containing a paper or metal mesh or plastic mesh coffee filter in most instances. Brew baskets are often shaped in the form of a truncated cone or other similar wedge shapes, so that their side walls direct flow to the more confined area of the containers' floor. The most common brew baskets are referred to as "basket" style and "cone" style. Once activated, the machine automatically heats water previously placed in its water reservoir and then causes this heated brewing water to drip down onto the coffee bed in the brew basket over a suitable period of time (the "brewing cycle time"). Another style of machine has a reservoir of hot water that is displaced by new water added. In either case, the machine delivers hot water, at or slightly above atmospheric pressure, which is somewhat below boiling to about boiling, to the brew basket. As the water passes through the coffee bed, coffee flavor solids are extracted from the ground roast coffee, thereby producing brewed coffee. The brewed coffee so made then passes through the coffee filter and then through the outlet opening or openings in the brew basket, where it is collected in a suitable carafe normally positioned below the outlet opening or openings.

Automatic drip coffee makers come in many different sizes. Most automatic drip coffee makers for consumer use are designed to produce 4-12 standard servings of brewed coffee per brewing cycle. A first variation of automatic drip coffee makers have an option for brewing one to three standard servings. A second variation of automatic drip coffee makers, typically known as "4 cup" brewers, are designed to brew up to four standard servings. A few are even capable of brewing a single cup, although these are typically high pressure brewers and not "drip" brewers. Automatic drip coffee makers for commercial or industrial use are typically designed for producing 10 to 30 standard servings of brewed coffee per brewing cycle. The inventive ground roast coffee tablets can be used with all such automatic drip coffee makers, regardless of the configuration of their brew baskets. Thus, the minimum number of servings for which a coffee brewer is designed can vary from machine to machine and may be one serving, four servings, ten servings, or some other number of servings.

While the inventive coffee tablets of the present application may advantageously be used with many different types of coffee makers, including many different types of automatic drip coffee makers, the specific brew performance characteristics (e.g., yield, % brew solids, total brew solids, absorbance, etc.) described herein correspond to brewing the inventive coffee tablets in a 4-12 cup automatic drip coffee maker ("ADC") having a water delivery rate of approximately 2.5 g/sec to 3.1 g/sec, for example, a water delivery rate of about 2.7 to 2.8 g/sec. Two such ADC's are the Mr. Coffee® Model DR13 coffee maker and the Mr. Coffee® Accel (Model PRX 23) coffee maker, both of which have a water delivery rate of approximately 2.75 g/sec. As expected, ADC's having substantially higher water delivery rates may produce lower total extraction (and corresponding lower brew solids concentrations, yields, and absorbances), as the faster flowing water has less time to absorb the coffee solids. However, relative to the brew performance of the corresponding roasted and ground coffee under the same brewing conditions, the relative brew solids indices, yield ratios, or absorbance ratios of coffee brewed using an ADC with a higher water delivery rate (for example, the Bunn® Pour-Omatic GR, having a water delivery rate of approximately 10 to 11 g/sec) may be comparable to those described herein for ADC's having a water delivery rate of approximately 2.5 g/sec to 3.1 g/sec.

Ingredients

The coffee tablets of this invention can be made from virtually any type of ground roast coffee.

Ground roast coffee is made from coffee beans, which are the seeds of "cherries" that grow on coffee trees in a narrow subtropical region around the world. There are many coffee varieties, however, it is generally recognized that there are two primary commercial coffee species: *Coffea arabica* (herein "Arabica(s)") and *Coffea canephora* var. *robusta* (herein "Robusta(s)"). Coffees from the species *arabica* may be described as "Brazils," which come from Brazil, or "Other Milds" which are grown in other premium coffee producing countries. Premium Arabica countries are generally recognized as including Colombia, Guatemala, Sumatra, Indonesia, Costa Rica, Mexico, United States (Hawaii), El Salvador, Peru, Kenya, Ethiopia and Jamaica. Coffees from the species *canephora* var. *robusta* are typically used as a low cost extender or as a source of additional caffeine for Arabica coffees. These Robusta coffees are typically grown in the lower regions of West and Central Africa, India, South East Asia, Indonesia, and Brazil. See, US 2008/0118604, the disclosure of which is incorporated herein by reference.

Virtually any of the above varieties and types of coffees can be used to make the inventive coffee tablets. One ground roast coffee without any binder or liquid flavor carrier acting as a binder resulted in tablets with very poor hardness and friability. This coffee had a coffee bulk density of about 0.353 g/cm$^3$, a moisture content of about 2.2%, and a relatively high percentage of "fines." While not intending to be bound by any particular theory, it is believed that the combination of low moisture, high density, and a high fines percentage combined to cause these relatively poor results. Mixtures of different coffee varieties and types can also be used.

When removed from the coffee cherry, coffee beans normally have a distinctly green color and a high moisture content. Therefore, they are normally dried prior to export, typically to a moisture content of about 12%. Historically, solar drying was the method of choice, although machine drying is now normally used due to the reliability and efficiency of the machine dryers available for this purpose. See, Sivetz et al., *Coffee Technology*, "Drying Green Coffee Beans", pp. 112-169 (1979). Sivetz also highlights the irreversible damage over-drying can have on coffee quality.

After drying to a moisture content of about 12%, the coffee beans are typically exported to consuming nations where they are processed into conventional ground roast coffee by roasting followed by grinding. Any of the variety of roasting techniques known to the art can be used to roast the green coffee in the process of this invention. In the normal operation of preparing conventional roast and ground coffee, coffee beans may be roasted in a hot gas medium at temperature ranges of about 176.8-371.1° C. (350-700° F.), or about 176.8-260° C. (350-500° F.), or about 204.4-232.2° C. (400-450° F.), or about 260-287.8° C. (500-550° F.), or about 315.6-348.9° C. (600-660° F.), with the time of roasting being dependent on the flavor characteristics desired in the coffee beverage when brewed. Where coffee beans are roasted in a batch process, the batch roasting time at the hereinbefore given temperatures is generally from about 2 minutes to about 20 minutes, and may, for example, be about 10-20 minutes or about 12-18 minutes, or may be about 2-10 minutes, or about 2-6 minutes, or about 2-4 minutes, or about 2-3 minutes. Where coffee beans are roasted in a continuous process, the residence time of the coffee beans in the roaster is typically from about 30 seconds to about 9 minutes, and may, for example, be about 30 seconds to 6 about minutes, or about 30 seconds to about 4 minutes, or about 1-3 minutes. The roasting procedure can involve static bed roasting as well as fluidized bed roasting. A preferred type of roasting would be using fast roasters. While any method of heat transfer can be used in this regard, convective heat transfer, especially forced convection, is normally used for convenience. The convective media can be an inert gas or, more typically, air. Typically, the beans are charged to a bubbling bed or fluidized bed roaster where they contact a hot air stream at inlet air temperature of from about 350° to about 1200° F. (about 177° C. to about 649° C.) preferably from about 400° F. to about 800° F. (about 204° C. to about 427° C.), at roast times form about 10 seconds to not longer than about 5.5 minutes, preferably from about 10 to about 47 seconds.

As well known to coffee professionals, it is conventional to refer to the degree or extent to which coffee beans are roasted in terms of their Hunter color level. The Hunter Color "L" scale system is generally used to define the color of the coffee beans and the degree to which they have been roasted. Hunter Color "L" scale values are units of light reflectance measurement, and the higher the value is, the lighter the color is since a lighter colored material reflects more light. Thus, in measuring degrees of roast, the lower the "L" scale value the greater the degree of roast, since the greater the degree of roast, the darker is the color of the roasted bean. This roast color is usually measured on the roasted, quenched and cooled coffee beans prior to subsequent processing (e.g., grinding and/or flaking) into a brewed coffee product. However, color may be measured on finished product, in which case the color will be designated as such. See, pages 985-95 of R. S. Hunter, "Photoelectric Color Difference Meter," *J. of the Optical Soc. of Amer.*, Volume 48 (1958).

The ground roast coffee used to make the inventive coffee tablets can be made from coffee beans roasted to any desired roast color from about 10 L (very dark) to about 25 L (very light). In some embodiments, it is contemplated that the coffee beans will be fast roasted to an average color of from about 13 to about 19 Hunter L units, preferably from about 14 to about 18 Hunter L units, and even about 15 to about 17 Hunter L units.

Once the coffee beans are roasted, they are ground to a desired average particle size. Average particles sizes on the order of as low as 250 μm (microns) and as high as 3 mm, as measured by Laser Diffraction on a Sympatec Rodos Helos laser particle size analyzer, are conventional. Average particle sizes on the order of 400 μm to 1,000 μm, 500 μm to 800 μm, and even 650 μm to 750 μm, 800 μm to 950 μm, and 850 μm to 900 μm are more interesting. The coffee beans may be ground to other average particle sizes, including for example, average particle sizes of about 400 μm to 1.5 mm, or about 300 μm to about 1,000 μm, or even about 1-2 mm. It is also recognized that larger coffee particles may be broken down during tablet compaction, resulting in smaller average particle sizes within the compacted coffee tablet.

The ground roast coffee tablets of this invention can be made from ground roast coffees ground to any of these particle sizes. Coffee flakes can also be used. Of course, there can be a size distribution around these mean particle sizes, so that the grind can be further characterized by breadth of distribution. One convenient measure is Q250, the percent of particles less than 250 microns, which represents the amount of finer particles (or "fines") that are included in the distribution and that help make up the mean size.

As appreciated by skilled coffee professionals, different ground coffees exhibit different bulk densities depending on the type of coffee used, the method by which the coffee is roasted, the color of the roasted coffee, the particle size to which the coffee is ground, moisture content, and other factors. In accordance with this invention, the inventive coffee tablets can be made for ground roast coffee having any conventional density. So, for example, the inventive coffee tablets can be made from ground roast coffees having "regular" densities ranging between about 0.26 g/cc to 0.35 g/cc such as, for example, 0.263 g/cc, 0.288 g/cc, 0.325 g/cc, and 0.35 g/cc, if desired.

Alternatively, the inventive coffee tablets can also be made for ground roast coffees having greater or lesser densities, if desired. For example, the inventive coffee tablets can be made from high density coffees having densities of >0.4 g/cc, e.g., densities of up to ~0.6 g/cc, although even higher densities are contemplated. Similarly, the inventive coffee tablets can be made from low density coffees having densities of <0.18 g/cc to 0.26 g/cc, e.g., densities of 0.18 g/cc to 0.26 g/cc, 0.20 g/cc to 0.25 g/cc, or even 0.22 g/cc to 0.23 g/cc (such as ~0.19 g/cc, ~0.20 g/cc, ~0.21 g/cc, ~0.22 g/cc, ~0.23 g/cc, ~0.24 g/cc or even ~0.25 g/cc). In this regard, see U.S. Pat. No. 5,160,757 for a description of how to make low density coffees and U.S. Pat. No. 5,227,188 for a description of how to make high density coffees. The entire disclosures of both of these patents are incorporated herein by reference.

As appreciated by skilled coffee professionals, different ground coffees also exhibit different moisture contents depending on the type of coffee used, the method by which the coffee is roasted, the color of the roasted coffee, the particle size to which the coffee is ground, and other factors. So, for example, the inventive coffee tablets can be made from ground roast coffees having moisture contents of ~1 to ~7 wt. %, ~2 to ~7 wt. %, ~2 to ~6 wt. %, ~3 to ~6 wt. % and ~4 to ~5.5 wt. %. Some ground roast coffees having a moisture content less than ~2.5 wt. % may not make tablets with acceptable friability without the use of a binder or liquid flavor carrier acting as a binder; thus, any of these ranges might have a lower boundary of ~2.5 wt. %.

Generally speaking, the inventive coffee tablets can also be made from mixtures of two or more of the coffees described above. So, for example, the inventive coffee tablets can be made from mixtures of ground roast coffees having different densities, different Hunter L colors, different particle sizes, different moisture contents, and different combinations thereof (i.e., one ground roast coffee could have a low density and a high moisture content while another ground roast coffee could have a medium density and a low moisture content). Thus, the inventive coffee tablets can be made from mixtures of regular and high density coffees, mixtures of regular and low density coffees, mixtures of high and low density coffees, and mixtures of high, regular and low density coffees, if desired. In addition, the inventive coffee tablets can be made from mixtures ground roast coffees having high and low Hunter L color numbers, large and small average particle sizes, etc.

In addition to the above ground roast coffees, additional ingredients can be included in the ground roast coffee tablets of this invention. For example, decaffeinated varieties of the above coffees can be used in addition to, or in place of, the ground roast coffees described above. Similarly, coffee substitutes such as ground chicory, roasted soybeans, and roasted grains such as corn, rye, wheat, barley, oats, rice, wheat germ, spelt, buckwheat, and millet can be included in the inventive ground roast coffee tablets. (Instant coffee is not a "coffee substitute" in this context.) Coffee flavorings, as further discussed below, can be included. Also, various excipients such as binders and disintegration aids can be included.

Examples of suitable solid particulate binders include starches, sugars, modified starches, maltrodextrins, polydextroses, carrageenans, gums, soluble fibers, celluloses, waxes, gelatin, sugars, including sucrose, glucose, dextrose, molasses and lactose, natural and synthetic gums, including acacia sodium alginate, extract of Irish moss, panwar gum, ghatti gum, mucilage of isapol husks, carboxymethylcellulose, methylcellulose, polyvinylpyrrolidone, Veegum, larch arabogalactan, polyethyleneglycol, ethylcellulose, any salts of these compounds, and mixtures thereof can be included as binders. More interesting solid binders are carboxymethylcellulose, ethyl cellulose, maltodextrin, gelatin, gum arabic, gum agar, modified corn starch, and mixtures thereof. See, for example, EP 813816 B1, U.S. Pat. No. 6,090,431, U.S. Pat. No. 6,277,428, EP 0229920 and U.S. Pat. No. 1,951,357.

Surprisingly, it has been found that some liquid flavor carriers act as a binder in coffee tablets. Suitable liquid flavor carriers include those having viscosities of 15 to 65 cP (centipoise), 35 to 65 cP, 40 to 60 cP, or even 45 to 56 cP and surface tensions of 30 to 50 dynes/cm, 35 to 45 dynes/cm, or even 35 to 40 dynes/cm at 25 C. Propylene glycol is a good example of a liquid flavor carrier that acts as a binder in coffee tablets. Other examples include but are not limited to glycerin, other polyols, and polyethylene glycol (PEG).

Binders, if used, will normally be present in an amount of ≤~10 wt. %, ~0.5 to ~7 wt. %, ~1 to ~5 wt. %, or even ~1.5 to 4 wt. %, or even ~2 to ~4 wt. %, based on the weight of the entire composition. However, addition of one or more binders is not required, and indeed in many embodiments the inventive coffee tablets are essentially free of binders.

Mixtures of all of the above ingredients, i.e., mixtures of different ground roast coffees, different ground roast decaffeinated coffees, different ground roast coffee substitutes, different flavorings and/or different excipients, can also be used. If so, the amount of ground roast coffee (both regular and decaffeinated) included in the ground roast coffee solid used to make the inventive ground roast coffee tablets will normally be at least about 50 wt. %, more typically at least about 75 wt. %, at least about 80 wt. %, at least about 85 wt. %, at least about 90 wt. %, at least about 91 wt. %, at least about 92.5 wt. %, or even at least about 95 wt. %, based on the weight of the tablets ultimately produced. Moreover, although some or all of this ground roast coffee can be decaffeinated, it is also desirable at least in some embodiments that essentially all of the ground roast coffee is "regular," i.e., non-decaffeinated coffee. Embodiments in which at least 5 wt. %, at least 10 wt. %, at least 25 wt. %, at least 50 wt. %, at least 75 wt. %, or even at least 90 wt. % of the ground roast coffee in the inventive tablets is decaffeinated are contemplated, as are embodiments in which essentially all of the ground roast coffee in the tablets is decaffeinated.

Tablet Size and Configuration

Although the inventive coffee tablets can be made in any size, they are normally designed at least in some embodiments to produced a single standard serving of brewed coffee, or a whole multiple or major fraction of a single standard serving. For example, in some embodiments, the inventive coffee tablets may be designed to produce whole multiples of a single standard serving, e.g., to produce two standard servings of brewed coffee or three standard servings. In other embodiments, the inventive coffee tablets may be made larger, to produce more than a single serving of coffee, and may be designed with surface scoring to allow a user to preferentially break the tablets into smaller pre-designated portions (i.e. break the tablet in half or into fourths, etc.), and the individual portions could then be used to produce separate coffee servings. In other embodiments, the inventive coffee tablets may be designed to produce a major fraction of a standard single serving such as ½ of a standard serving, or ⅓ of standard serving, or ¼ of standard serving. If so, the inventive coffee tablets will contain a correspondingly greater or lesser amount of ground roast coffee. This does not necessarily mean that using one single coffee tablet designed to produce a single standard serving in a standard automatic drip coffee maker will necessarily always result in one single serving of acceptable brewed coffee. Many standard automatic drip coffee makers are configured to make, at minimum, more than one serving of coffee at a time, e.g., four (4) servings of coffee at a minimum, and the inventive coffee tablets are not necessarily able to overcome that limitation of such coffee brewers. For such tablets designed to produce a single standard serving of coffee, one would expect, for example, four of such tablets to produce four servings of acceptable brewed coffee, five of such tablets to produce five servings of acceptable brewed coffee, seven of such tablets to produce seven servings of acceptable brewed coffee, etc. For an automatic drip coffee maker designed to brew one serving of coffee at a time, one may be expected to use one tablet per serving. Of course, the consumer may add or reduce these numbers to control strength of the brewed coffee to match their particular taste preference (e.g., any one or more or fewer tablets than this one-tablet-per-serving ratio, such as five tablets to make four servings, six tablets to make four servings, three tablets to make four servings, etc.).

As indicated above, different ground coffees exhibit different densities depending on the type of coffee used, the method by which the coffee is roasted, the color of the roasted coffee, the particle size to which the coffee is ground, moisture content, and other factors.

A typical ground roast coffee having a density of 0.33 g/cc and a standard moisture content of about 1-7% requires approximately 3 grams to produce a standard serving of brewed coffee, both regular and espresso strength, at least in the United States. Thus, the inventive ground roast coffee tablets, when designed to produce one standard serving of brewed coffee per tablet, will normally contain about 3±1 grams of ground roast coffee, based on a density of 0.33 g/cc and a standard moisture content of about 1-7%, more typically about 3±0.5 grams of ground roast coffee. Exemplary inventive coffee tablets may have a mass of less than about 4 grams, less than about 3.5 grams, less than about 3.3 grams, less than about 2.7 grams, about 2.6 to 2.8 grams, or even a mass of about 1.9 grams to about 2.7 grams. Ground roast coffees of greater or less densities, e.g., 0.288 g/cc, (and greater or lesser moisture contents, as further discussed below) require correspondingly less or greater amounts of coffee to produce a standard serving of brewed coffee.

When a ground roast coffee having a density of 0.33 g/cc and a standard moisture content of about 1-7% is used for producing a single standard serving of coffee, approximately 3 grams of this coffee will be required, as indicated above. This volume of ground roast coffee will produce a generally cylindrical tablet measuring approximately 25 mm in diameter and 6-7 mm in thickness when compacted in a typical compaction process carried out in accordance with this invention, as further described below. When coffees of different densities and/or moisture contents are used, correspondingly different tablet volumes will be achieved. Similarly, inventive tablets made with different dose sizes, e.g., a tablet made to produce ⅓ of a standard serving of brewed coffee per tablet, will also have correspondingly different sizes. Different tablet configurations are also possible. For example, oval, heart, "pillow" and other shapes are anticipated. Further, at least one side of a generally cylindrical tablet may be concave. Additionally or alternatively, the outer surface of a tablet may have ridges, bumps, surface scoring, or embossments.

Packaging and Use

The inventive ground roast coffee tablets are intended to be provided to the customer, both consumers and commercial/industrial users, in suitable packages. Many types of packages and packaging material can be used for this purpose including bags made from plastic, paper, foil, cellophane or other suitable material; boxes made from cardboard, rigid plastic, foamed plastic, etc.; bottles, sleeves, etc. Combinations of these packages can also be used.

If desired, the inventive ground roast coffee tablets can be packaged in specific numbers for making predetermined amounts of coffee. For example, tablets designed to produce a single serving of coffee per tablet can be packaged in groups of four to facilitate making four cups of coffee in a single brew cycle. Alternatively, three tablets designed to produce ⅓ serving of coffee per tablet can be packaged in groups of three to facilitate making a single serving of coffee in a single brew cycle. The tablet packages can be designed to be resealable for the convenience of the customer. In such a configuration, as the tablets are periodically used by the consumer, the unused tablets that remain could be resealed in the package to retain product freshness.

A particular advantage of this invention is that, because the inventive coffee tablets contain a predetermined amount of ground roast coffee (and other optional ingredients), adjusting dosages to achieve the precise flavor desired, including combining different inventive coffee tablets in the same brew, is made much easier. So for example, a consumer desiring to make a stronger brewed coffee than normal can use five inventive coffee tablets (of a single serving size) rather than four for brewing four servings of brewed coffee. Similarly, a consumer desiring to make a brewed coffee having a reduced caffeine content and a "hint" of French vanilla flavor can use three inventive coffee tablets made from regular ground roast coffee, two tablets made from decaffeinated coffee, and one tablet of French vanilla flavored coffee. Thus, method of brewing coffee are contemplated comprising (a) placing at least one or a portion of one of a first type of coffee tablet (flavored or unflavored) and at least one or a portion of one of a second (flavored or unflavored) type of coffee tablet into an ADC coffee maker and (b) actuating a brew cycle of the ADC coffee maker to brew coffee with the coffee tablets or coffee tablet portions.

A further advantage of the inventive coffee tablets is that they are smaller in size than conventional ground roast coffee on a comparable basis, i.e., based on the same amount of coffee provided. This allows the inventive coffee tablets to be marketed, transported and sold in smaller packages, which in turn is beneficial for the environment. Tablets with a volume less than 3.2 cm$^3$, less than 2.9 cm$^3$, and less than 2.3 cm$^3$ are of particular interest.

In use, the appropriate number of tablets will be removed from their package(s), manually placed in the brew basket of an automatic drip coffee maker, and then brewed into brewed coffee in the normal way.

Tablet Manufacture

In accordance with this invention, the inventive ground roast coffee tablets are made in such a way that they disintegrate essentially immediately (or at least very rapidly) when contacted with hot brewing water at the beginning of the brewing cycle, as indicated above. In addition, they are also made to resist significant degradation from the manual handling they receive during manufacture and use. In particular, the inventive coffee tablets are made to have sufficient hardness and friability before brewing to withstand all aspects of manufacture, handling, packaging, transport and use without breakage to any significant degree.

This is accomplished in accordance with this invention by making the inventive ground roast coffee tablets by multistep compaction, i.e., by compressing ground roast coffee into shaped articles by a multi-step compaction process carried out in the same compaction die in which the ground roast coffee is compressed at a first compaction pressure and then subsequently further compressed at least one more time in the same compaction die. Many of the tablets herein discussed were made in multi-step compaction process carried out in the same compaction die in which the ground roast coffee is pre-compressed at a relatively lower compaction pressure and then subsequently further compressed at a relatively higher pressure in a main or primary compaction step. In accordance with this invention, it has been found that this approach allows stronger tablets to be produced than would otherwise by the case if an otherwise identical tablet having an otherwise identical density were made by a single-step compaction process. That is to say, coffee tablets made by the inventive multi-step compaction process are stronger (as measured by hardness, friability or both, as further discussed below) than otherwise identical tablets having the same density but made by a conventional single-step compaction process. In the alternative, tablets can be made using a multi-step compaction process carried out in the same compaction die in which the ground roast coffee is compressed at a relatively higher compaction pressure initially and then subsequently further compressed at a relatively lower pressure in a separate compaction step. This second approach may be problematic for some machines, because they use a measured highest compaction force or pressure to control how much material is deposited into the die (with a higher than desired force indicating that too much material has been deposited) and controlling based on a higher pre-compression may be less accurate than controlling based on a higher main compression. Although many of the examples herein are carried out with a relatively lower compaction pressure initially and then subsequently further compressed at a relatively higher pressure in a separate compaction step, and much of the teachings herein are in this context, it is to be understood that many of the advantages taught herein can be obtained using three or more total compactions in the same die and/or a relatively higher compaction pressure at other than the final compression step, and the virtually any of the methods herein can be thought of as being capable of being carried out using three or more total compactions in the same die and/or a relatively higher compaction pressure at other than the final compression step (e.g., first or second or third non-final compression).

Although the inventive multi-step compaction process will normally be carried out with two compaction steps, one, two, three or more additional, intermediate compaction steps can also be used, usually at compaction pressures between the compaction pressures encountered in the pre-compression and main compression steps. However, greater or lesser compaction pressures can also be used in the intermediate compaction steps, if desired.

Compressive or compaction forces on the order of ~25 to ~80 kN (kiloNewtons), ~35 to ~65 kN, or even ~40 to ~50 kN have been found suitable for the main compression step (based on tablets having diameters of ~24 mm to ~25 mm). Thus, these main compressive forces will normally be >~25 kN, >~35 kN, >~40 kN, and, in addition, generally <~80 kN, <~55 kN, or even <~50 kN. Expressed as applied pressure during compaction (assuming a 24.5 mm tablet diameter), the corresponding compressions would be >~53.0 MPa (or $N/mm^2$), >~74.2 MPa, >~84.8 MPa, and, in addition, generally <~169.6 MPa, <~116.7 MPa, or even <~106.1 MPa. Greater or lesser compressive forces can be used depending on the type, particle size and other properties of the ground roast coffee being processed, the desired density, strength and hardness of the coffee tablet being produced, and certain production variables as further discussed below, and can easily be determined by routine experimentation based on the teachings herein.

A number of processes are known for forming tablets and other shaped articles from granular materials by compression. Most such processes require (1) filling a die, typically closed off at the bottom by a bottom tool, with the material to be tabletted (2) compressing the filled material between upper and lower tools, and (3) ejecting the tablet so formed from the die.

Presses may be single station or multiple station. In this context, a "station" refers to a single die and its associated top and bottom tools. In a single station press, a single stationary die is used, and all functions (e.g., filling, compression and ejection) occur in the same location. In a multiple station press such as a rotary tablet press, multiple sets of dies and their associated top and bottom tools are moved from location to location where the separate functions of filling, pre-compression, main compression and ejection occur.

For example, a typical rotary table press has a turret containing a die table formed from multiple die stations. The turret containing the die table rotates through the press so that each die is serially brought to the different filling, pressing and ejection locations in the press. Dies are filled at the filling location, the material to be tabletted compacted in the pre-compression and main compression locations, and the tablet formed thereby ejected from the die at the ejection location. Actuation of the top and/or bottom tools for compressing the material to be compacted in the pre-compression and main compression locations can be done in a variety of different ways, including using cams, ramps, compression rollers or combinations thereof, all of which are designed to force the bottom and top tools associated with each die together. The size of the compression rollers or other tool compressing mechanisms may limit the proximity of the pre-compression and main compression locations, which may, for example, be separated by approximately ¼ of the die circle circumference. While the coffee material may be under compression during this delay period, in one embodiment, the die tools may be held in proximity to the compression positions without exerting additional compaction forces, for example, by holding the tools using tracks, ramps, or other mechanisms provided with the rotary tablet press. This delay between pre-compression and main compression steps may have a duration of approximately 80-900 milliseconds, or 150-400 milliseconds, or 200-290 milliseconds, under normal rotary tablet press operating speeds (e.g., 15-60 rpm), or about 15-23 times either of the pre-compression and/or the main compression dwell times. Therefore, while each of the pre-compression and main compression steps may be very brief (for example, pre-compression and main compression dwell times ranging from 7-45 milliseconds), the total time from the start of the pre-compression step to the completion of the main compression step may be 8-15 times the total time under compression at the pre-compression and main compression rollers. This total compression time may be, for example, approximately 0.1 to 1 second, approximately 0.18 to 0.5 seconds, or 0.22 to 0.36 seconds. As such, even minor adjustments to the dwell times of the pre-compression and main compression steps may result in significant changes to the tablet production rates, as adjustments to the rotary press operating speed are generally proportional to these dwell time adjustments.

In a typical rotary press, each die is subjected to one set of compressions, for production of one table, per die, in a single, 360° revolution of the turret. In other rotary presses, additional filling, compression and ejection locations may be provided for production of two or more tablets, per die, in a single 360° revolution of the turret. While pre-compression locations have been included in typical rotary tablet presses, the amount of pre-compression forces applied during prior art tabletting has generally been minimal, the purpose of which being to force or squeeze pockets of air out of the powder to be tabletted, to prevent voids or fractures in the resulting tablet.

Generally speaking, longer compression dwell times require less compression force in the main or primary compression step. Some increases in dwell time may be accomplished by increasing the size of the portions of the tools impacted by the compression rollers or other compression mechanism, often referred to as the tool heads. However, more substantial increases in compression dwell time typically require slower machine operating speeds, such that the top and bottom tools are aligned with the compression rollers (or other compression mechanism) for the desired dwell time period. As such, a substantially longer dwell time for compaction of the tablet generally limits the tablet production rate by requiring a substantially slower machine operating speed, thereby slowing down other steps of the tabletting process (e.g., filling, pre-compression, or ejection of completed tablet).

As further indicated above, the compressive forces used for a particular application of this invention also depend on the desired properties of the inventive ground roast coffee tablets to be produced. In this regard, it has been found that, within certain limits, greater compressive forces lead to stronger tablets, and conversely, lesser or reduced compressive forces lead to weaker tablets. On the other hand, compressive forces which are too high can weaken the tablet. Indeed, reliance on increases in compressive forces alone, without regard to dwell time, amount of pre-compression, or other such factors, may be insufficient to produce tablets of desired strength, as shown, for example, in the working examples (see, e.g., Example 14).

The strength/robustness of the ground roast coffee tablets of this invention can conveniently be measured in several ways, two examples of which include measuring a tablet's hardness and friability. Hardness measures the force required to break the tablet in an axial direction. Tablet hardness can be determined by a diametral compression test in which the tablet is placed between two anvils and a pressure is applied to the anvils until the tablet breaks. The crushing strength that just causes the tablet to break is taken as the hardness of the tablet, which is sometimes referred to as the "tablet crushing strength." The hardness of an article can be determined using any number of devices and techniques known to skilled coffee professionals, including, for example, the Stokes (Monsanto) tester, the Strong-Cobb tester, the Pfizer tester, the Erweka tester, the Heberlein (or Schleuniger) tester, the Key tester, the Varian VK200 Tablet Hardness tester, and the Van der Kamp tester, and the techniques associated with each of these devices. In accordance with this invention, the inventive ground roast coffee tablets are normally made to have a hardness of ≥~30 N (Newtons), when measured using a Varian VK200 Tablet Hardness tester set in the N (Newton) mode. Hardnesses on the order of ≥~40 N, or ≥~50 N, are even more interesting, while hardnesses of ≥~60 N, ≥~70 N, ≥~80 N, ≥~90 N, ≥~100 N, and even ≥~110 N and more are possible.

Friability measures the amount of material that flakes, falls, or chips off the tablets after being tumbled under a predetermined set of conditions. For convenience, the friability of the inventive coffee tablets can be measured using a commercially-available Varian Friabilator having a dual chamber friability drum by rotating 25 grams of the tablets in the drum of the machine for 100 revolutions at a rate of 25 rpm and then determining the amount of these tablets that passes through a #4 American Standard Wire Mesh screen. The tablets should not be broken to obtain 25 grams, but adjust the number of whole tablets to come as close as possible to 25 grams. The weight of material passing through this screen in proportion to the total weight of the original charge of tablets represents the friability of these tablets. In accordance with this invention, it has been found that the inventive coffee tablets, when made in the manner indicated above, may have a friability of <~10%, <~8%, <~6%, <~3.5%, <~3%, or even <~1%.

Generally speaking, coffee tablets having the above combination of properties, i.e., a hardness of at least about 30 N (Newtons) and a friability of less than about 10%, will have a density on the order of ≥0.85 g/cm$^3$, ≥0.87 g/cm$^3$, ≥0.90 g/cm$^3$, ≥0.92 g/cm$^3$, ≥0.95 g/cm$^3$, ≥0.97 g/cm$^3$, and even ≥0.99 g/cm$^3$. Coffee tablets having densities of ≥0.90 g/cm$^3$, ≥0.92 g/cm$^3$, ≥0.95 g/cm$^3$, ≥0.97 g/cm$^3$, and even ≥0.99 g/cm$^3$ are especially interesting.

An external coating can enhance the tablet strength, allowing tabletting at a reduced compaction force. Any material described above as useful for making a binder to be included in the inventive coffee tablets can be used for making such coatings.

In accordance with this invention, the inventive ground roast coffee tablets are made to have the above properties by using a multi-step compaction process comprising two or more compression steps, a pre-compression step, a main or primary compression step, and optionally, one or more intermediate compression steps, all of which are carried out in the same die. In other words, once the ground roast coffee is filled into a particular compaction die, it is subjected to all of the compactions steps need to produce a completed coffee tablet in that same die before being ejected therefrom. In general, this approach allows lower compression forces to be used in the main compression step, which in turn places less stress on the press. In addition, this approach also allows for reduced compression dwell times, as compared to the extended dwell times generally associated with lower compression forces, which enables faster press operation. Finally, as indicated above, this approach also allows stronger tablets to be produced (for a given tablet density) than otherwise identical tablets made by a single-step compaction process.

When using this approach, the pre-compression force is desirably at least about 5 kN (based on tablets having diameters of ~24 mm to ~25 mm), or about a 10.6 MPa pre-compression pressure (for a 24.5 mm diameter tablet). A pre-compression force this low may require the use of a binder or a liquid flavor carrier with binder properties to provide tablets with acceptable friability and hardness at relatively high manufacture rates per die (as suggested by the data below, use of some binders or liquid flavor carriers with binder properties might also permit tablets made with a single compression to obtain acceptable friability and hardness at relatively high manufacture rates per die).

Additionally, compressive forces on the order of ~25 kN, ~35 kN, ~12 to ~40 kN, ~18 to ~35 kN, or even ~25 to ~35 kN have been found suitable for this pre-compression step (based on tablets having diameters of ~24 mm to ~25 mm). Thus, these pre-compressive forces will normally be ~25 kN, ~30 kN, or >~12 kN, >~17 kN, >~18 kN, >~20 kN, >~25 kN, >~35 kN and, in addition, generally <~40 kN, <~35 kN, or even <~30 kN. Expressed as applied pressure during compaction (assuming a 24.5 mm tablet diameter), the corresponding pre-compressions would be ~53.0 MPa (or N/mm$^2$), ~63.6 MPa, or >~25.5 MPa, >~36.1 MPa, >~38.2 MPa, >~42.4 MPa, >~53.0 MPa, >~74.2 MPa and, in addition, generally <~84.8 MPa, <~74.2 MPa, or even <~63.6 MPa. Expressed as a percentage of main compression force, pre-compressive forces of about 20-100%, 30-90%, 40-80%, or even 50-75% of main compression force have been found suitable for the pre-compression step (based on tablets having diameters of ~24 mm to ~25 mm). Thus, these pre-compressive forces will normally be >~20%, >~30%, or >~40% and, in addition, generally <~100%, <~90%, or even <~80% of the main compression force. Greater or lesser compressive forces can be used depending on the type, particle size and other properties of the ground roast coffee being processed, the desired density, strength and hardness of the coffee tablet being produced, and certain production variables as further discussed below, and can easily be determined by routine experimentation based on the teachings herein.

In this regard, FIG. 1 shows the effect of altering the pre-compression force on the hardness, friability and extraction efficiency of the inventive ground roast coffee tablets obtained. This figure was developed from experiments in which a group of coffee tablets was produced by a two-step compaction process in which the tablet was first subjected to a pre-compression force ranging from ~0.3 kN to ~50 kN and thereafter subjected to a main compression force in the same compression die ranging from ~10 to ~70 kN. The data in FIG. 1 has been normalized to values observed with very low/no initial compression being taken as equal to 1. As shown in FIG. 1, when the pre-compression force used to make the inventive coffee tablets is varied between ~20% to ~100% of the main compression force, the hardness of the tablets produced increases by as much as 40% (at a pre-compression/main compression ratio of about 0.70), while the friability of the tablets produced is reduced by as much as 80% (at a pre-compression/main compression ratio of about 0.55). This makes it possible in accordance with this aspect of the invention to design the inventive coffee tablets having a predetermined combination of hardness and friability, as desired.

As indicated above, one advantage of using the inventive multi-step compaction process for manufacturing the inventive coffee tablets, at least when this is done using a multiple station press, is that press operation is faster than would otherwise be the case if a single step compaction process were used. This is made possible because less compaction force can be used in the main or primary compaction step than would be required if compaction occurred in a single compaction step. In addition, using a multiple compaction steps allows the dwell time needed in the primary or main compactions step, i.e., the amount of time the ground roast coffee remains under compaction, to be less than that required if only a single compaction step were used.

In this regard, see WO 2008/107342, which makes clear that in order to make a ground roast coffee tablet of sufficient strength using single step compaction (in which pre-compression is minimal or non-existent), the ground roast coffee must be compressed at a fairly slow rate (i.e., over the course of 0.1 to 2 seconds, preferably 0.2 to 0.8 seconds) and then held at its final volume for an additional significant period of time (i.e., for 0.2 to 5 second, preferably 0.3 to 2 seconds, and even more preferably 0.5 to 1.5 seconds). In contrast, the inventive process described herein uses a multi-step compaction approach that does not employ slow compression and an extended dwell time at final volume. In accordance with this invention, it has been found that pre-compression "prepares" the ground coffee for final compaction in such a way that less compaction pressure for a shorter period of time is necessary to produce a fully compacted tablet. This pre-compression preparation of the ground coffee, combined with a desired main compaction of the coffee tablet, as provided for in the production of the inventive coffee tablets, is believed to strike a balance between a number of factors believed to have an impact on the physical properties and the brew performance of the tablets, including, for example, tablet strength/robustness, tablet density, table porosity (including the degree of hydrophobicity, the diameter, the length, and/or the orientation of channels and passages on the surface of and within the body of tablet), particle sizes of the coffee from which the tablets are composed, water permeability, and water vapor permeability. When brewed in certain coffee makers where the tablets are exposed to steam during the brewing process (e.g.: automatic drip coffee makers), the water vapor permeability is believed to play a significant role in brew performance.

Thus, in accordance with this aspect of the invention, the inventive multi-step compaction process is carried out in such a way that the dwell time of the ground roasted coffee in the main compaction step, i.e., the period of time in which the coffee is under active compression in the main compaction step, is ≤~0.3 second, ≤~0.25 second, ≤~0.2 second, ≤~0.15 second, or even ≤~0.1 second. Indeed, dwell times on the order of ≤75 milliseconds, ≤50 milliseconds, ≤25 milliseconds, ≤20 milliseconds, and even ≤15 milliseconds are contemplated and shown in the following working examples.

For an exemplary rotary tablet press, the pre-compression and main compression dwell times may be determined from a known rotational speed of the rotary press and the fraction of the die revolution for which the head flat (i.e. the portion of the tool that contacts the compression roller, ramp, or cam) is held for pre-compression or compression by the compression roller, ramp, or cam. Where the compression location on the rotary press is limited to a discrete, instantaneous location (as is the case with tools impacted by compression rollers), this fraction of the die revolution is approximately equal to the tool head diameter divided by the die circle circumference. Thus, dwell time (in milliseconds) in such applications may be calculated as: [(Head Flat Diameter)/($2\pi \times$(Radius of rotary press die circle))]×[(60,000 ms/min)/(RPM)]. As one example, a 29-station rotary press with a die circle diameter of 410 mm and a head flat diameter of 15.52 mm can produce 90,000 tablets per hour using an operating speed of approximately 51.7 rpm, resulting in pre-compression and main compression dwell times of approximately 14 ms each.

Because this dwell time is the rate limiting step in the operation of multi-station presses, press operation can be much faster when the inventive multi-step compaction process is used. Thus, commercially-available multi-stage tabletting presses can be operated at machine speeds capable of producing ≥50,000, ≥75,000, ≥100,000, and even ≥125,000, inventive coffee tablets per hour using the inventive processes. Because different machines may have two or more distinct production lines (two or more main compression steps), which may differ from machine to machine, it may be helpful to set forth production rates in terms of a number of tablets per set of compressions per die per hour (e.g., for the pre-compression/main compression examples, the set of compressions would include both compressions). Using the inventive processes to manufacture the inventive tablets herein, production rates of >1000 tablets per set of compressions per die per hour; >1500 tablets per set of compressions per die per hour; >2000 tablets per set of compressions per die per hour; >2400 tablets per set of compressions per die per hour; >2500 tablets per set of compressions per die per hour; >2750 tablets per set of compressions per die per hour; and >3000 tablets per set of compressions per die per hour are possible, and even production rates of >3100 tablets per set of compressions per die per hour; >3450 tablets per set of compressions per die per hour; and >3500 tablets per set of compressions per die per hour are possible.

Tabletting presses capable of carrying out multi-stage compaction at these compaction pressures, dwell times, and production rates are available from a number of different commercial sources including Fette®, Korsch®, and possibly Courtoy® and Manesty®.

In accordance with still another feature of this invention, it has been further found that the inventive coffee tablets, because of the way they are made, achieve a greater total extraction of coffee solids during brewing as compared to an otherwise identical conventional ground roast coffee composition (i.e., the same untabletted ground roast coffee). That is to say, the total amount of coffee solids extracted and recovered in the brewed coffee product obtained is greater when the inventive coffee tablets are used in a typical ADC coffee maker than when the same amount of conventional (untabletted) ground roast coffee is used in the same coffee maker.

This feature is illustrated in the following working examples which show that the yield ratios provided by the inventive coffee tablets, i.e., the ratio of the coffee solids recovered from brewing the inventive coffee tablets relative to the coffee solids recovered from brewing a substantially equal amount of untabletted (but otherwise identical) ground roast coffee, are normally >1 and in many instances >1.1, >1.15, and even >1.2 on a weight basis. Moreover, this is so even when the yield of coffee solids, i.e., the ratio of the coffee solids recovered from brewing the inventive coffee tablets relative to the amount of coffee present in the coffee tablets before brewing (i.e., [grams of coffee solids extracted from the brewed coffee]/[grams of coffee placed in the brew basket to brew the coffee]×[100]), is >26%, >28.5%, or even >30%.

Still another feature of this invention is that an enhanced extraction efficiency (as evidenced, for example, by increased absorbance, absorbance per gram, yield, and percent brew solids) exhibited by the inventive coffee tablets, as described herein, is essentially independent of the magnitude of the pre-compression force used in the pre-compression step of the inventive manufacturing process. This is illustrated in FIG. 1, which further shows that the brew solids (i.e., amount of coffee solids recovered in the brewed coffee product) remains essentially unaffected as the magnitude of the pre-compression force is varied. (When using an automatic drip coffee maker having a water delivery rate of approximately 2.5-3.1 g/sec, brew solids of 0.36-1.3% or 0.5-1% or 0.42-1.5% or 0.5-0.9% or 0.50-0.75% are of interest.) Because of this feature, the hardness and friability of the inventive coffee tablets can be suitably selected, as discussed above, without compromising this enhanced brewing efficiency.

Another way to determine the amount of coffee solids that are extracted during brewing is to measure the coffee brew's absorbance. The absorbance is, in effect, a measure of the darkness of a coffee brew. A spectrophotometer is used to measure the amount of light absorbance by the liquid brewed coffee at a wavelength of 480 nanometers (nm). A wavelength of 480 nm has been chosen because it corresponds with an absorption feature in the visible spectrum that is associated with the brown color of coffee brews (i.e., the Brown Color absorbance). Stronger coffee brews typically exhibit a bore prominent Brown Color absorbance. Thus, the absorbance value taken at 480 nm correlates with the visually perceived darkness of a cup of coffee. In practice, for example, a sample of brewed coffee is placed in an 8 ml sealed vial and cooled for 15 minutes at room temperature; the sample is then transferred to a cuvette and the absorbance is measured in a Genesys 10 Spectrophotometer at 480 nm wavelength. Absorbance values >1.1, >1.25, and >1.7 and <3.5, <2.5, and <1.75 are of interest. From this base measure of the brewed coffee absorbance, several other values are of interest, including: absorbance ratio (absorbance of brew from tablets/absorbance of brew of the same untabletted ground roast coffee); absorbance per gram (absorbance/grams of coffee put in brew basket) (e.g., at a 10 tablet basis); and absorbance/gram ratio: (Absorbance/gram tablets)/(Absorbance/gram of the same untabletted ground roast coffee). Absorbance ratios >1, >1.06, and >1.12 are of interest. Absorbance per gram values >0.06, >0.07, and >0.09 are of interest. Absorbance per gram ratios >1.05, >1.15, and >1.2 are of interest.

Brew Dynamics

In accordance with still another aspect of this invention, it has further been found that the inventive coffee tablets, which, because of the way they are made, may have a modified time dependency associated with their brew performance over the course of brewing cycle (also referred to as "brew dynamics"). For example, over the duration of a brew cycle, the instantaneous concentration of coffee solids extracted (herein referred to as "instantaneous extracted coffee solids concentration") for a particular chronological portion of the brew (for example, one or more aliquots forming an initial, a middle, or an end portion of the brew) may be altered, as compared to the instantaneous extracted coffee solids concentration for the same portion formed from one or more aliquots taken from a brew made using untabletted coffee in roasted and ground form. As described herein, an "instantaneous" measure of brew dynamics (e.g., instantaneous concentration, instantaneous absorbance, or instantaneous brew delivery) describes the characteristics of one of a series of incremental or sequential samples or aliquots taken contemporaneously with the brewing process, such as, for example, one of a series of 20 second timed aliquots of the brew.

Thus, in accordance with this aspect of the invention, the instantaneous extracted coffee solids concentration associated with an initial portion of a brew produced using the inventive coffee tablets may be lower than the instantaneous extracted coffee solids concentration for an initial portion of a brew produced using the corresponding untabletted coffee. The extent to which the concentration of solids will be lower may depend, for example, on the wettability of the compacted coffee tablet and the rate at which the coffee tablet is broken up during brewing. Expressed in terms of the mass of the total brew, in one example using an automatic drip coffee maker having a water delivery rate of approximately 2.5-3.1 g/sec, the mass of the initial portion is approximately 200-300 g taken from a total brew mass of 1330 g. Expressed in terms of the total brewing period, in one example using an automatic drip coffee maker having a water delivery rate of approximately 2.5-3.1 g/sec, this initial portion is removed, approximately, during the initial 100-150 seconds of a 630 second total brew period (as timed from initial extraction).

Additionally or alternatively, in accordance with this aspect of the invention, the instantaneous extracted coffee solids concentration associated with a middle portion (collected in one or more aliquots) of a brew (e.g., during a period immediately following the period associated with the initial portion) produced using the inventive coffee tablets may be greater than the instantaneous extracted coffee solids concentration for a middle portion of a brew produced using the corresponding untabletted coffee. The extent to which the concentration of solids will be higher with the inventive coffee tablets may depend, for example, on an increased extractability be associated with or resulting from the disruption of cellular particles within the coffee tablets. Expressed in terms of the mass of the total brew, in one example using an automatic drip coffee maker having a water delivery rate of approximately 2.5-3.1 g/sec, the mass of the middle portion is approximately 200-300 g taken immediately following the initial 200-300 g associated with the initial portion, from a total brew mass of 1330 g. Expressed in terms of the total brewing period, in one example using an automatic drip coffee maker having a water delivery rate of approximately 2.5-3.1 g/sec, this middle portion is removed, approximately, during the 80-130 seconds, immediately following the 100-150 seconds in which the initial portion is taken, of a 630 second total brew period (as timed from initial extraction).

A reduced instantaneous extracted coffee solids concentration exhibited in the initial aliquot, as provided by certain ones of the inventive coffee tablets, may be expressed as the amount of coffee solids extracted during the initial brew period, as a percentage of the total extracted coffee solids during the entire brew. In one example using an automatic drip coffee maker having a water delivery rate of approximately 2.5-3.1 g/sec, the coffee solids extracted during the first 200 g of a 1330 g brew is approximately 5-15% of the total coffee solids extracted during the entire brew, and may, for example, be approximately 5-11% of the total coffee solids extracted during the entire brew (as compared to approximately 30-60% solids extraction for a corresponding roast and ground coffee).

An increased instantaneous extracted coffee solids concentration exhibited in the middle portion, as provided by certain ones of the inventive coffee tablets, may be expressed as the amount of coffee solids extracted during the mid-range brew period (during which the one or more aliquots taken to form the middle portion of the brew are collected), as a percentage of the total extracted coffee solids during the entire brew. In one example using an automatic drip coffee maker having a water delivery rate of approximately 2.5-3.1 g/sec, the coffee solids extracted during the 250 g after the first 250 g of a 1330 g brew is approximately 35-50% of the total extracted coffee solids during the entire brew, and may, for example, be approximately 40-50% of the total coffee solids extracted during the entire brew (as compared to approximately 20-40% solids extraction for a corresponding roast and ground coffee). In another example using an automatic drip coffee maker having a water delivery rate of approximately 2.5-3.1 g/sec, the coffee solids extracted during the 200 g after the first 300 g of a 1330 g brew is approximately 33-40% of the total coffee solids extracted during the entire brew (as compared to approximately 15-27% solids extraction for a corresponding roast and ground coffee).

A reduced instantaneous extracted coffee solids concentration measured during an initial brew period, followed by an increased instantaneous extracted coffee solids concentration measured during a subsequent mid-range brew period, as provided by certain ones of the inventive coffee tablets, may be expressed as a ratio of the total coffee solids extracted during the initial brew period divided by the total coffee solids extracted during the mid-range brew period (or vice versa). As one example using an automatic drip coffee maker having a water delivery rate of approximately 2.5-3.1 g/sec, a ratio of the total coffee solids extracted during the first 250 g of a 1330 g brew to the total coffee solids extracted during the next 250 g of the brew is approximately 0.3-0.65 (as compared to a corresponding roast and ground coffee ratio of approximately 2-5). As another example using an automatic drip coffee maker having a water delivery rate of approximately 2.5-3.1 g/sec, a ratio of the total coffee solids extracted during the first 200 g of a 1330 g brew to the total coffee solids extracted during the 200 g after the first 300 g of the brew is approximately 0.18-0.31 (as compared to a corresponding roast and ground coffee ratio of approximately 1.4-3.5). As still another example using an automatic drip coffee maker having a water delivery rate of approximately 2.5-3.1 g/sec, a ratio of the total coffee solids extracted during the first 200 g of a 1330 g brew to the total coffee solids extracted during the 250 g after the first 250 g of the brew is approximately 0.14-0.25 (as compared to a corresponding roast and ground coffee ratio of approximately 1.0-2.2).

Further, the brew dynamics of the inventive tabletted coffee product may be such that after some intermediate point in the brewing process (e.g., after an initial approximately 600-850 g of a 1330 g brew) using an automatic drip coffee maker having a water delivery rate of approximately 2.5-3.1 g/sec, the cumulative mass of coffee solids extracted exceeds the cumulative mass of coffee solids extracted from brewing the same untabletted coffee in roasted and ground form at a corresponding point in its brewing process. In one such example, this intermediate point is approximately 300-360 seconds into a 630-second total brewing period.

Additionally or alternatively, the inventive coffee tablets, when brewed, may result in absorbance during an initial portion of the brew that is lower than that produced during the same initial portion of a brew when brewing the corresponding untabletted coffee. A reduced absorbance during an initial brew period, followed by an increased absorbance during a subsequent mid-range brew period, as provided by certain ones of the inventive coffee tablets, may be expressed as a ratio of the absorbance of the brew during the initial brew period divided by the absorbance of the brew during the mid-range brew period (or vice versa). As one example using an automatic drip coffee maker having a water delivery rate of approximately 2.5-3.1 g/sec, a ratio of the absorbance during the first 250 g of a 1330 g brew to the absorbance during the next 250 g of the brew is approximately 0.3-0.6 (as compared to a corresponding roast and ground coffee ratio of approximately 1.5-2.5).

Instant Coffee

In accordance with another aspect of this invention, it has been found that instant coffee when included in the inventive coffee tablets in small but suitable amounts acts as a binder, a disintegration aid and a brewing aid.

Coffee tablets formed entirely from instant coffee have been made but such products typically do not have the desired flavor and aroma characteristics of conventional ground roast coffee. Instant coffee, however, can be mixed with ground roast coffee at low levels and tabletted in accordance with the teachings herein.

The amount of instant coffee that may be included in the inventive ground roast coffee tablets in accordance with this aspect of the invention should be enough to achieve a noticeable improvement in at least one of the properties indicated above, i.e., binding strength, ease of disintegration and/or brewing efficiency, without unduly altering the flavor of the coffee brew produced. In general, this means that the amount of instant coffee included will normally be $\geq \sim 0.5$ wt. %, $\geq \sim 1$ wt. % or $\geq \sim 3$ wt. %, based on the total amount of coffee solids in the tablet (i.e., the total amount of ground roast coffee, decaffeinated ground roast coffee and instant coffee). In addition, this also means that the amount of instant coffee included will normally be ≤~15 wt. %, more typically ≤~10 wt. %, or ≤~6 wt. %, ≤~5 wt. % or even ≤~4 wt. %, based on the total amount of coffee solids in the tablet (i.e., the total amount of ground roast coffee, decaffeinated ground roast coffee and instant coffee). Embodiments in which the inventive coffee tablets contain up to 20 wt. % or even 30 wt. % instant coffee are contemplated.

The presence of instant coffee in coffee tablets can be detected by a number of different methods. The process of making instant coffee changes the composition of the coffee. One compositional change that occurs is a change in the concentration of low molecular weight carbohydrates that are present. Compounds that tend to be increased in instant coffees are monosaccharides, especially the monosaccharides mannose, arabinose, and galactose. These may be measured by a variety of methods. However, one method is described in R. M. Noyes and C. M. Chu, "Material Balance on Free Sugars in the Production of Instant Coffee", ASIC, 15$^{th}$ Colloque, Montpellier, 1993, which is incorporated herein by reference. These three compounds increase in instant coffee compared to roast ground coffee. Galactose is especially interesting because previous reports have indicated that galactose is not present in roast ground coffee. The other monosaccharides may be present in ground roast coffee, but it is believed that they are present at much lower levels than they are in instant coffee. These differences in the amount of low molecular weight carbohydrates present in tablets made from mixtures of roast ground coffee and instant coffee do not affect the flavor of the coffee brew produced, as long as the weight percent of instant coffee present in the tablets is kept within the ranges described herein. Interesting levels of these specific carbohydrates in certain embodiments of the coffee tablets include: galactose in an amount >0.0005 wt. %, or >0.001 wt. %, or >0.003 wt. %; galactose in an amount <0.012 wt. %, or <0.02 wt. %, or <0.03 wt. %; arabinose in an amount >0.0045 wt. %, or >0.005 wt. %, or >0.0075; arabinose in an amount <0.04 wt. %, or <0.07 wt. %, or <0.1 wt. %; mannose in an amount >0.007 wt. %, or >0.0075 wt. %, or >0.008 wt. %; and mannose in an amount <0.03 wt. %, or <0.04 wt. %, or <0.06 wt. %. These may be determined using a gas chromatograph as follows: samples are freeze dried to remove water prior to the analysis; samples are processed with dimethyl sulfoxide to solubilize the sugars and the solution is silated with tri-sil concentrate, which causes the free sugars to form a volatile complex which is analyzed by direct injection into a gas chromatograph. The percent relative standard deviation for this method has been determined to be 2.52% for mannitol and 1.49% for total free sugars.

Additionally, although not tested, the differences in visible appearance and the hygroscopic nature of instant coffee might permit the presence of instant coffee in a coffee tablet to be detected by a visual inspection, especially if observed under a microscope. For example, the addition of small amounts of steam to roast ground coffee will not greatly affect the roast ground coffee appearance (perhaps it will darken). In contrast, instant coffee is known to absorb steam and may appear to liquefy and perhaps "melt." This visual effect will likely be more pronounced if the tablets being tested are broken up before being steamed and viewed under a microscope. In addition, the visual inspection of a tablet under a microscope without steaming might permit a determination that instant coffee is present in the coffee tablet. This is because instant coffee is known to have a very different appearance than ground roast coffee. This different appearance may or may not be easy to detect with tablets formed from both ground roast coffee and instant coffee, as the tabletting process may change the size of the particles making the difference between instant coffee particles and ground roast coffee particles harder to see.

Drying the Coffee Beans Before Roasting

Another interesting aspect of this invention relates to controlling the size and properties of the inventive ground roast coffee tablets by low-moisture drying of the coffee beans that are used to make the ground roast coffee from which these inventive ground roast coffee tablets are subsequently made, i.e., by drying these coffee beans to a moisture content below the 12% level of conventional coffee beans prior to roasting. In particular, it is possible to reduce the friability of these tablets by a factor of as much as 2, 4, 6, 10 and even 100 by drying the coffee beans in this manner. Also, corresponding reductions in tablet volume can be achieved, which are on the order of 10%, 20% and even 30% as compared to the volume of an otherwise identical tablet made from conventionally dried coffee beans.

In accordance with this aspect of the invention, coffee beans are further dried before roasting from a conventional moisture content of ~12% to a moisture content of ≤10%, ≤8%, ≤7%, ≤6%, or even ≤5%. Thus low-moisture drying the beans to a moisture content of ~0.5 to ~10%, ~2% to ~7%, ~2% to ~6%, ~3% to ~6%, or even ~3% to ~5%, is contemplated. This additional drying may take place at the end of the standard drying or may be added as an additional drying step prior to roasting. However, in either case, the moisture should be reduced prior to roasting.

This additional drying can occur at any suitable set of conditions in one or more additional drying steps and is conveniently done by heating the coffee beans at from 70° to 325° F. (21° to 163° C.), or ~70° F. to ~300° F., ~120° F. to ~275° F., or even ~160° F. to ~250° F. over drying times lasting ~1 minute to ~24 hours, ~30 minutes to ~24 hours, ~1 hour to ~24 hours, ~1 hour to ~12 hours, ~1 hour to ~6 hours, or even ~2 hours to ~6 hours. See, for example, U.S. Pat. No. 5,322,703 and U.S. Pat. No. 5,160,757, which describe methods for low-moisture drying coffee beans prior to roasting. The disclosures of both of these patents are incorporated herein by reference.

After moisture reduction in accordance with this aspect of the invention, the low-moisture beans obtained can then be roasted by any conventional technique, as discussed above. For example, the low-moisture dried beans can be charged into a bubbling bed or fluidized bed roaster where they contact a hot air stream at inlet air temperature of from ~350° to ~1200° F. (~177° C. to ~649° C.) preferably from ~400° F. to ~800° F. (~204° C. to ~427° C.), at roast times from ~10 seconds to not longer than ~5.5 minutes, preferably from ~10 to ~47 seconds.

The low-moisture dried coffees may be used alone or in mixtures with other coffee beans, both low-moisture dried and conventionally dried.

Flavorants

Flavorants, both liquid and solid, can be included in the inventive coffee tablets in conventional amounts. Exemplary flavorants include French vanilla, hazelnut, amaretto, cappuccino, chocolate, mint, peppermint, cinnamon, vanilla, caramel, maple, toffee, pumpkin, spices, Irish Cream, Kahlua®, Crème Brulee, and nut flavors such as almond and macadamia nut, and so forth.

A number of difficulties may arise when flavorants are added to coffee products. First, flavorants are normally added at a standardized level rather than at levels specifically targeted to a type of consumer. Consequently, all consumers get the same relative amount of flavor, whether or not they prefer a higher or lower flavor intensity. Second, flavorants may segregate during shipping and handling, so that the concentration of flavoring may vary through the mass of the coffee product (for example, low at the top of the canister and high at the bottom of the canister). Third, the timing associated with when the aroma of the flavorant is released during the brewing cycle is difficult to control, even though generating different aromas at different times in the brew cycle may be desirable.

In accordance with another aspect of this invention, these problems are largely eliminated by including flavorants in the inventive coffee tablets. For example, since all the ingredients of the inventive coffee tablets have been compacted together, segregation of flavorants is largely eliminated. Additionally, the dry flavorant in U.S. Pat. No. 6,841,185 also helps prevent segregation in the in-feed to the equipment, as described in that patent. Moreover, because the inventive coffee tablets can be formulated with different flavorants, and with different amounts of flavorants, the desired flavor and intensity of a brewed coffee can be easily customized to taste, by appropriately selecting and combining different amounts of different flavored coffee tablets to use in the brewing cycle. Moreover, since the coffee tablets can be produced with the flavorants located in different portions throughout the inventive coffee tablets (e.g., in the middle, on the surface, in between the two), the timing associated with when the aroma is released in the brew cycle can also be selected and controlled.

As appreciated by coffee professionals, coffee flavorants are normally added to coffee products by means of flavor carriers that are provided to make dispensing, metering and mixing of the flavorant with the coffee product easier. Moreover, these carrier-containing flavorant compositions can be in dry, liquid, or paste forms. In accordance with this invention, some flavor carriers have surprisingly been found to act like binders in coffee tablets. Encapsulated flavorants such as those described, for example, in U.S. Pat. No. 6,841,185, can also be used. The entire disclosure of this patent is incorporated herein by reference. In this regard, it has been further found, in accordance with this aspect of the invention, that by adding flavorants to the inventive coffee tablets using the solid carriers described in U.S. Pat. No. 6,841,185, stronger tablets which generate a greater yield of coffee solids in the brewed coffee product are obtained, as compared with tablets which do not contain flavorant.

Use of a dry flavorant in formulating the inventive coffee tablets has a number of benefits. Mixing a dry flavorant with a dry coffee composition ensures that the flavor is uniformly distributed within the coffee prior to tabletting. In addition, using a dry flavor compositions allows tablets to be made in which some of the flavor can be incorporated into a separate dry layer residing on one or more surfaces, or in the middle of the tablet. It is also possible to have some of the flavor mixed in with the ground roast coffee and a second portion of the flavorant residing on the surface of the tablet or arranged in a multi-layer arrangement with other flavor layers. This not only provides an interesting visual signal to the consumer that a flavorant or flavorants are present, but it also allows for a time release characteristic associated with the release of the aroma of the flavorant to be incorporated into the tablet. For example, a first flavor layer may be placed on the outside of the tablet to release a first aroma of the first flavorant, and a second flavor layer may be placed in the inside of the tablet to release a second aroma of the second flavorant later. The first and second flavorants may have the same or different flavors and aromas.

This same effect can also be achieved with flavor "bits" which can be mixed in with the coffee and/or adhered to the surface.

Normally, the dry flavorants used in making the inventive coffee tablets will have a moisture content in the range of ~1% to ~7%, a particle density in the range of ~0.1 g/cc to ~0.8 g/cc, and a mean particle size distribution in the range of ~5 microns to ~150 microns, although dry flavorants with moisture contents, particle densities, and mean particle size distributions outside these ranges can also be used. The ratio of coffee component particle size to flavor component particle size is generally in the range of from ~100:1 to ~5:1.

When dry flavorants are used in making the inventive coffee tablets (including wet flavorants encapsulated in dry flavor carriers), they are typically present in the amount of ~0.5% to ~20% of flavorant, or ~2% to ~15%, more preferably from ~3% to ~10%, ~4% to ~8%, on a on a dry weight basis.

When liquid or paste flavorants are used in making the inventive coffee tablets, they are typically present in the amount of ~0.5% to ~20% of flavorant, or ~1.5% to ~15% or ~2% to ~12%, more preferably from ~3% to ~10%, or even ~3% to ~8%.

WORKING EXAMPLES

In order to more thoroughly describe this invention, the following working examples are presented.

In all of the working examples below, percent brew solids was calculated using a recognized correlation between the percent brew solids of the brewed coffee product and the refractive index of the brewed coffee product, with percent brew solids being calculated as $(549.209 \times RI) - 731.575$ (at a temperature basis of 20° C.). The total brew solids was then determined by multiplying the percent brew solids by the mass of brewed coffee product, and the percent yield was calculated by dividing the total extracted brew solids by the total mass of coffee placed in the brewer (multiplied by 100).

In the working examples presented in co-pending U.S. Provisional Patent Application Ser. No. 61/168,027, filed on Apr. 9, 2009 and entitled GROUND ROAST COFFEE TABLET (the entire disclosure of which is incorporated herein by reference), the calculated correlation between refractive index and percent brew solids differed from the above correlation, as percent brew solids was calculated as $(560.224 \times RI) - 746.216$ (at a temperature basis of 20° C.). Additionally, the zero point measurement for refractive index was measured at 1.33200, and has since been adjusted to 1.33204. As a result, due to changes to the temperature basis (from 20° C. to 29° C.) and the zero point measurement for refractive index, the calculated percent brew solids, total brew solids, and percent yield in the earlier working examples were approximately 15% greater than the corresponding calculated values determined and presented herein. For the working examples that have been re-presented in the present application, the percent brew solids, total brew solids, and percent yield have been adjusted to correspond to the newly adopted correlations and measurements (i.e., based on percent brew solids=$(549.209 \times RI) - 731.575$, and RI zero point=1.33204).

Example 1

Pre-Compression

Brazilian arabica coffee beans were roasted and ground. This ground roast coffee had a Hunter L-color of 17.9, a bulk density of 0.294 $g/cm^3$ and a mean particle size of 885 microns. The ground roast coffee so made was formed into cylindrical tablets containing ~2.65 gms ground roast coffee (moisture content 4.75%) and having a diameter of about 24 to 24.5 mm by means of a Fette Model 2200SE multiple station tabletting machine operating at a rate of 90,000 tablets per hour (over 3000 tablets per hour per station and a dwell time of ~14 millisecond) under different conditions in which the compaction force in the main or primary compactions step was held constant but the compaction force in pre-compression step was varied.

The hardness of the tablets so made was determined using a Varian VK200 Tablet Hardness tester set in the N (Newton) mode, while the friability of the tablets obtained using a Varian Friabilator having a dual chamber drum by rotating 25 grams of the tablets in the drum of the machine for 100 revolutions at a rate of 25 rpm and then determining the amount of these tablets that passes through a #4 American Standard Wire Mesh screen. Multiple tablets were tested for each batch of tablets made.

The tablets so formed were then brewed into brewed coffee with Mr. Coffee® Model DR13 coffee makers, having a water delivery rate of approximately 2.75 g/sec, using 10 tablets (~26.5 gms) and 1420 ml of water for each batch of brewed coffee brewed. For comparison purposed, a control experiment was run in the same way but using 29.5 gms conventional coffee, i.e., ground roast coffee in untabletted form.

The Yield was calculated based on the grams of coffee solids recovered in the in the brewed coffee (as determined by the mass and % brew solids in this brewed coffee product). Meanwhile, the Yield ratio was determined by comparing the Yield of coffee solids obtained when using inventive coffee tablets in comparison with the yield of coffee solids obtained in a control experiment in which untabletted coffee was used. The absorbance was measured by placing a sample of the brewed coffee in an 8 ml sealed vial, cooling the sample for 15 minutes at room temperature; transferring the sample to a cuvette and measuring the absorbance in a Genesys 10 Spectrophotometer at 480 nm wavelength. The absorbance per gram was calculated by dividing the absorbance by the total mass of the coffee tablets used in the brew.

The results obtained are set forth in the following Table 1:

TABLE 1

| Example 1 - Test Conditions and Results | | | | | | | | | |
|---|---|---|---|---|---|---|---|---|---|
| Initial Comp, kN | Final Comp, kN | Tablet Mass, g | % Friability | Hardness, N | density, g/cm$^3$ | % Yield | Yield Ratio | Absorbance | Abs/ gram |
| 4.9 | 39.6 | 2.62 | 18 | 33.1 | 0.90 | 29.8 | 1.22 | 1.808 | 0.069 |
| 20 | 39.7 | 2.68 | 2.5 | 50.8 | 0.96 | 30.1 | 1.23 | 1.763 | 0.066 |
| 29.7 | 39.7 | 2.66 | 6.1 | 45.0 | 0.96 | 27.6 | 1.13 | 1.750 | 0.065 |
| 37.6 | 39.7 | 2.63 | 4.5 | 46.5 | 0.95 | 29.6 | 1.21 | 1.821 | 0.069 |

As can be seen from this table, increasing the force used in the pre-compression step increases the hardness and reduces the friability of the tablets obtained without adversely the yield of the coffee solids contained in the finish coffee obtained. Note, also, that the tablets with better hardness/friability profiles had densities of 0.95 g/cm$^3$ or greater. In addition, the ratio between the compression forces used in the pre-compression and main compression steps ranged from ~50% to ~95%. Finally, also note that the yield ratio was greater than 1 for each experiment in this example, thereby indicating that the amount of coffee solids extracted from a given amount of ground roast coffee is significantly greater when that coffee is formulated into coffee tablets in accordance with this invention rather than being used in a conventional (untabletted) form.

Example 2

Pre-Compression

Example 1 was repeated using a coffee comprising a mixture of arabica and robusta coffee beans. The ground roast coffee so made had a bulk density of 0.28 g/cm$^3$ prior to compaction with a mean particle size of 720 microns. The tablets had a moisture content of about 4.7%. Tablet mass was about 2.45 grams and 10 tablets were brewed.

The results obtained are set forth in the following Table 2:

TABLE 2

| Example 2 - Test Conditions and Results | | | | | | | | | |
|---|---|---|---|---|---|---|---|---|---|
| Initial Comp, kN | Final Comp, kN | Tablet Mass, g | % Friability | Hardness, N | density, g/cm$^3$ | % Yield | Yield Ratio | Absorb | Abs/g |
| 5 | 50 | 2.44 | 20.7 | 30 | 0.89 | 29.4 | 1.16 | 1.935 | 0.080 |
| 19.9 | 49.9 | 2.40 | 2.0 | 47.1 | 0.97 | 29.6 | 1.17 | 1.904 | 0.079 |
| 20.5 | 51 | 2.46 | 2.4 | 46.7 | 0.97 | 29.3 | 1.16 | 1.938 | 0.079 |
| 30.3 | 50.6 | 2.46 | 6.1 | 46.4 | 0.98 | 28.5 | 1.13 | 1.951 | 0.079 |
| 40.2 | 50.2 | 2.45 | 6.6 | 40.8 | 0.98 | 28.2 | 1.11 | 1.939 | 0.080 |

As can be seen from Table 2, increasing the ratio of the forces used in the pre-compression and main compression steps dramatically reduced friability, while increasing hardness. As in Example 1, the Yield Ratio for each experiment in this example also significantly exceeded 1, thereby further demonstrating that more coffee solids are extracted from the inventive tablets than are extracted from an equivalent amount of ground roast coffee in untabletted form. Note also that the best products (i.e., tablets having the highest hardnesses and lowest friabilities) had densities of 0.97 to 0.98 g/cm$^3$ and that the ratio of pre-compression to main compression forces ranged from ~40% to ~80%.

Example 3

Pre-Compression

Examples 1 and 2 were repeated, except that a different blend of arabica and robusta coffees was used, the ground roast coffee produced having a density of 0.33 g/cm³ and a mean particle size of 806 microns was used. The tablets were about 3 grams in mass with a moisture content of about 5.2%. For brewing, 29.9 to 30.5 grams of tablets were used while 33.32 grams of ground roast coffee was used in the control experiment.

The results obtained are set forth in the following Table 3:

TABLE 3

Example 3 - Test Conditions and Results

| Initial Comp, kN | Final Comp, kN | Tablet Mass, g | % Friability | Hardness, N | density, g/cm³ | % Yield | Yield Ratio | Absorb | Abs/g |
|---|---|---|---|---|---|---|---|---|---|
| 0.4 | 40 | 2.96 | 12.7 | 41.8 | 0.91 | 31.1 | 1.22 | 2.109 | 0.071 |
| 5.4 | 40.3 | 3.05 | 12.2 | 43.1 | 0.93 | 32.7 | 1.29 | 2.108 | 0.070 |
| 20.3 | 40.3 | 3.05 | 4.2 | 54.9 | 0.96 | 32.0 | 1.26 | 2.223 | 0.073 |
| 30.2 | 40.9 | 2.99 | 4.9 | 57 | 0.95 | 28.7 | 1.13 | 2.135 | 0.071 |
| 38.1 | 40.7 | 3.00 | 5.8 | 58.8 | 0.97 | 28.6 | 1.12 | 2.200 | 0.073 |

As can be seen from Table 3, a large drop in friability was observed when the ratio of the force used in the pre-compression step to the main compression step increased to ~0.14:1 (14%) or more. The densities of these low friability products exceeded 0.95 g/cm³, even though the yield ratio was maintained well above 1.

Example 4

Pre-Compression

Example 3 was repeated using a higher force for the main compression step.

The results obtained are set forth in the following Table 4:

TABLE 4

Example 4 - Test Conditions and Results

| Initial Comp, kN | Final Comp, kN | Tablet Mass, g | % Friability | Hardness, N | density, g/cm³ | % Yield | Yield Ratio | Absorb | Abs/g |
|---|---|---|---|---|---|---|---|---|---|
| 5.4 | 50.6 | 2.98 | 17.4 | 45.1 | 0.96 | 30.1 | 1.18 | 2.273 | 0.076 |
| 19.9 | 50.8 | 2.99 | 4.2 | 56.1 | 0.98 | 30.2 | 1.18 | 2.214 | 0.074 |
| 29.8 | 50.5 | 3.02 | 3.6 | 59.6 | 0.99 | 28.6 | 1.12 | 2.174 | 0.072 |
| 40.8 | 50.1 | 2.99 | 8.3 | 63.0 | 1.01 | 32.1 | 1.26 | 2.184 | 0.073 |

Again, a dramatic drop in friability and an increase in hardness was observed. In this case, all products had densities greater than 0.96, without adversely affecting yield, while the ratio of pre-compression to main compression forces ranged from ~37% to ~82% in the tablets exhibiting good friability. It should be noted that going to higher final compression alone did not yield an improved friability, hardness, or yield.

Example 5

Addition of Instant Coffee

Coffee A was prepared from a mixture of ground roast arabica and robusta coffees. Coffee B was prepared by forming a blend comprising 95.2 wt. % of Coffee A and 4.8 wt. % of commercially-available Folgers® brand instant coffee.

Coffees A and B were each made into tablets weighing about 3 grams each using a Fette Model 2090 rotary tablet press set up to subject the tablets to a two-step compaction process in which the pre-compression step was carried out at a lower compaction force than the main compression step. Tablets were made using seven different operating conditions. These conditions were some combination of changes in operating speed (rpm), pre-compression force, and/or main compression force. After compression, 10 tablets were brewed in a Mr. Coffee® Accel (Model PRX 23) ADC coffee-maker. After brewing, the percent of solids extracted into the brew was measured by refractive index, which was then converted into total solids extracted. The yield of the roast and ground ("R&G") coffee was calculated based on amount of solids extracted divided by weight of coffee put into the brewer. The yield of coffee solids extracted from the ground roast coffee portions of the respective "Coffee B's" was determined by assuming 100% extraction of the instant coffee and subtracting the mass of the instant coffee from the total solids extracted.

The following results were obtained:

TABLE 5

Example 5 - Test Conditions and Results

| Coffee | Run | Tablet Mass, g | % Brew Solids | Solids in Brew, g | R&G extracted, g | R&G Yield | Tablet Vol. $cm^3$ | Tablet Volume at same Brew Solids $cm^3$ |
|---|---|---|---|---|---|---|---|---|
| A | 1 | 3.17 | 0.65 | 8.58 | 8.58 | 0.27 | 3.17 | 3.17 |
| B | 1 | 3.08 | 0.82 | 10.72 | 9.24 | 0.32 | 3.11 | 2.47 |
| A | 2 | 3.05 | 0.62 | 8.13 | 8.13 | 0.27 | 3.09 | 3.09 |
| B | 2 | 2.98 | 0.80 | 10.59 | 9.16 | 0.32 | 2.98 | 2.32 |
| A | 3 | 3.06 | 0.64 | 8.46 | 8.46 | 0.28 | 3.18 | 3.18 |
| B | 3 | 3.07 | 0.82 | 10.84 | 9.37 | 0.32 | 3.16 | 2.48 |
| A | 4 | 2.98 | 0.60 | 7.89 | 7.89 | 0.26 | 3.06 | 3.06 |
| B | 4 | 3.0 | 0.71 | 9.40 | 7.96 | 0.28 | 3.05 | 2.58 |
| A | 5 | 3.0 | 0.60 | 7.96 | 7.96 | 0.27 | 3.03 | 3.03 |
| B | 5 | 3.01 | 0.71 | 9.40 | 7.96 | 0.28 | 2.95 | 2.57 |
| A | 6 | 2.9 | 0.55 | 7.33 | 7.33 | 0.25 | 3.01 | 3.01 |
| B | 6 | 3.0 | 0.93 | 12.23 | 10.79 | 0.38 | 3.1 | 1.85 |
| A | 7 | 2.94 | 0.76 | 10.09 | 10.09 | 0.34 | 2.93 | 2.93 |
| B | 7 | 3.04 | 0.79 | 10.40 | 8.94 | 0.31 | 3.01 | 2.92 |
| Mean of A | | 3.01 | 0.63 | 8.35 | 8.35 | 0.28 | 3.06 | 3.06 |
| Mean of B | | 3.03 | 0.80 | 10.51 | 9.06 | 0.32 | 3.05 | 2.42 |
| Ratio | | | | 1.26 | | 1.14 | | 0.79 |

In the table above, the conversion from % Brew Solids to Solids in Brew was based on an assumption that 1320 ml of liquid brew was obtained for all products. This is a reasonable value for what one would expect to come out of a brew basket based on using 1420 mls of water going into the brew. (This is different from what was done in examples 1, 2, 3, 4, and 8 where the actual amount of liquid brew was measured and used.)

As can be seen, the addition of the instant coffee not only gave higher overall brew solids, but also increased the yield of the coffee solids extracted from the ground roast (R&G) coffee used. That is to say, more coffee solids was extracted from a given amount of ground roast coffee when instant coffee was also included in the inventive coffee tablets as compared to essentially identical coffee tablets not containing instant coffee.

The last column on the right of Table 1 shows a calculated tablet size that would be obtained if the tablets made from Coffee B were resized to give the same overall extraction yield as the tablets made from Coffee A. As can be seen, the resized tablets made from Coffee B would be 20% smaller than the tablets made only from Coffee A.

Example 6

Addition of Instant Coffee

Additional data was collected from the same runs disclosed above in Example 5. This additional data is shown in Table 6 below as well as attached FIG. 2 in which the labels for each data point gives the fill volume for the die.

TABLE 6

Example 6 - Test Conditions and Results

| Coffee | Run | RPM | Fill Volume | Tablet Mass | Fill Density |
|---|---|---|---|---|---|
| A | 1 | 17.47 | 9.12 | 3.17 | 0.348 |
| B | 1 | 17.24 | 8.23 | 3.08 | 0.374 |
| A | 2 | 17.47 | 9.12 | 3.05 | 0.334 |
| B | 2 | 17.24 | 8.23 | 3.0 | 0.365 |
| A | 3 | 34.48 | 9.12 | 3.06 | 0.336 |
| B | 3 | 34.48 | 8.45 | 3.07 | 0.363 |
| A | 4 | 34.48 | 9.12 | 2.98 | 0.327 |
| B | 4 | 34.48 | 8.45 | 2.99 | 0.354 |
| A | 5 | 34.48 | 9.12 | 3.00 | 0.329 |
| B | 5 | 34.48 | 8.45 | 3.01 | 0.356 |
| A | 6 | 51.72 | 9.565 | 2.90 | 0.303 |
| B | 6 | 50.63 | 9.12 | 3.00 | 0.329 |
| A | 7 | 51.72 | 9.565 | 2.94 | 0.307 |
| B | 7 | 50.63 | 9.12 | 3.04 | 0.333 |
| Mean of A | | | 9.247 | 3.014 | 0.326 |
| Mean of B | | | 8.579 | 3.027 | 0.353 |
| Ratio | | | 0.928 | 1.004 | 1.083 |

Figure 2:
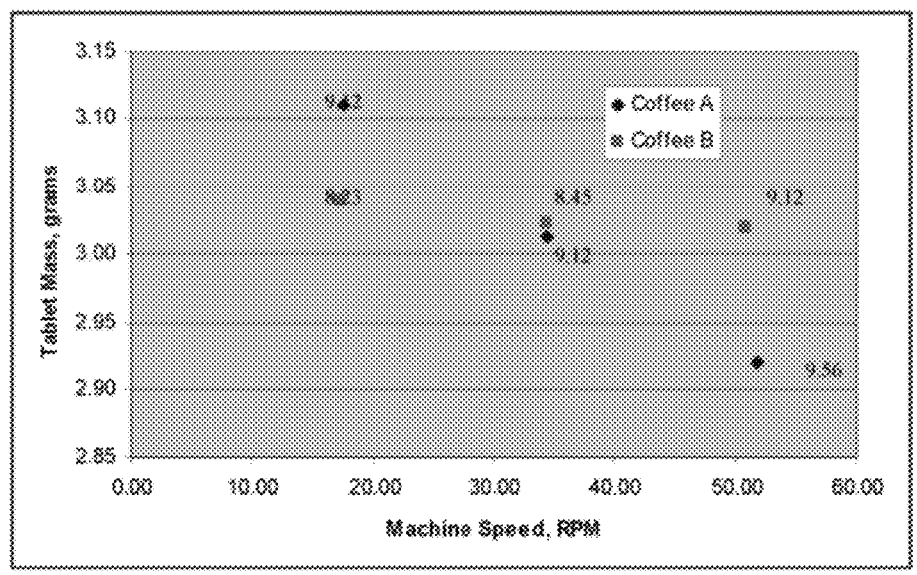
FIG. 2 shows the results obtained in the following working Example 6 and illustrates how including instant coffee in the inventive ground roast coffee tablets allows a more efficient fill and higher operating speeds of the automatic tabletting machine used to make these tablets.

From Table 6 and FIG. 2, it can be seen that the fill volume for Coffee B was less than the fill volume for Coffee A for each run. Note, also, that the mass of Coffee A decreased, while that of Coffee B remained fairly constant. In addition, although the fill volume for Coffee A increased, it was always larger than the fill volume for Coffee B. Comparing especially the highest machine speed, the fill volume for Coffee B was 5% less than for Coffee A, yet the tablet mass was 4% higher.

This shows that including instant coffee in the inventive ground roast coffee tablets allows a more efficient fill of the individual dies, and hence higher operating speeds of the machine, before machine capacity is limited by die filling. This effect, coupled with the lower mass made possible by including instant coffee, as described in Example 5, enables even higher machine operating speeds to be obtained.

The operating speed of tabletting machines should not be increased so high that tablet mass decreases appreciably or varies unacceptably for a given ground roast coffee. If tablets are underweight relative to other tablets made from the same ground roast coffee, a consumer may be dissatisfied because brewing the tablets will result in too weak of a brew. Additionally, if the tablet mass varies too much for a given ground roast coffee, a consumer may be discouraged from using the tablets because the resulting brew differs too much from use to use.

Example 7

Low-Moisture Drying of Coffee Beans

Coffee A was made by roasting Mexican arabica coffee beans in a Neuhaus Neotec roaster for 3.3 minutes to an L-color of 12.2. Coffee B was made from the same Mexican arabica coffee beans, which were low-moisture dried to a moisture content of 5 wt. % before roasting, and then roasted in a Neuhaus Neotec roaster for 2.3 minutes to an L-color of 12.6. Both coffees were ground roast to a similar mean particle size (~760 microns), with Coffee A exhibiting a moisture content of 4.9% and a density of 0.27 g/cm$^3$ while Coffee B exhibited a moisture content of 5.0% and a density of 0.22 g/cm$^3$. Both coffees were then made into tablets having a nominal diameter of 23.8 mm using a Fette Model 2200 rotary tablet press operating at a pre-compression force of 35 kN, a main compression force of 40 kN and an operating speed of 17.2 rpm. The mass of the ground roast coffee fed to the machine was varied such that tablets made from Coffee A averaged 2.8 grams while those from coffee B averaged 2.0 grams. Tablet A had an average volume of 2.9 cm$^3$ while tablet B had an average volume of 2.0 cm$^3$, a 30% reduction in volume. Friability was measured and was found to be 0.95% for Coffee A and 0.06% for Coffee B, which represents a reduction of over 90%, or by a factor of over 15.

After production, tablets were brewed in a Mr. Coffee® Accel (Model PRX 23) automatic drip coffeemaker. Brewing was conducted with 10 cups of water. Total coffee used was 30.9 g for coffee A and 30.6 g for coffee B. After brewing the % brew solids in the brewed coffee made from coffee A was found to be 0.66 wt. %, while the % brew solids for the brewed coffee made from coffee B was found to be 0.64 wt. %. In addition, the yield for coffee A was found to be 28.4%, while the yield for coffee B was found to be 27.7%, even though coffee tablets B were ~30% smaller.

As can be seen from this experiment, although much smaller tablets were made in the case of Coffee B, the extraction of coffee solids from Coffee B was essentially the same as that for Coffee A. Moreover, the friability of the tablets made from Coffee B was lower than the friability of the tablets made from Coffee A.

Example 8

Low-Moisture Drying of Coffee Beans

Example 7 was repeated using different machine operating conditions for making the tablets. Table 7 compares the results obtained using low-moisture dried coffee beans and non-low-moisture dried (conventionally dried) coffee beans.

TABLE 7

Example 8 - Test Conditions and Results

| Run | Coffee | RPM | Compression, kN Pre- | Compression, kN Main | % Friability | Tablet Mass | Brew Mass | Brew Solids | Tablet Volume |
|---|---|---|---|---|---|---|---|---|---|
| A | Regular | 17.2 | 16 | 21 | 1.26 | 2.84 | 31.3 | 0.75 | 3.2 |
|   | Dried | 17.2 | 15 | 20 | 0.31 | 1.99 | 29.8 | 0.61 | 2.2 |
| B | Regular | 17.2 | 16 | 40 | 1.69 | 2.86 | 31.4 | 0.67 | 3.01 |
|   | Dried | 17.2 | 16 | 40 | 0.10 | 2.06 | 31.0 | 0.68 | 2.17 |
| C | Regular | 17.2 | 26 | 42 | 0.96 | 2.85 | 31.3 | 0.75 | 3.55 |
|   | Dried | 17.2 | 25 | 40 | 0.10 | 2.02 | 30.2 | 0.7 | 2.06 |
| D | Regular | 34.5 | 16 | 40 | 1.54 | 2.84 | 31.3 | 0.75 | 3.06 |
|   | Dried | 34.5 | 16 | 39 | 0.04 | 1.97 | 31.5 | 0.63 | 2.09 |
| E | Regular | 34.5 | 25 | 30 | 1.56 | 2.64 | 29.6 | 0.6 | 2.84 |
|   | Dried | 34.5 | 25 | 31 | 0.29 | 1.96 | 31.4 | 0.73 | 2.05 |
| F | Regular | 34.5 | 36 | 40 | 1.44 | 2.78 | 30.1 | 0.76 | 2.87 |
|   | Dried | 34.5 | 35 | 41 | 0.18 | 1.97 | 29.5 | 0.65 | 1.99 |

The mean values for the results obtained in Example 8, as reported in Table 7, are reported in Table 8 below:

TABLE 8

Example 8 - Mean Values for Test Results

| Set | Coffee | % Friability | Tablet Mass | Brewing Mass | Brew Solids | Tablet Volume |
|---|---|---|---|---|---|---|
| Mean | Regular | 1.41 | 2.80 | 30.8 | 0.71 | 3.10 |
| Mean | Dried | 0.17 | 2.00 | 30.6 | 0.67 | 2.10 |

The mean values for the combined results obtained in Examples 7 and 8 are reported in Table 9 below:

TABLE 9

Examples 7 and 8 - Mean Values for Test Results from Both Examples

| Comparison | Coffee | % Friability | Tablet Mass | Brewing Mass | Brew Solids | Tablet Volume | % Yield |
|---|---|---|---|---|---|---|---|
| Mean | Regular | 1.34 | 2.81 | 30.8 | 0.71 | 3.07 | 24.5 |
| Mean | Dried | 0.15 | 2.00 | 30.6 | 0.66 | 2.09 | 32.4 |

From Tables 7, 8 and 9, it can be seen that reducing the moisture content of the ground roast coffee before roasting enabled a reduction in friability of about 90% and a reduction in tablet volume of about 30%.

Example 9

Low-Moisture Drying of Coffee Beans

A regular roast, ground roast coffee was made using 55% arabica coffee beans and 45% robusta coffee beans. On average, the coffee beans were roasted to a Hunter L color of about 15.7 L over a roast period of about 3.2 minutes. All coffees were treated by typical processing to provide ground roast coffees have a typical particle size of approximately 825 microns and a typical density of about 0.33 g/cm$^3$. A ground roast coffee was made from 10% regular ground roast arabica coffee, 40% regular ground roast robusta coffee, and 50% ground roast arabica coffee derived from coffee beans that had been low-moisture dried to a moisture content of about 5% to produce a ground roast coffee mixture comprising 60% arabica and 40% robusta coffees, the coffee mixture having a mean particle size of ~635 microns and a density of ~0.247 g/cm$^3$. The roasted, ground roast coffees so made were formed into tablets in a similar manner to that of the above Examples 7 and 8 using various different operating conditions. The tablets so obtained were then used to brew brewed coffees in the same manner as described above in connection with Examples 7 and 8. The various conditions used and the results obtained are shown in the following Table 10.

TABLE 10

Example 9 - Test Conditions and Results

| Run | Coffee | Rate | Compression, kN Pre | Compression, kN Main | % Friability | Tablet Mass | Brew Mass | Brew Solids | Tablet Volume |
|---|---|---|---|---|---|---|---|---|---|
| A | Regular | 17.2 | 15 | 21 | 66.19 | 3.0 | 30.3 | 0.7 | 3.86 |
|   | Dried | 17.2 | 16 | 21 | 1.43 | 2.8 | 31.1 | 1.05 | 3.43 |
| B | Regular | 17.2 | 16 | 40 | 1.62 | 3.2 | 31.7 | 0.77 | 3.17 |
|   | Dried | 17.2 | 16 | 41 | 0.45 | 3.0 | 29.8 | 0.77 | 2.98 |
| C | Regular | 17.2 | 23 | 40 | 1.06 | 3.1 | 30.5 | 0.73 | 3.09 |
|   | Dried | 17.2 | 24 | 42 | 0.16 | 2.8 | 31.3 | 0.71 | 2.81 |
| D | Regular | 17.2 | 24 | 60 | 1.57 | 3.15 | 31.46 | 0.78 | 3.07 |
|   | Dried | 17.2 | 25 | 60 | 0.22 | 2.95 | 29.5 | 0.77 | 2.85 |
| E | Regular | 17.2 | 35 | 40 | 0.78 | 3.02 | 30.26 | 0.63 | 3.0 |
|   | Dried | 17.2 | 36 | 41 | 0.08 | 2.82 | 30.99 | 0.78 | 2.76 |
| F | Regular | 34.5 | 15 | 41 | 3.03 | 3.06 | 30.61 | 0.75 | 3.18 |
|   | Dried | 34.5 | 16 | 40 | 0.31 | 2.86 | 31.46 | 0.80 | 2.93 |
| G | Regular | 34.5 | 16 | 61 | 3.97 | 3.13 | 31.23 | 0.75 | 3.14 |
|   | Dried | 34.5 | 16 | 61 | 0.38 | 2.92 | 29.17 | 0.77 | 2.92 |
| H | Regular | 34.5 | 26 | 41 | 1.38 | 2.98 | 29.77 | 0.70 | 3.06 |
|   | Dried | 34.5 | 25 | 43 | 0.14 | 2.83 | 30.97 | 0.78 | 2.82 |
| I | Regular | 51.7 | 16 | 40 | 4.13 | 2.91 | 29.11 | 0.75 | 3.10 |
|   | Dried | 51.1 | 15 | 41 | 0.76 | 2.58 | 30.98 | 0.80 | 2.73 |
| H | Regular | 51.7 | 25 | 41 | 2.32 | 2.9 | 29.23 | 0.65 | 3.01 |
|   | Dried | 52.4 | 25 | 40 | 0.72 | 2.59 | 30.78 | 0.66 | 2.66 |
| I | Regular | 51.7 | 24 | 60 | 2.28 | 2.94 | 32.02 | 0.9 | 2.93 |
|   | Dried | 52.2 | 24 | 61 | 0.52 | 2.61 | 30.9 | 0.8 | 2.60 |
| J | Regular | 52.2 | 31 | 50 | 2.93 | 2.87 | 31.33 | 0.77 | 2.88 |
|   | Dried | 52.5 | 30 | 50 | 4.44 | 2.6 | 31.18 | 0.73 | 2.6 |

The mean values for the results obtained in Example 9, as reported in Table 10, are reported in Table 11 below:

TABLE 11

Example 9 - Mean Values for Test Results

| Comparison | Coffee | Rate | % Friability | Tablet Mass | Brewing Mass | Brew Solids | Tablet Volume |
|---|---|---|---|---|---|---|---|
| Mean | Regular |  | 7.61 | 3.02 | 30.63 | 0.74 | 3.12 |
| Mean | Dried |  | 0.80 | 2.78 | 30.68 | 0.79 | 2.84 |

Because the first friability data point reported in Table 10 (Run A, Regular Coffee, Friability) appears to be a bad data point, the following Table 12 reports the mean values obtained in Table 10 with this bad data point being excluded.

TABLE 12

Example 9 - Mean Values for Test Results with Bad Data Point Excluded

| Comparison | Coffee | Rate | % Friability | Tablet Mass | Brewing Mass | Brew Solids | Tablet Volume |
|---|---|---|---|---|---|---|---|
| Mean | Regular |  | 2.28 | 3.02 | 30.66 | 0.74 | 3.06 |
| Mean | Dried |  | 0.74 | 2.78 | 30.64 | 0.76 | 2.79 |

Tables 10, 11 and 12 show that forming the inventive ground roast coffee tablets from 50% low-moisture dried coffee beans, at least when roasted quickly to a dark color, reduced the friability of these tablets by about 65% (or, by a factor of more than 3) compared with otherwise identically prepared tablets made from ground roasted coffees derived from conventionally dried (~12% moisture content) coffee beans roasted to comparable colors (i.e., within about two Hunter L units). In addition, a 9% reduction in tablet volume was also achieved relative to tablets made with the conventionally dried coffee beans.

Roast and ground coffee from pre-dried green coffee that has not been quickly roasted to a dark enough color does not appear to provide improved friability (i.e., does not provide decreased friability) relative to non-pre-dried green coffee. For example, pre-dried coffee roasted to 18.8 L and then ground and tabletted did not show an improved friability vis-à-vis normal moisture beans or vis-à-vis a 50/50 mix of pre-dry and normal moisture green coffee.

Example 10

Liquid Flavor Carrier

Additional coffee tablets were made using the inventive multi-step compaction process in general accordance with Examples 1-4 in which the magnitude of the initial compression step as well as the speed of the press, as measured by dwell time in the main compression step were varied. The results obtained are set forth in the following Table 15 (runs b and d are from Example 3):

TABLE 15

Example 10-Set 1 - Test Conditions and Results

| Run | Ktab/hr | Dwell Time, msec | Initial Compression, kN | Final Compression, kN | Hardness, N | Friability, % |
|---|---|---|---|---|---|---|
| a | 60 | 21.0 | 20.5 | 40.7 | 60.5 | 2.3 |
| b | 90 | 14.0 | 20.3 | 40.3 | 54.9 | 4.2 |
| c | 120 | 10.5 | 20 | 40.2 | 43.0 | 9.1 |
| d | 90 | 14.0 | 0.4 | 40 | 41.8 | 12.7 |

By comparing Runs b and d, which were carried out at the same production rate (90,000 tablets/hr with a dwell time of 14.0 milliseconds), it can be seen that (as in the case of Examples 1-4) the both hardness and friability are improved when the force encountered in the initial compression step was more than about 20% of the force encountered in the main or primary compression step in accordance with this invention. It will also be noted, however, that as the production rate of the inventive tablets increased (runs a through c), hardness and friability declined somewhat (although both were still better than the control, Run d).

Another set of experiments similar to Set 1 above was run using a different coffee. The results obtained are set forth in the following Table 16:

TABLE 16

Example 10-Set 2 - Test Conditions and Results

| Run | Ktab/hr | Dwell Time, msec | Initial Compression, kN | Final Compression, kN | Hardness, N | Friability, % |
|-----|---------|------------------|-------------------------|-----------------------|-------------|---------------|
| e   | 90      | 14.0             | 30.7                    | 49.6                  | 56.3        | 4.7           |
| f   | 120     | 10.5             | 29.9                    | 49.2                  | 43.4        | 9.0           |
| g   | 130     | 9.7              | 30.8                    | 49.8                  | 42.1        | 11.8          |

Again, these results show the same trend as in the above Set 1, i.e., that as the production rate of the inventive tablets increased, hardness and friability declined somewhat.

Still another set of experiments similar to Sets 1 and 2 above was run using the same coffee and conditions of Set 2, except that the inventive tablets contained 3 wt. % of a liquid flavor carrier comprising propylene glycol and triacetin. The results obtained are set forth in the following Table 17:

TABLE 17

Example 10-Set 3 - Test Conditions and Results

| Run | Ktab/hr | Dwell Time, msec | Initial Compression, kN | Final Compression, kN | Hardness, N | Friability, % |
|-----|---------|------------------|-------------------------|-----------------------|-------------|---------------|
| h   | 90      | 14.0             | 30.7                    | 49.5                  | 79.2        | 0.9           |
| i   | 120     | 10.5             | 29.2                    | 49.4                  | 71.8        | 1.5           |
| j   | 130     | 9.7              | 29.2                    | 50.3                  | 74.5        | 2.1           |

These results show the same trend as in the above Sets 1 and 2, i.e., that as the production rate of the inventive tablets increased, hardness and friability declined somewhat. However, Table 17 shows that the magnitude of this effect is greatly reduced due to the presence of the liquid flavor carrier.

Example 11

Liquid Flavor Carrier

Brazilian coffee beans were roasted and ground. This ground roast coffee had a Hunter L-color of 16.8 a bulk density of 0.31 g/cm$^3$ and a mean particle size of 890 microns. The roasted and ground coffee was separated into three batches. One batch was mixed with 3 wt. % propylene glycol (PG), based on the total weight of the composition obtained. A second batch was mixed 3 wt. % of a 90/10 w/w mixture of propylene glycol and triacetin (PG/TriA). No flavor carrier was added to the third batch, although it was mixed in a similar manner to the other batches. All mixing was done using a Forberg mixer.

Each of the three batches were made into tablets using a Fette 2200 SE tabletting press at a variety of conditions. Hardness was measured immediately after production and again at least 6 days after production. Friability was measured at least 6 days after production.

All tablets were brewed in a Mr. Coffee® Accel (Model PRX 23) ADC coffee-maker. Approximately 26 grams of tablets were brewed for each product. The % brew solids and the yield of coffee solids obtained in the final product were also determined.

Nine different runs were made at different operating conditions, each run comparing the three different batches of tablets as described above. Table 18 below shows the mean values obtained for the hardness, friability, and brew yields obtained for each of these experiments.

TABLE 18

Example 11-Set 1 - Results Obtained

| Coffee | Initial Hardness, N | Final Hardness, N | Hardness Change, N | % Friability | % Brew Solids | % Yield | Absorbance |
|--------|---------------------|-------------------|---------------------|--------------|---------------|---------|------------|
| Control | 54.8 | 47.8 | −7.0 | 7.8 | 0.72 | 35.1 | 1.88 |
| Control + propylene glycol | 77.6 | 79.8 | 2.2 | 1.1 | 0.8 | 39.2 | 2.1 |
| Control | 56.4 | 49.7 | −6.7 | 6.3 | 0.73 | 35.3 | 1.88 |
| Control + liquid mixture | 69.8 | 71.5 | 1.7 | 1.9 | 0.78 | 37.8 | 2.15 |

As can be seen from Table 18, the addition of the liquid carrier gave increased hardness and lower friability without impairing brewing performance. Moreover, addition of the liquid carrier also prevented the tablets from experiencing the same small yet still significant decrease in hardness within their first week of manufacture shown by the Control tablets.

Additionally, the liquid flavor carriers appear to be so effective that use of such liquid flavor carriers can make very low pre-compression forces viable at a high rate of manufacture (and perhaps will make no pre-compression tablets viable at high rates of manufacture). The following Table 19 shows examples of products made with low initial compression. They are not as good as tablets made with a higher initial compression; however, they may be commercially acceptable.

TABLE 19

Example 11-Set 2 - Results Obtained

| Coffee | Ktab/hr | Dwell Time, msec | Initial Compression, kN | Final Compression, kN | Hardness, N | Friability, % |
|---|---|---|---|---|---|---|
| C-2 + PG | 90 | 14.0 | 0.4 | 40.2 | 65.7 | 2.07 |
| C-2 + PG/TriA | 90 | 14.0 | 0.3 | 40.8 | 49.3 | 8.38 |
| C-2 + PG/TriA | 90 | 14.0 | 5 | 40.2 | 49.6 | 5.10 |
| C-2 + PG/TriA | 90 | 14.0 | 0.3 | 19.8 | 33.0 | 9.86 |
| C-2 | 90 | 14.0 | 4.9 | 40.8 | 42.3 | 8.27 |

Example 12

Dry Flavorant

A brewed coffee was made with added dry French Vanilla flavor added at 3% w/w level. The flavor compound was intended to be used at a nominal 3% level (as discussed above in connection with the discussion of flavor carriers and flavorants). The coffee was turned into tablets in accordance with this invention using a Fette Model 2090 rotary tablet press. Compression conditions used were pre-compression of 22 kN and a main compression of 35 kN in a rotary press having 29 stations with round dies of nominally 23.8 mm in diameter and operating at a speed of 25.9 rpm, thereby producing 45,000 tablets per hour (about 1550 tablets per set of compressions per die per hour; the other values herein for tablets per hour using the Fette Model 2090 rotary tablet press can be converted to tablets per set of compressions per die per hour by dividing the hourly rate by 29 (there are 29 stations in the press used). In the case of rpm, the tablets per set of compressions per die per hour may be obtained by multiplying the rpm by 60 minutes per hour). The tablets obtained had an average mass of 2.87 grams, an average hardness of 112 N and an average friability of 0.26%.

After production, the tablets were filled into metalized tin cans. Another set of cans was filled with a control sample composed of the roast ground coffee from which the tablets were made in untabletted form. Cans were sealed and stored at 70° F. After two weeks, these products were evaluated for the concentration of certain volatiles in the outgas obtained from these products at the time they were removed from their respective cans.

In particular, for the control sample of conventional ground roast coffee, a coffee sample was removed from the can and placed in a closed container. In the case of the inventive coffee tablets, the tablets were gently broken apart to a particle size roughly equivalent to that of the conventional ground roast coffee of the control sample, and placed in a closed container. The outgas from the closed container of the conventional ground roast coffee and the broken apart tablets were analyzed. The concentrations of 25 different compounds were measured by gas chromatography, some representing the coffee volatiles recovered from the ground roast coffee in both examples and others representing the French Vanilla flavorant. The data obtained was normalized to enable a direct comparison of the concentrations of these ingredients in their respective outgases to one another.

Figure 3:
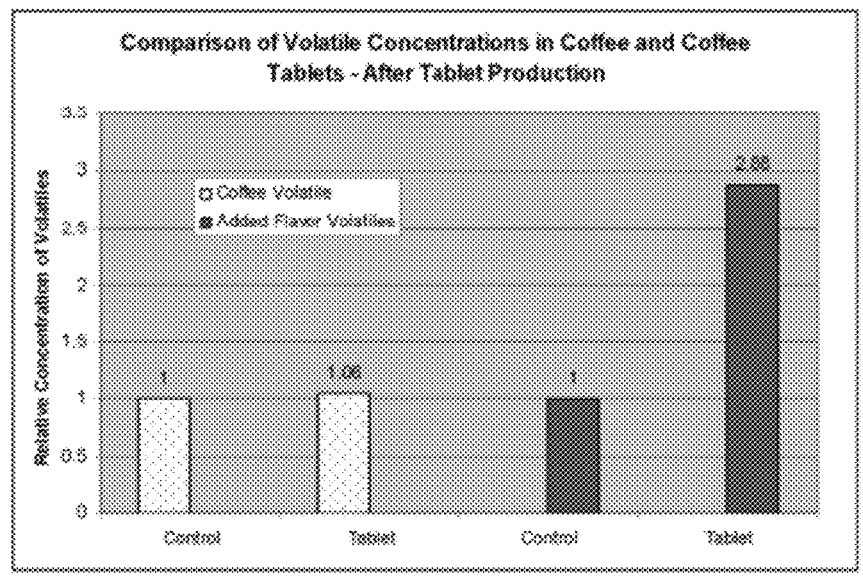
FIGS. 3 and 4 illustrate the results obtained in the following working Example 11 in which a flavorant is included in the inventive ground roast coffee tablets.

The results obtained are provided in FIG. 3. As can be seen from this figure, the coffee volatiles outgassed from both samples, i.e., the conventional (untabletted) coffee and the inventive coffee tablets, are essentially the same.

Figure 4:
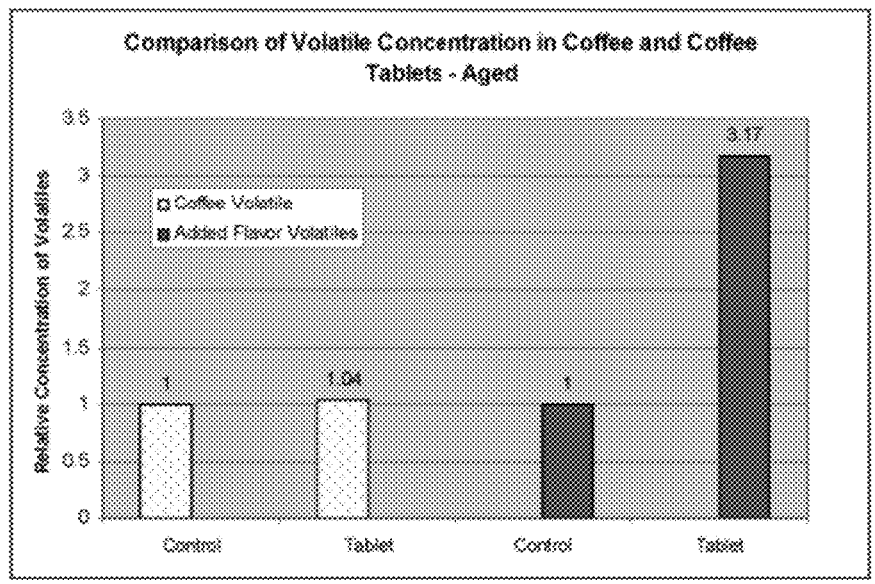

Approximately 15 months after the samples mentioned above were analyzed, additional samples were taken from previously unopened cans of both the inventive coffee tablets and the conventional (untabletted) coffee. The above tests were repeated, and the results obtained reported in FIG. 4. As can be seen from this figure, essentially the same results were obtained.

Table 20, below, shows additional data collected with respect to the Examples above:

TABLE 20

Example 12 - Results Obtained

| Example | coffee | Bulk Density g/cm3 | L-color | Mean particle Size, microns | Q250, % | % Lipid | water/lipid | % H2O tablet | % H2O roast ground | Aw Tablet |
|---|---|---|---|---|---|---|---|---|---|---|
| 1 | | 0.294 | 17.9 | 885 | 8.6 | 13.3 | 0.358 | 4.75 | 4.7 | 0.343 |
| 2 | | 0.28 | 15.0 | 720 | 12.9 | 11.6 | 0.402 | 4.7 | 4.6 | 0.344 |
| 3 and 4 | | 0.33 | 16.8 | 806 | 10.9 | 10.2 | 0.507 | 5.2 | 4.8 | 0.379 |
| 5 and 6 | A | 0.33 | | 825 | | | | 5.0 | 4.8 | |
| 5 and 6 | B | | | | instant added to coffee A | | | | | |
| 7 and 8 | A | 0.27 | 12.2 | 754 | | | | 4.9 | | |
| 7 and 8 | B | 0.22 | 12.6 | 765 | | | | 5.0 | | |
| 9 | Regular | 0.33 | | 825 | | | | 5.0 | 4.8 | |
| 9 | Dried | 0.247 | | 635 | | | | 4.5 | | |
| 10 | Set 1 | 0.33 | 16.8 | 806 | 10.9 | 10.2 | 0.507 | 5.2 | 4.8 | 0.38 |
| 10 | Set 2 | 0.31 | 16.8 | 890 | 7.4 | 13.0 | 0.408 | 5.3 | 5.1 | 0.39 |
| 10 | Set 3 | | | same coffee as set 2 but with liquid flavor carrier | | | | | | |
| 11 | control | 0.31 | 16.8 | 890 | 7.4 | 13.0 | 0.408 | 5.3 | 5.1 | 0.39 |
| 12 | | 0.29 | 19.8 | 763 | | | | | 4.9 | |

Example 13

Liquid Flavor Carrier

Two additional sets of coffee product were tabletted using varying amounts of liquid flavor carrier and varying levels of pre-compression and main compression. The first set of tabletted product used roasted and ground Brazilian coffee beans, with a Hunter L-color of ~18.8, a bulk density of ~0.293 g/cm$^3$, a mean particle size of ~874 microns, and a moisture content of ~3.2%. The first set of roasted and ground coffee was separated into five batches. Four of the batches were mixed with propylene glycol ("LFC") at levels of 0.5 wt. %, 1.0 wt. %, 3.5 wt. %, and 6.0 wt. %, respectively. The fifth batch included no added liquid flavor carrier, but was mixed in a similar manner to the other batches. All mixing was done using a Forberg mixer.

Each of the five batches were made into tablets using a Fette 2200 SE tabletting press at a variety of pre-compression and main compression forces. All tablets were produced at a rate of 90,000 tablets per hour. Hardness was measured immediately after production and again at least 6 days after production. Friability was measured at least 6 days after production. The results of these measurements are listed below in Table 21.

TABLE 21

Example 13 - Set 1, Results Obtained

| % LFC, Pre/Main | Initial Hardness, N | Final Hardness, N | Friability, % |
|---|---|---|---|
| 0%, 0/20 kN | 18.7 | 18.4 | 50.1 |
| 0%, 0/40 kN | 22.7 | 25.3 | 27.5 |
| 0%, 10/20 kN | 18.0 | 17.5 | 62.4 |
| 0%, 20/30 kN | 40.1 | 34.1 | 11.5 |
| 0%, 20/40 kN | 38.3 | 36.1 | 8.2 |
| 0.5%, 0/20 kN | 24.8 | 18.7 | 46.9 |
| 0.5%, 0/40 kN | 35.7 | 29.6 | 16.9 |
| 0.5%, 10/20 kN | 22.3 | 18.2 | 54.3 |
| 0.5%, 20/30 kN | 49.3 | 36.3 | 2.7 |
| 0.5%, 20/40 kN | 49.0 | 43.0 | 2.3 |
| 1.0%, 0/20 kN | 27.7 | 20.7 | 42.7 |
| 1.0%, 0/40 kN | 44.0 | 36.5 | 7.2 |
| 1.0%, 10/20 kN | 26.7 | 19.5 | 7.2 |
| 1.0%, 20/30 kN | 54.7 | 46.2 | 1.5 |
| 1.0%, 20/40 kN | 55.0 | 50.0 | 1.5 |
| 3.5%, 0/20 kN | 53.7 | 47.9 | 2.3 |
| 3.5%, 0/40 kN | 60.5 | 71.7 | 0.5 |
| 3.5%, 10/20 kN | 50.2 | 44.8 | 3.0 |
| 3.5%, 20/30 kN | 81.5 | 88.2 | 0.23 |
| 3.5%, 20/40 kN | 72.8 | 90.6 | 0.26 |
| 6.0%, 0/20 kN | 46.7 | 64.5 | 0.1 |
| 6.0%, 0/40 kN | 40.0 | 77.4 | 0.7 |
| 6.0%, 10/20 kN | 48.0 | 66.8 | 0.15 |
| 6.0%, 20/30 kN | 53.5 | 95.6 | 0.08 |
| 6.0%, 20/40 kN | 48.3 | 93.9 | 0.00 |

The second set of tabletted product also used roasted and ground Brazilian coffee beans, with a Hunter L-color of ~18.8, a bulk density of ~0.293 g/cm$^3$, a mean particle size of ~874 microns, and a moisture content of ~4.6%. The roasted and ground coffee was separated into three batches. One batch was mixed with ~3 wt. % propylene glycol (PG), based on the total weight of the composition obtained. A second batch was mixed with ~3 wt. % of a 90/10 w/w mixture of propylene glycol and triacetin (PG/TriA). No flavor carrier was added to the third batch, although it was mixed in a similar manner to the other batches. All mixing was done using a Forberg mixer.

Each of the three batches were made into tablets using a Fette 2200 SE tabletting press at a variety of pre-compression and main compression forces. All tablets were produced at a rate of 90,000 tablets per hour. Hardness was measured immediately after production and again at least 6 days after production. Friability was measured at least 6 days after production. The results of these measurements are listed below in Table 22. The minimal improvements in hardness and friability that accompanied the increases in liquid flavor concentration, as compared to the significant improvements observed in the test results of Example 10 and Example 13, set 1, suggest these results may be bad data, although this has not been confirmed.

TABLE 22

Example 13 - Set 2, Results Obtained

| % LFC, Pre/Main | Initial Hardness, N | Final Hardness, N | Friability, % |
|---|---|---|---|
| 0%, 0/20 kN | 32.0 | 23.5 | 35.8 |
| 0%, 0/40 kN | 43.8 | 40.0 | 11.5 |
| 0%, 10/20 kN | 30.0 | 25.4 | 35.7 |
| 0%, 20/30 kN | 58.0 | 47.5 | 2.2 |
| 0%, 20/40 kN | 59.0 | 51.4 | 1.2 |
| 1.0%, 0/20 kN | 35.5 | 25.3 | 26.8 |
| 1.0%, 0/40 kN | 47.4 | 41.7 | 8.3 |
| 1.0%, 10/20 kN | 31.3 | 23.1 | 32.6 |
| 1.0%, 20/30 kN | 65.3 | 52.6 | 1.3 |
| 1.0%, 20/40 kN | 61.7 | 53.8 | 1.1 |
| 3.5%, 0/20 kN | 37.3 | 26.3 | 18.7 |
| 3.5%, 0/40 kN | 50.8 | 44.3 | 4.9 |
| 3.5%, 10/20 kN | 38.0 | 25.4 | 23.2 |
| 3.5%, 20/30 kN | 66.8 | 54.5 | 1.4 |
| 3.5%, 20/40 kN | 65.2 | 54.7 | 1.7 |

Example 14

Low Pre-Compression Tablets

Coffee beans including a mixture of washed arabicas, naturals, and robustas were roasted and ground, producing a ground coffee having a Hunter L-color of ~13.4, a bulk density of ~0.275 g/cm$^3$ and a mean particle size of ~709 microns, and a moisture content of ~4.5%. Tablets were formed using varying pre-compression and final or main compression, and the hardness and friability of each tablet was calculated in a manner consistent with that described in Example 1. The results obtained are set forth in the following Table 23:

TABLE 23

Example 14 - Results Obtained

| Ktab/hr | Dwell Time, msec | Initial Compression, kN | Final Compression, kN | Tablet Density, g/cm$^3$ | Hardness, N | Friability, % |
|---|---|---|---|---|---|---|
| 82 | 15.3 | 0.5 | 9 | 0.640 | 7.4 | 81.7 |
| 82 | 15.3 | 0.5 | 20.7 | 0.817 | 26.5 | 13.7 |
| 82 | 15.3 | 0.4 | 25.2 | 0.859 | 29.5 | 10.4 |
| 82 | 15.3 | 0.6 | 41 | 0.894 | 22.8 | 16.9 |
| 82 | 15.3 | 10.3 | 24.8 | 0.871 | 35.8 | 8.5 |
| 82 | 15.3 | 5 | 39 | 0.878 | 21.9 | 23.3 |

As shown, in tablets formed using very low pre-compression (less than 1 kN), initial increases in final or main compression (from 9 kN to 25.2 kN) improve hardness and friability, while further increases in main compression (from 25.2 kN to 41 kN) actually diminish hardness and friability (i.e., decrease hardness and increase friability), even though the density of the tablet has increased. Further, a tablet with a lower main compression (24.8 kN) but higher pre-compression (10.3 kN) may provide improved hardness and friability as compared to a tabled formed with a higher main compression (39 kN) and a lower pre-compression (5 kN).

Example 15

Pre-Compression

Brazilian coffee beans were roasted and ground. This ground roast coffee had a Hunter L-color of ~18.8, a bulk density of ~0.301 g/cm$^3$, a mean particle size of ~878 microns, and a moisture content of ~4.8%. The ground roast coffee so made was formed into cylindrical tablets containing ~2.6-2.7 g ground roast coffee and having a diameter of about 24 to 24.5 mm by means of a Fette Model 2200SE multiple station tabletting machine operating at rates of 70,000 and 90,000 tablets per hour under different conditions in which the compaction forces in the pre-compression and main or primary compaction steps were varied.

The hardness and friability of the tablets were tested in a manner consistent with the tablets of Example 1. The tablets so formed were then brewed in a manner consistent with the tablets of Example 1.

The Yield was calculated based on the grams of coffee solids recovered in the brewed coffee (as determined by the mass and % brew solids in this brewed coffee product). Meanwhile, the Yield ratio was determined by comparing the Yield of coffee solids obtained when using inventive coffee tablets in comparison with the yield of coffee solids obtained in a control experiment in which untabletted coffee was used.

The results obtained are set forth in the following Table 24:

ground. This ground roast coffee had a Hunter L-color of about 17-8, a bulk density of ~0.288 g/cm$^3$ a mean particle size of about 700-800 microns, and a moisture content of ~4.43%. The ground roast coffee so made was formed into cylindrical tablets containing ~2.66 gms ground roast coffee and having a diameter of about 24 to 24.5 mm by means of a Fette Model 2200SE multiple station tabletting machine operating at rates of 70,000 and 80,000 tablets per hour under different conditions in which the compaction forces in the pre-compression and main or primary compaction steps were varied.

The hardness of the tablets so made was determined using a Varian VK200 Tablet Hardness tester set in the N (Newton) mode, while the friability of the tablets obtained using a Varian Friabilator having a dual chamber drum by rotating 25 grams of the tablets in the drum of the machine for 100 revolutions at a rate of 25 rpm and then determining the amount of these tablets that passes through a #4 American Standard Wire Mesh screen. Multiple tablets were tested for each batch of tablets made.

The tablets so formed were then brewed into brewed coffee with Mr. Coffee® Model DR13 coffee makers, using 10 tablets (~26.5 gms) and 1420 ml of water for each batch of brewed coffee brewed. For comparison purposes, a control experiment was run in the same way but using 26.5 gms conventional coffee, i.e., around roast coffee in untabletted form.

The Yield was calculated based on the grams of coffee solids recovered in the brewed coffee (as determined by the

TABLE 24

Example 15 - Results Obtained

| Dense tab | ktab/hr | Pre Comp | Main Comp | Hard | Fri | Br Index | Yield Index | absorb index | absorb | Abs/g |
|---|---|---|---|---|---|---|---|---|---|---|
| 0.859 | 70 | 4 | 27 | 44.53 | 3.40 | 1.141 | 1.143 | 1.272 | 1.614 | 0.061 |
| 0.883 | 70 | 13.3 | 30.3 | 46.59 | 2.10 | 1.187 | 1.207 | 1.207 | 1.532 | 0.057 |
| 0.868 | 70 | 0.7 | 30.4 | 45.13 | 2.76 | 1.164 | 1.183 | 1.204 | 1.528 | 0.058 |
| 0.883 | 70 | 13.3 | 30.3 | 46.59 | 2.10 | 1.187 | 1.207 | 1.207 | 1.532 | 0.057 |
| 0.913 | 70 | 20 | 30.7 | 57.12 | 0.98 | 1.118 | 1.140 | 1.235 | 1.567 | 0.059 |
| 0.889 | 70 | 0.6 | 45.2 | 46.55 | 8.14 | 1.141 | 1.149 | 1.253 | 1.590 | 0.060 |
| 0.923 | 70 | 12.9 | 40.3 | 54.66 | 1.40 | 1.118 | 1.133 | 1.227 | 1.557 | 0.059 |
| 0.934 | 70 | 20 | 38.5 | 59.97 | 1.02 | 1.198 | 1.187 | 1.255 | 1.593 | 0.060 |
| 0.901 | 70 | 0.6 | 51.2 | 47.86 | 5.03 | 1.187 | 1.186 | 1.285 | 1.631 | 0.061 |
| 0.952 | 70 | 29.5 | 51.4 | 58.30 | 1.78 | 1.141 | 1.147 | 1.251 | 1.588 | 0.060 |
| 0.767 | 90 | 0.5 | 21.2 | 28.03 | 18.49 | 1.095 | 1.102 | 1.132 | 1.436 | 0.054 |
| 0.827 | 90 | 20.5 | 23.4 | 41.24 | 2.07 | 1.095 | 1.124 | 1.149 | 1.458 | 0.055 |
| 0.838 | 90 | 20 | 21 | 42.68 | 2.21 | 1.107 | 1.106 | 1.199 | 1.521 | 0.057 |
| 0.876 | 90 | 0.5 | 39.2 | 41.08 | 9.66 | 1.232 | 1.240 | 1.259 | 1.598 | 0.060 |
| 0.899 | 90 | 13 | 34.9 | 46.64 | 3.10 | 1.118 | 1.118 | 1.209 | 1.534 | 0.057 |
| 0.918 | 90 | 20.2 | 34.8 | 54.97 | 0.72 | 1.187 | 1.191 | 1.218 | 1.546 | 0.058 |
| 0.878 | 90 | 0.7 | 51.1 | 40.15 | 7.57 | 1.175 | 1.200 | 1.254 | 1.591 | 0.060 |
| 0.877 | 90 | 0.5 | 51.1 | 39.54 | 8.40 | 1.141 | 1.151 | 1.279 | 1.623 | 0.062 |
| 0.911 | 90 | 12.7 | 51.8 | 44.17 | 2.77 | 1.130 | 1.133 | 1.228 | 1.558 | 0.058 |
| 0.957 | 90 | 45.1 | 51.4 | 53.46 | 2.67 | 1.175 | 1.193 | 1.245 | 1.580 | 0.060 |

Example 16

Pre-Compression

Coffee beans including a mixture of washed arabicas, naturals, dried coffees, and robustas were roasted and mass and percent brew solids in this brewed coffee product). Meanwhile, the Yield ratio was determined by comparing the Yield of coffee solids obtained when using inventive coffee tablets in comparison with the yield of coffee solids obtained in a control experiment in which untabletted coffee was used.

The results obtained are set forth in the following Table 25:

TABLE 25

Example 16 - Results Obtained

| Dense tab | ktab/hr | Pre Comp | Main Comp | Hard | Fri | Br Index | Yield Index | absorb index | absorb | Abs/g |
|---|---|---|---|---|---|---|---|---|---|---|
| 0.955 | 70 | 4.7 | 51.6 | 50.3 | 6.46 | 1.09 | 1.11 | 1.186 | 1.78 | 0.067 |
| 0.956 | 70 | 12.9 | 38.4 | 57.1 | 2.87 | 1.04 | 1.11 | 1.124 | 1.69 | 0.0662 |
| 0.955 | 70 | 13.4 | 45.9 | 60.4 | 0.98 | 1.13 | 1.14 | 1.226 | 1.84 | 0.0692 |
| 0.909 | 70 | 3.7 | 45.1 | 49.83 | 11.28 | 1.136 | 1.158 | 1.212 | 1.82 | 0.0692 |
| 0.916 | 70 | 5.3 | 45.3 | 49.40 | 12.28 | 1.146 | 1.157 | 1.218 | 1.83 | 0.0692 |
| 0.955 | 70 | 13.4 | 45.9 | 60.43 | 0.98 | 1.125 | 1.136 | 1.226 | 1.84 | 0.0692 |
| 0.955 | 70 | 4.7 | 51.6 | 50.29 | 6.46 | 1.094 | 1.113 | 1.186 | 1.78 | 0.067 |
| 1.012 | 70 | 29.3 | 51.8 | 71.49 | 1.46 | 1.094 | 1.101 | 1.176 | 1.76 | 0.0664 |
| 0.833 | 80 | 3.8 | 26.9 | 33.46 | 3.23 | 1.094 | 1.094 | 1.216 | 1.82 | 0.0684 |
| 0.856 | 80 | 13.5 | 27.3 | 38.27 | 2.71 | 1.115 | 1.108 | 1.214 | 1.82 | 0.0683 |

Example 17

High Hardness Tablets without a Binder

Coffee 17A was prepared from coffee beans including a mixture of arabicas, dried arabicas, and robustas, roasted and ground to a Hunter L-color of ~18, a bulk density of ~0.3125 g/cm³, a mean particle size of ~760 microns, and a moisture content of ~4.72%. Coffee 17B was prepared from coffee beans including a mixture of arabicas, dried arabicas, and robustas, roasted and ground to a Hunter L-color of ~18, a bulk density of ~0.3125 g/cm³, a mean particle size of ~760 microns, and a moisture content of ~5.25%. Coffee 17C was prepared from decaffeinated coffee beans, roasted and ground to a bulk density of ~0.323 g/cm³, a mean particle size of ~782 microns, and a moisture content of ~4.79%. Coffee 17D was prepared from coffee beans including a mixture of washed arabicas, naturals, and robustas having a Hunter L-color of ~15.4, a bulk density of ~0.285 g/cm³, a mean particle size of ~710 microns, and a moisture content of ~4.89%. Coffee 17E was prepared from 10% regular ground roast arabica coffee, 40% regular ground roast robusta coffee, and 50% ground roast arabica coffee derived from coffee beans that had been low-moisture dried to a moisture content of about 5% to produce a ground roast coffee mixture comprising 60% arabica and 40% robusta coffees, the coffee mixture having a Hunter L color of ~15.7, a mean particle size of ~635 microns, a density of ~0.247 g/cm³ and a moisture content of ~4.46%.

Coffees 17A, 17B, 17C, 17D, and 17E were each made into tablets weighing about 2.66 grams each (ranging from about 2.62 g to about 2.70 g) using a Fette Model 2090 rotary tablet press set up to subject the tablets to a two-step compaction process in which the pre-compression step was carried out at a lower compaction force than the main compression step. Tablets were made using several different operating conditions. These conditions were some combination of changes in operating speed (rpm) and resulting compression dwell time, pre-compression force, and/or main compression force. Samples of the tablets from each run were tested for hardness and friability, with average values calculated for each of these properties. After compression, 10 tablets from each run were brewed in a Mr. Coffee® Accel (Model PRX 23) ADC coffee-maker. After brewing, the percent of solids extracted into the brew was measured by refractive index, which was then converted into total solids extracted.

As shown in Table 26 below, tablets having very high hardnesses (i.e., >90N) were able to be produced without the aid of binders.

TABLE 26

Example 17 - Results Obtained

| Run | Coffee | tabs/hr | Rotor rpm | dwell, ms | Pre Comp, kN | Main Comp, kN | pre/main | avg mass | avg Hard | % Fri | Brew Solids | tab density |
|---|---|---|---|---|---|---|---|---|---|---|---|---|
| 301 | 17A | 30,000 | 17.2 | 41.9 | 16.4 | 39.5 | 0.42 | 2.90 | 92.1 | 0.32 | 0.697 | 0.964 |
| 302 | 17A | 30,000 | 17.2 | 41.9 | 24.8 | 40.6 | 0.61 | 2.80 | 95.5 | 0.81 | 0.754 | 0.979 |
| 225 | 17B | 29,500 | 17.0 | 42.6 | 16.7 | 41 | 0.41 | 3.14 | 104.3 | 0.38 | 0.754 | 0.978 |
| 224 | 17B | 30,000 | 17.2 | 41.9 | 25.5 | 38.5 | 0.66 | 3.03 | 117.4 | 0.41 | 0.709 | 1.003 |
| 93 | 17C | 60,000 | 34.5 | 21.0 | 35.5 | 45.4 | 0.78 | 3.01 | 92.3 | 1.05 | 0.725 | 1.021 |
| 85 | 17C | 30,400 | 17.5 | 41.4 | 15.9 | 35.3 | 0.45 | 3.18 | 94.2 | 1.77 | 0.748 | 0.982 |
| 84A | 17C | 30,300 | 17.4 | 41.5 | 25.5 | 40.6 | 0.63 | 3.02 | 97.1 | 0.64 | 0.703 | 0.988 |
| 86 | 17C | 30,000 | 17.2 | 41.9 | 15.9 | 45.5 | 0.35 | 3.19 | 104.4 | 0.74 | 0.776 | 1.006 |
| 91 | 17C | 30,000 | 17.2 | 41.9 | 35 | 34.9 | 1.00 | 2.99 | 108.0 | 0.35 | 0.709 | 1.008 |
| 87 | 17C | 29,500 | 17.0 | 42.6 | 24.7 | 45.5 | 0.54 | 3.13 | 108.8 | 0.54 | 0.77 | 1.023 |
| 92 | 17C | 30,000 | 17.2 | 41.9 | 34.9 | 46 | 0.76 | 3.01 | 110.3 | 2.10 | 0.714 | 0.999 |
| 8 | 17D | 30,600 | 17.6 | 41.1 | 21 | 42.7 | 0.49 | 2.90 | 104.4 | 0.30 | 0.737 | 1.001 |
| 2 | 17D | 29,600 | 17.0 | 42.5 | 20.8 | 40.9 | 0.51 | 2.89 | 106.2 | 0.20 | 0.731 | 1.013 |
| 250 | 17E | 60,000 | 34.5 | 21.0 | 15.9 | 60.8 | 0.26 | 2.92 | 90.6 | 0.38 | 0.77 | 0.999 |
| 247 | 17E | 60,000 | 34.5 | 21.0 | 24.9 | 42.7 | 0.58 | 2.83 | 94.1 | 0.14 | 0.782 | 1.002 |
| 248 | 17E | 60,000 | 34.5 | 21.0 | 29.2 | 40.6 | 0.72 | 2.78 | 96.8 | 0.26 | 0.686 | 1.007 |
| 241 | 17E | 30,000 | 17.2 | 41.9 | 15.6 | 40.9 | 0.38 | 2.98 | 102.2 | 0.45 | 0.765 | 0.999 |
| 243 | 17E | 30,300 | 17.4 | 41.5 | 25.2 | 59.5 | 0.42 | 2.95 | 103.2 | 0.22 | 0.77 | 1.035 |

TABLE 26-continued

Example 17 - Results Obtained

| Run | Coffee | tabs/hr | Rotor rpm | dwell, ms | Pre Comp, kN | Main Comp, kN | pre/ main | avg mass | avg Hard | % Fri | Brew Solids | tab density |
|---|---|---|---|---|---|---|---|---|---|---|---|---|
| 244 | 17E | 30,000 | 17.2 | 41.9 | 35.9 | 41.4 | 0.87 | 2.82 | 111.4 | 0.08 | 0.776 | 1.023 |
| 242 | 17E | 30,000 | 17.2 | 41.9 | 24.2 | 41.5 | 0.58 | 2.84 | 114.0 | 0.16 | 0.714 | 1.009 |

Example 18

Hardness and Friability as a Function of Density, Pre-Compression

Coffee 18A was prepared from coffee beans including a mixture of washed arabicas, naturals, dried coffees, and robustas, roasted and ground to a Hunter L-color of about 17-18, a bulk density of ~0.288 g/cm$^3$, a mean particle size of about 700-800 microns, and a moisture content of ~4.43%. Coffee 18B was prepared from Brazilian coffee beans, roasted and ground to a Hunter L-color of ~18.8, a bulk density of ~0.301 g/cm$^3$, a mean particle size of ~878 microns, and a moisture content of ~4.8%. Coffees 18A and 18B were then each made into tablets weighing about 3 grams each using a Fette Model 2090 rotary tablet press set up to subject the tablets to a two-step compaction process in which the pre-compression step was carried out at a lower compaction force than the main compression step. Tablets were made using several different operating conditions. These conditions were some combination of changes in operating speed (rpm) (and resulting compression dwell time), pre-compression force, and/or main compression force. Samples of the tablets from each run were initially tested for hardness and density, with average values calculated for each of these properties. At least 6 days after production, additional samples of each run were tested for hardness, density, and friability, with average values calculated for each of these properties. These results were arranged by final density for each coffee, as shown in Table 27 below.

As shown in Table 27, tablets having similar densities exhibited widely varying friabilities and hardnesses.

TABLE 27

Example 18 - Results Obtained

| coffee name | Rate (ktab/hr) | Pre Comp (kN) | Main Comp (kN) | Dense tab | Hard | Fri |
|---|---|---|---|---|---|---|
| 18A | 80 | 3.8 | 26.9 | 0.833 | 33.46 | 3.23 |
| 18A | 70 | 13.1 | 25 | 0.845 | 35.93 | 13.69 |
| 18A | 70 | 4.9 | 27.9 | 0.847 | 38.76 | 2.79 |
| 18A | 80 | 13.5 | 27.3 | 0.856 | 38.27 | 2.71 |
| 18A | 80 | 8.9 | 29.8 | 0.861 | 40.36 | 2.08 |
| 18A | 80 | 3.6 | 36.9 | 0.878 | 41.64 | 9.40 |
| 18A | 70 | 5.6 | 30.6 | 0.880 | 44.39 | 2.00 |
| 18A | 70 | 9 | 30.7 | 0.886 | 45.10 | 1.85 |
| 18A | 80 | 3.8 | 43.2 | 0.895 | 42.43 | 9.79 |
| 18A | 80 | 13.5 | 33.2 | 0.899 | 47.32 | 1.27 |
| 18A | 70 | 4.9 | 34.6 | 0.900 | 49.16 | 2.59 |
| 18A | 70 | 20.2 | 30.2 | 0.902 | 47.31 | 1.49 |
| 18A | 70 | 12.9 | 29.9 | 0.902 | 47.15 | 2.29 |
| 18A | 80 | 3.6 | 45.1 | 0.903 | 42.20 | 10.19 |
| 18A | 80 | 20.6 | 32.4 | 0.905 | 50.96 | 1.06 |
| 18A | 70 | 13.4 | 33.6 | 0.906 | 51.53 | 1.25 |
| 18A | 70 | 3.7 | 45.1 | 0.909 | 49.83 | 11.28 |
| 18A | 80 | 3.7 | 53.2 | 0.915 | 48.67 | 8.41 |
| 18A | 70 | 5.3 | 45.3 | 0.916 | 49.40 | 12.28 |
| 18A | 70 | 19.9 | 37.3 | 0.918 | 52.53 | 1.00 |
| 18A | 70 | 4.8 | 47.5 | 0.922 | 53.13 | 6.70 |
| 18A | 80 | 13.3 | 39.9 | 0.930 | 54.39 | 1.12 |
| 18A | 70 | 13.4 | 40.4 | 0.935 | 57.47 | 1.13 |
| 18A | 80 | 13.3 | 45.1 | 0.938 | 56.04 | 1.33 |
| 18A | 80 | 19.9 | 39.9 | 0.940 | 58.68 | 0.64 |
| 18A | 70 | 20.2 | 40.1 | 0.942 | 61.37 | 0.61 |
| 18A | 70 | 13.4 | 45.9 | 0.955 | 60.43 | 0.98 |
| 18A | 70 | 4.7 | 51.6 | 0.955 | 50.29 | 6.46 |
| 18A | 70 | 12.9 | 38.4 | 0.956 | 57.06 | 2.87 |
| 18A | 70 | 20 | 50.6 | 0.969 | 63.27 | 0.75 |
| 18A | 80 | 38.8 | 51.4 | 0.983 | 64.58 | 1.72 |
| 18A | 70 | 29.3 | 51.8 | 1.012 | 71.49 | 1.46 |
| 18B | 90 | 0.5 | 21.2 | 0.767 | 28.03 | 18.49 |
| 18B | 90 | 20.5 | 23.4 | 0.827 | 41.24 | 2.07 |
| 18B | 90 | 20 | 21 | 0.838 | 42.68 | 2.21 |
| 18B | 70 | 12.3 | 25 | 0.847 | 40.89 | 3.09 |
| 18B | 90 | 0.5 | 30.6 | 0.858 | 40.46 | 7.33 |
| 18B | 70 | 4 | 27 | 0.859 | 44.53 | 3.40 |
| 18B | 70 | 20 | 25.3 | 0.861 | 46.34 | 1.95 |
| 18B | 90 | 13.6 | 28 | 0.868 | 43.46 | 2.79 |
| 18B | 70 | 0.7 | 30.4 | 0.868 | 45.13 | 2.76 |
| 18B | 90 | 0.5 | 39.2 | 0.876 | 41.08 | 9.66 |
| 18B | 90 | 0.5 | 51.1 | 0.877 | 39.54 | 8.40 |
| 18B | 90 | 0.7 | 51.1 | 0.878 | 40.15 | 7.57 |
| 18B | 70 | 13.3 | 30.3 | 0.883 | 46.59 | 2.10 |
| 18B | 70 | 0.6 | 34.7 | 0.887 | 46.49 | 3.63 |
| 18B | 70 | 0.6 | 45.2 | 0.889 | 46.55 | 8.14 |
| 18B | 70 | 0.6 | 47.4 | 0.894 | 47.00 | 5.04 |
| 18B | 70 | 13.1 | 31.2 | 0.897 | 49.61 | 1.51 |
| 18B | 90 | 13 | 34.9 | 0.899 | 46.64 | 3.10 |
| 18B | 70 | 0.6 | 51.2 | 0.901 | 47.86 | 5.03 |
| 18B | 70 | 13.15 | 35.9 | 0.906 | 49.51 | 1.49 |
| 18B | 90 | 12.7 | 51.8 | 0.911 | 44.17 | 2.77 |
| 18B | 70 | 20 | 30.7 | 0.913 | 57.12 | 0.98 |
| 18B | 90 | 20.2 | 34.8 | 0.918 | 54.97 | 0.72 |
| 18B | 70 | 12.9 | 40.3 | 0.923 | 54.66 | 1.40 |
| 18B | 90 | 20.4 | 44.2 | 0.932 | 54.27 | 1.46 |
| 18B | 70 | 20 | 38.5 | 0.934 | 59.97 | 1.02 |
| 18B | 70 | 29.5 | 51.4 | 0.952 | 58.30 | 1.78 |
| 18B | 90 | 45.1 | 51.4 | 0.957 | 53.46 | 2.67 |
| 18B | 70 | 12.9 | 37.4 | | 50.45 | 1.55 |
| 18B | 70 | 12.9 | 45.2 | | 51.06 | 1.70 |
| 18B | 70 | 17.1 | 37 | | 53.93 | 0.79 |
| 18B | 70 | 17 | 45.6 | | 55.74 | 1.09 |
| 18B | 90 | 13 | 29.9 | | 43.42 | 2.68 |
| 18B | 90 | 12.9 | 36.7 | | 45.20 | 3.38 |
| 18B | 90 | 13 | 44.9 | | 48.28 | 2.76 |
| 18B | 70 | 5.3 | 30.6 | | 43.54 | 4.30 |
| 18B | 70 | 5.3 | 36.8 | | 45.96 | 4.71 |
| 18B | 70 | 5.2 | 45.5 | | 43.92 | 6.02 |

Example 19

Brew Dynamics

Coffee 19A was prepared from coffee beans including a mixture of washed arabicas, naturals, dried coffees, and robustas, roasted and ground to a Hunter L-color of about 17-18, a bulk density of ~0.288 g/cm³, a mean particle size of about 700-800 microns, and a moisture content of ~4.43%, and was made into tablets in five separate runs (A, B, C/D, E, and F), the tablets weighing about 2.65 grams each, using a Fette Model 2090 rotary tablet press set up to subject the tablets to a two-step compaction process in which the pre-compression step was carried out at a lower compaction force than the main compression step. Tablets were made using the operating conditions identified in Table 28 below. Coffee 19B was prepared from Brazilian coffee beans, roasted and ground to a Hunter L-color of ~18.8, a bulk density of ~0.301 g/cm³, a mean particle size of ~878 microns, and a moisture content of ~4.8%, and was made into tablets in a single run (G), the tablets weighing about 2.65 grams each, using a Fette Model 2090 rotary tablet press set up to subject the tablets to a two-step compaction process in which the pre-compression step was carried out at a lower compaction force than the main compression step. Tablets were made using the operating conditions identified in Table 28 below. Samples of the tablets from each run were tested for hardness and friability, with average values for each of these properties shown in Table 28. Additionally, tablets of a competitive tabletted coffee product (H) were collected for testing, as identified in Table 28 below.

After compression, 10 tablets from each run (totaling approximately 26.5 g), equivalent amounts of the corresponding roasted and ground coffee, and 4 tablets (totaling approximately 28.7 g) of the competitive tabletted coffee product, were brewed with approximately 1420 g water in a Mr. Coffee® Accel (Model PRX 23) ADC coffee-maker having a water delivery rate of approximately 2.75 g/sec. To measure instantaneous brew characteristics at increments throughout the brew (or "brew dynamics"), the brew was collected at 20 second increments in separate, small containers. For each 20 second accumulation or sample of brew, mass, refractive index, and absorbance were measured, and amount of brew solids and yield were determined from the measured refractive index (as explained in greater detail above). The samples were then incrementally and chronologically combined to measure and calculate cumulative mass, refractive index, brew solids, and yield.

TABLE 28

Example 19, Set 1 - Results Obtained

| Code letter | Ktab/ hr | Pre-compression, kN | Main Compression, kN | Hardness, N | Friability, % | Density, g/cm³ |
|---|---|---|---|---|---|---|
| A | 80 | 3.6 | 45.1 | 42.2 | 10.2 | 0.903 |
| B | 70 | 4.8 | 47.5 | 53.1 | 6.7 | 0.922 |
| C | 70 | 17.2 | 45.2 | 63 | 0.9 | |
| D | 70 | 17.2 | 45.2 | 63 | 0.9 | |
| E | 70 | 29.3 | 51.8 | 71.5 | 1.5 | 1.012 |
| F | 80 | 38.8 | 51.4 | 64.6 | 1.7 | 0.983 |
| G | 70 | 17 | 45.6 | 55.7 | 1.1 | |
| H | | | | | | |

Figure 5:
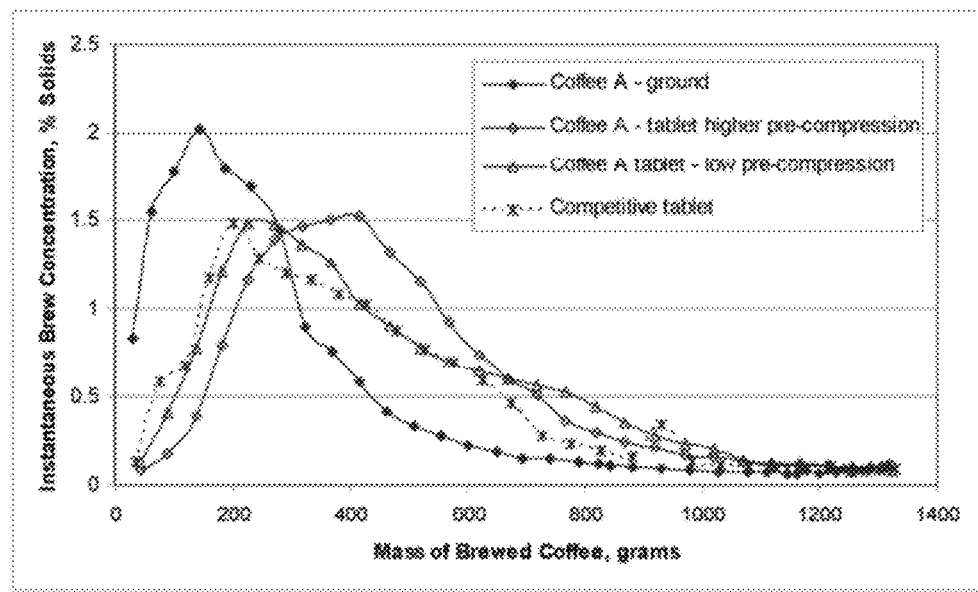
FIGS. 5 and 6 illustrate results obtained in the following working Example 19 in which inventive coffee tablets and their roasted and ground coffee counterpart have been brewed to measure extracted coffee solids and cumulative yields over the course of each brew, as compared to the brew characteristics of a competitive coffee tablet.

FIG. 5 graphically illustrates the average instantaneous coffee solids concentration over the course of the brew for the low pre-compression tablets (A and B) of Coffee 19A, the high pre-compression tablets (C, D, E, and F) of Coffee 19A, Coffee 19A in roast and ground form, and the competitor tablet H. As shown, the roast and ground coffees and the competitive coffee tablets exhibit higher instantaneous concentrations in an initial portion of the brews (i.e., the first 200-300 g of brew), while the inventive tabletted coffees exhibit higher instantaneous concentrations than their roast and ground counterparts and the competitive tabletted coffee subsequent to these initial portions, most substantially so in a mid-range portion of the brews (i.e., the 200-300 g of brew immediately following the initial 200-300 g of brew).

Figure 6:
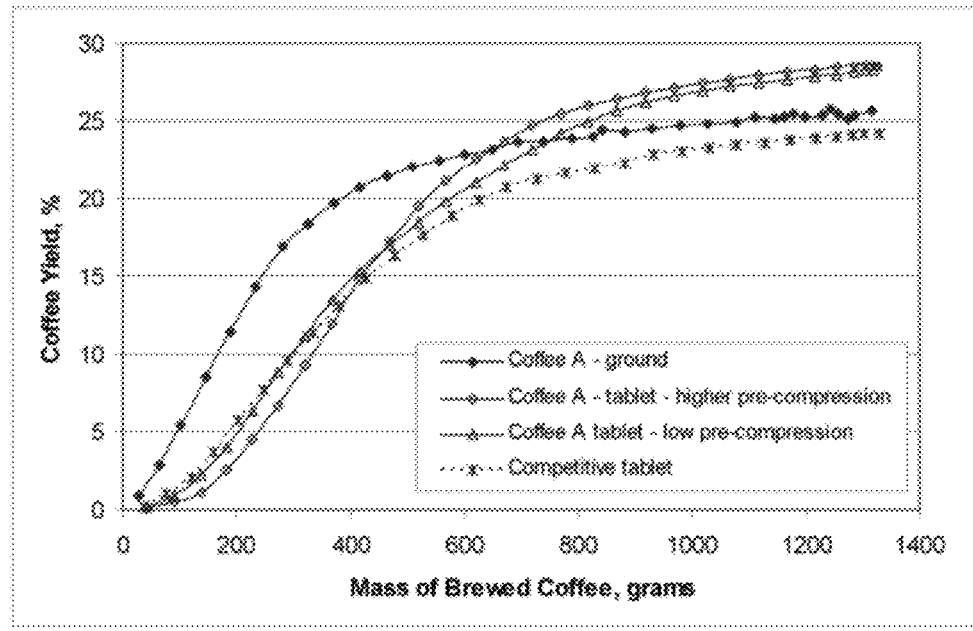

FIG. 6 graphically illustrates the average cumulative extracted coffee solids over the course of the brew for the low pre-compression tablets (A and B) of Coffee 19A, the high pre-compression tablets (C, D, E, and F) of Coffee 19A, Coffee 19A in roast and ground form, and the competitor tablet H. As shown, the tabletted coffees exhibited an initial lag in extraction, as compared to their roast and ground coffee counterparts, while exceeding the extraction of the roast and ground coffees after an intermediate point in the brew (i.e., about 550-850 g into the brew).

Figure 7:
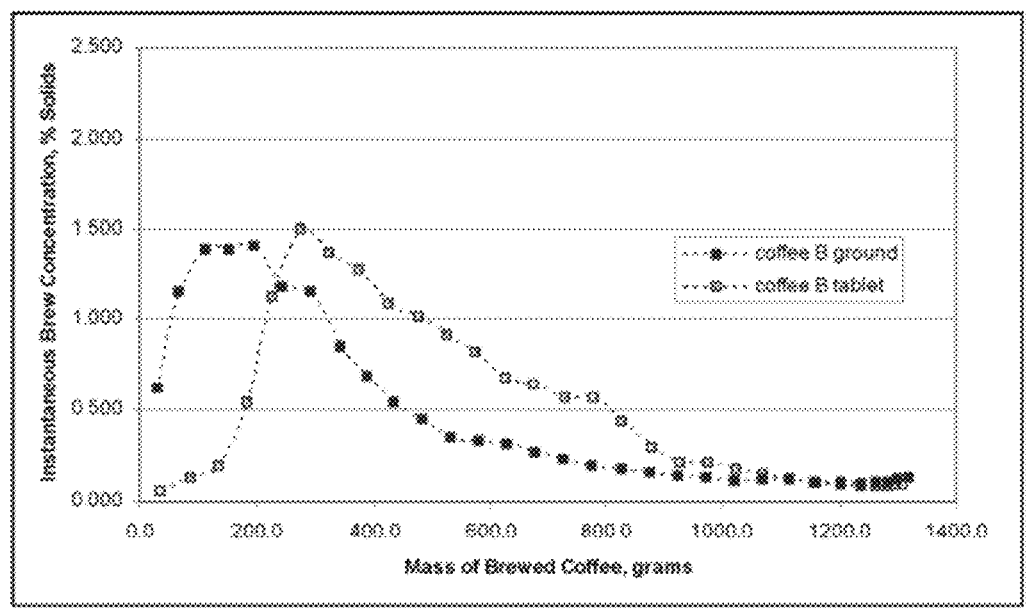
FIGS. 7 and 8 illustrate additional results obtained in the following working Example 19 in which other inventive coffee tablets and their roasted and ground coffee counterpart have been brewed to measure extracted coffee solids and cumulative yields over the course of each brew.
Figure 8:
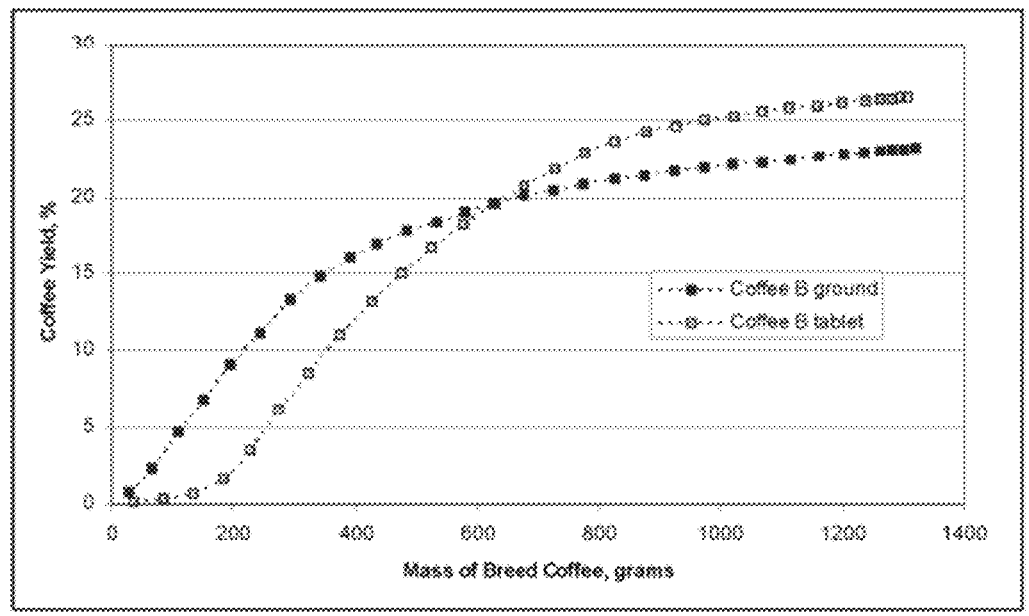

FIGS. 7 and 8 graphically illustrate the instantaneous coffee solids concentration and cumulative extracted coffee solids over the course of the brew for Coffee 19B in tabletted and roast and ground form, again showing higher initial instantaneous concentrations of coffee solids for the roast and ground coffee, and higher mid-range instantaneous concentrations of coffee solids for the tabletted coffee, as well as an initial lag in extraction for the tabletted coffee, as compared to the roast and ground coffee counterpart, with the tabletted coffee exceeding the extraction of the roast and ground coffees after an intermediate point in the brew (i.e., about 550-850 g into the brew).

Figure 9:
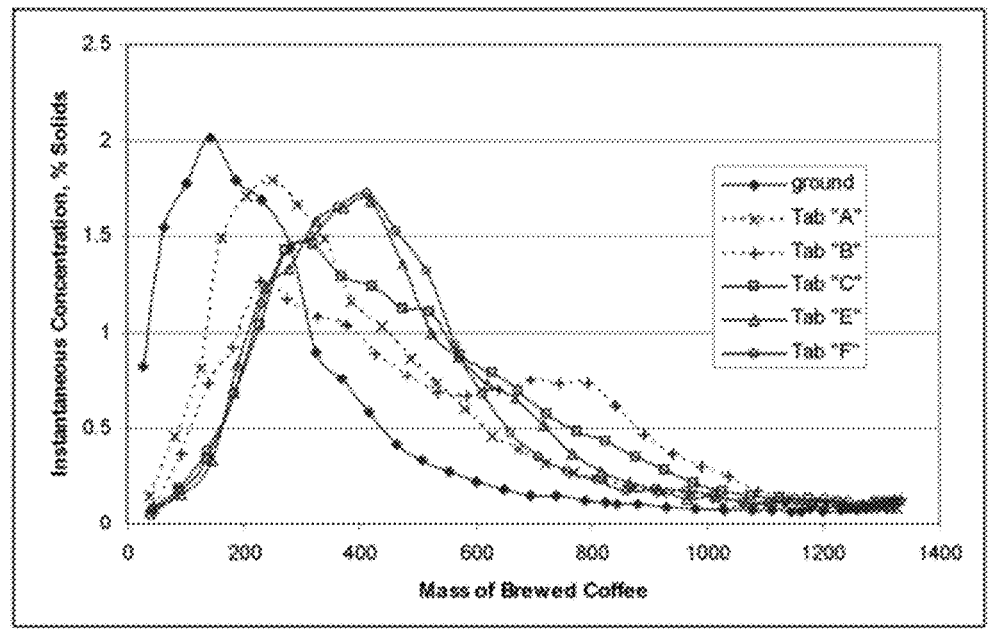
FIGS. 9 and 10 illustrate the results obtained in the following working Example 19 in which other inventive coffee tablets have been brewed to measure extracted coffee solids and cumulative yields over the course of each brew.
Figure 10:
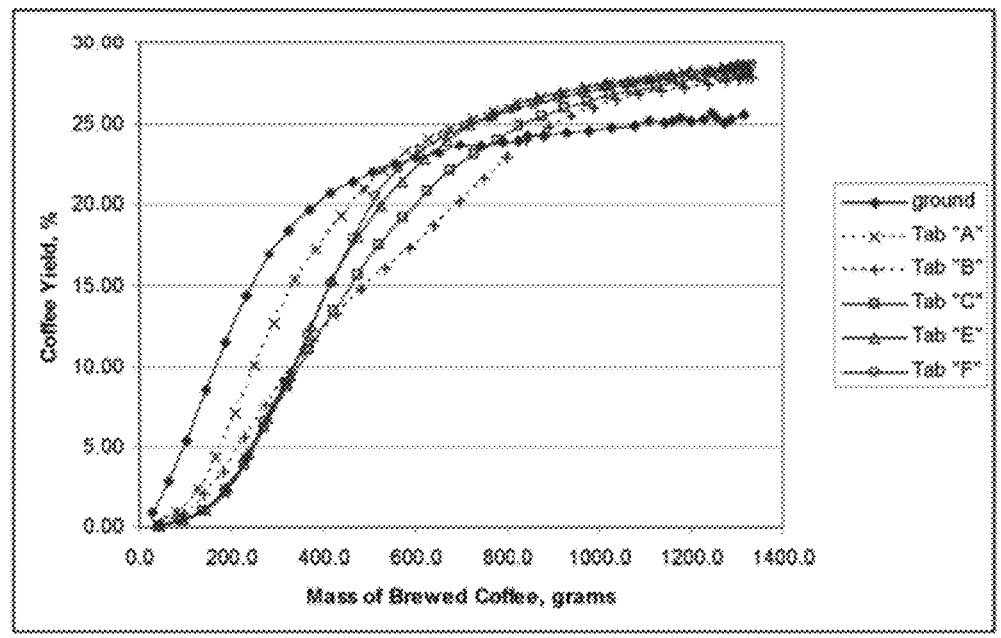

FIGS. 9 and 10 graphically show similar results in separately comparing five different runs of tablets produced from Coffee 19A as compared to their corresponding roast and ground coffee counterpart.

As an alternative measure of the initial and mid-range brew characteristics, 10 tablets from each run (totaling approximately 26.5 g), equivalent amounts of the corresponding roasted and ground coffee, and 4 tablets (totaling approximately 28.1 g) of the competitive tabletted coffee product, were again brewed with approximately 1420 g water in a Mr. Coffee® Accel (Model PRX 23) ADC coffee-maker. An initial approximately 250 g portion of each brew was collected and a subsequent 250 g ("mid-range") portion immediately following the initial portion was collected. For each of the initial and mid-range portions, refractive index and absorbance were measured, and amount of brew solids and yield were determined from the measured refractive index (as explained in greater detail above). The samples were then combined with the remainder of each total brew to measure and calculate mass, refractive index, brew solids, and yield for each total brew. As evident in Table 29 below, coffee brewed from the inventive coffee tablets produced with higher pre-compression force (i.e., greater than 30% of the main compression force) exhibited the lowest initial brew solids and absorbances and the highest mid-range brew solids and absorbances. Coffee brewed from the roasted and ground coffee samples exhibited the highest initial brew solids and absorbances and the lowest mid-range brew solids and absorbances. Coffee brewed from the inventive coffee tablets produced with lower pre-compression forces (8-10% of the main compression force) exhibited higher initial brew solids and absorbances and lower mid-range brew solids and absorbances that the coffee brewed from the higher pre-compression tablets. Coffee brewed from the competitive coffee tablets exhibited higher initial brew solids and absorbances and lower mid-range brew solids and absorbances that the coffee brewed from the lower pre-compression tablets.

TABLE 29

Example 19, Set 2 - Results Obtained

| | Product: | | | | | | | | |
|---|---|---|---|---|---|---|---|---|---|
| | R&G | R&G | tab | tab | tab | tab | tab | tab | tab |
| prior code: | for A-F | for G | H | "A" | "B" | "F" | "C" | "G" | "E" |
| Process Conditions | | | | | | | | | |
| rate ktab/hr | na | na | 80 | 70 | 80 | 70 | 70 | 70 | 70 |
| pre-compression | na | na | 3.6 | 4.8 | 38.8 | 17.2 | 17 | 29.3 | |
| main-compression | na | na | 45.1 | 47.5 | 51.4 | 45.2 | 45.6 | 51.8 | |
| Tablet Properties | | | | | | | | | |
| Hardness | na | na | 42.2 | 53.1 | 64.6 | 63.0 | 55.7 | 71.5 | |
| Friability | na | na | 10.2 | 6.7 | 1.7 | 0.9 | 1.1 | 1.5 | |
| Brewing | | | | | | | | | |
| Brewer | Mr. C | Mr. C | Mr. C | Mr. C | Mr. C | Mr. C | Mr. C | Mr. C | Mr. C |
| grams brew S1 (liquid): | 252.0 | 253 | 251 | 251.4 | 252.4 | 252 | 251.5 | 252 | 249.4 |
| grams brew S2 (liquid): | 250.2 | 249 | 251 | 251.4 | 249.7 | 251 | 250.4 | 250 | 252.6 |
| total: | 502.2 | 502.4 | 501.8 | 502.7 | 502.0 | 503.1 | 501.9 | 502.4 | 502.0 |
| ratio S1/S2 | 1.01 | 1.02 | 1.00 | 1.00 | 1.01 | 1.00 | 1.00 | 1.01 | 0.99 |
| absorbance S1 | 3.421 | 2.555 | 2.67 | 2.276 | 2.44 | 1.798 | 1.786 | 1.657 | 1.136 |
| absorbance S2 | 1.549 | 1.317 | 2.181 | 3.11 | 3.109 | 3.288 | 3.309 | 3.111 | 3.258 |
| grams solids S1 | 4.661 | 3.39 | 2.99 | 2.49 | 2.62 | 1.89 | 1.91 | 2.02 | 1.20 |
| grams solids S2 | 1.126 | 1.27 | 1.98 | 3.24 | 3.05 | 3.72 | 3.98 | 3.43 | 3.79 |
| Analysis S2/S1 ratio | | | | | | | | | |
| absorbance | 0.45 | 0.52 | 0.82 | 1.37 | 1.27 | 1.83 | 1.85 | 1.88 | 2.87 |
| solids extracted | 0.24 | 0.37 | 0.66 | 1.30 | 1.16 | 1.97 | 2.08 | 1.70 | 3.17 |
| S1/S2 ratio | | | | | | | | | |
| absorbance | 2.21 | 1.94 | 1.22 | 0.73 | 0.78 | 0.55 | 0.54 | 0.53 | 0.35 |
| solids extracted | 4.14 | 2.67 | 1.51 | 0.77 | 0.86 | 0.51 | 0.48 | 0.59 | 0.32 |
| S1/total (solids) | 0.707 | 0.577 | 0.452 | 0.343 | 0.354 | 0.261 | 0.256 | 0.302 | 0.165 |
| S2/total (solids) | 0.171 | 0.216 | 0.3 | 0.446 | 0.411 | 0.513 | 0.534 | 0.513 | 0.522 |

Example 20

Tablet Properties at High Production Rates

Coffee 20A was prepared from coffee beans including a mixture of washed arabicas, naturals, and robustas, roasted and ground to a Hunter L-color of ~15.6, a bulk density of ~0.285 g/cm$^3$, a mean particle size of ~690 microns, and a moisture content of ~4.8%. Coffee 20B was prepared from coffee beans including a blend of arabicas and robustas, roasted and ground to a Hunter L-color of ~16.8, a bulk density of ~0.33 g/cm$^3$, a mean particle size of ~806 microns, and a moisture content of ~5.2%. Coffee 20C was prepared from coffee beans including a mixture of arabicas, dried coffees, and robustas, roasted and ground to a Hunter L-color of ~16, a bulk density of ~0.288 g/cm$^3$, a mean particle size of ~760 microns, and a moisture content of 4.3%. Coffee 20D was prepared from Brazilian coffee beans, roasted and ground to a Hunter L-color of ~17.9, a bulk density of ~0.294 g/cm$^3$, a mean particle size of ~885 microns, and a moisture content of ~4.7%. Coffee 20E was prepared from Brazilian coffee beans, roasted and ground to a Hunter L-color of ~16.8, a bulk density of ~0.311 g/cm$^3$, a mean particle size of ~890 microns, and a moisture content of ~5.1%. Coffee 20F was prepared from coffee beans including a mixture of arabicas, dried coffees, and robustas, roasted and ground to a Hunter L-color of ~15, a bulk density of ~0.28 g/cm$^3$, a mean particle size of ~720 microns, and a moisture content of ~4.6%. Coffee 20G was prepared from Brazilian coffee beans, roasted and ground to a Hunter L-color of ~18.8, a bulk density of ~0.301 g/cm$^3$, a mean particle size of ~878 microns, and a moisture content of ~4.8% Coffee 20H was prepared from Brazilian coffee beans, roasted and ground to a Hunter L-color of ~18.8, a bulk density of ~0.305 g/cm$^3$, a mean particle size of ~878 microns, and a moisture content of ~5%. Coffee 20I was prepared from Brazilian coffee beans, roasted and ground to a Hunter L-color of ~18.8, a bulk density of ~0.301 g/cm$^3$, a mean particle size of ~878 microns, and a moisture content of ~4.8%. Coffee 20J was prepared from coffee beans including a mixture of dried and regular Brazilian coffees, roasted and ground to a Hunter L-color of ~18.8, a bulk density of ~0.329 g/cm$^3$, a mean particle size of ~878 microns, and a moisture content of ~4.6%. Coffee 20K was prepared from Brazilian coffee beans, roasted and ground to a Hunter L-color of ~18.8, a bulk density of ~0.316 g/cm$^3$, a mean particle size of ~868 microns, and a moisture content of ~4.6%. Each coffee was made into tablets in several runs, using a Fette Model 2090 rotary tablet press set up to subject the tablets to a two-step compaction process. The production runs used varying tablet masses, production rates/dwell times, and pre-compression and main compression forces. For a number of production runs, relatively high production rates (or low compression dwell times) were used. For production rates of 90,000 to 120,000 tabs per hour (9.7 ms-14 ms compression dwell time), tablets having relatively high hardness (greater than 40 N) and relatively low friability (less than 10) were produced, as shown in Table 30 below.

After compression, 10 tablets from each run (totaling approximately 26-27 g) were brewed with approximately 1420 g water in a Mr. Coffee® Accel (Model PRX 23) ADC coffee-maker. After brewing, the absorbance of the brew was measured, as described above, and the percent of solids extracted into the brew was measured by refractive index, which was then converted into total solids extracted and yield.

| Coffee Name | Run | Mass | Ktab/Hr | Dwell Time | Pre Comp | Main Comp | Pre/Main | Hard | Fri | Tablet Density | Refr Index | Brew Solid | Yield % | Abs. | Abs/Gram | Br Index | Yield Index | Abs Index |
|---|---|---|---|---|---|---|---|---|---|---|---|---|---|---|---|---|---|---|
| 20A | 19 | 2.70 | 120 | 10.5 | 20.6 | 41 | 0.50 | 52.5 | 2.6 | 1.029 | 1.33326 | 0.603 | 28.5 | 2.071 | 0.077 | | 1.10 | 1.06 |
| 20A | 18 | 2.64 | 120 | 10.5 | 20.5 | 31 | 0.66 | 46.9 | 6.1 | 0.976 | 1.33322 | 0.583 | 28.4 | 2.122 | 0.081 | | 1.10 | 1.09 |
| 20A | 20 | 2.68 | 120 | 10.5 | 30.8 | 40.2 | 0.77 | 52.6 | 7.6 | 1.034 | 1.33329 | 0.616 | 29.5 | 2.142 | 0.079 | | 1.14 | 1.10 |
| 20B | 4 | 2.97 | 90 | 14.0 | 40.8 | 50.1 | 0.81 | 63.0 | 8.3 | 1.011 | 1.33355 | 0.740 | 32.1 | 2.184 | 0.073 | | 1.26 | 1.12 |
| 20B | 16 | 3.03 | 120 | 10.5 | 30.2 | 40 | 0.76 | 50.8 | 8.6 | 0.952 | 1.33343 | 0.683 | 29.6 | 2.242 | 0.075 | | 1.16 | 1.15 |
| 20B | 17 | 3.00 | 120 | 10.5 | 30.1 | 45.5 | 0.66 | 54.1 | 7.1 | 0.968 | 1.33344 | 0.689 | 29.4 | 2.252 | 0.074 | | 1.15 | 1.16 |
| 20B | 2 | 2.96 | 90 | 14.0 | 19.9 | 50.8 | 0.39 | 56.1 | 4.2 | 0.979 | 1.33347 | 0.702 | 30.1 | 2.214 | 0.074 | | 1.18 | 1.14 |
| 20C | 5 | 2.66 | 90 | 14.0 | 40.0 | 55.8 | 0.72 | 56.1 | 5.7 | 0.990 | 1.33325 | 0.598 | 28.6 | 2.059 | 0.077 | | 1.12 | 1.10 |
| 20C | 2 | 2.64 | 90 | 14.0 | 20.1 | 50.9 | 0.39 | 55.5 | 2.6 | 0.977 | 1.33328 | 0.612 | 29.3 | 1.991 | 0.074 | | 1.15 | 1.06 |
| 20D | 16 | 2.62 | 130 | 9.7 | 26.5 | 46 | 0.58 | 41.5 | 8.1 | 0.953 | 1.33327 | 0.607 | 29.7 | 1.906 | 0.072 | | 1.22 | 1.17 |
| 20E | 4 | 2.67 | 90 | 14 | 30.7 | 49.6 | 0.62 | 56.3 | 4.7 | 0.993 | 1.33329 | 0.616 | 29.9 | 1.838 | 0.069 | | 1.23 | 1.09 |
| 20E | 1 | 2.65 | 90 | 14 | 29.9 | 40.4 | 0.74 | 52.7 | 4.2 | 0.983 | 1.33323 | 0.588 | 28.4 | 1.948 | 0.073 | | 1.17 | 1.16 |
| 20F | 1 | 2.45 | 90 | 14 | 40.2 | 50.2 | 0.8 | 40.8 | 6.6 | 0.984 | 1.3331 | 0.526 | 28.2 | 1.939 | 0.080 | | 1.11 | 1.17 |
| 20F | 8 | 2.40 | 90 | 14 | 19.9 | 49.9 | 0.4 | 47.1 | 2.0 | 0.973 | 1.33316 | 0.555 | 29.5 | 1.904 | 0.079 | | 1.17 | 1.15 |
| 20G | 17 | 2.65 | 90 | 13.9 | 20.2 | 34.8 | 0.6 | 55.0 | 0.7 | 0.918 | 1.33309 | 0.570 | 27.6 | 1.546 | 0.058 | 1.19 | 1.191 | 1.218 |
| 20G | 19 | 2.68 | 90 | 13.9 | 45.1 | 51.4 | 0.9 | 53.5 | 2.7 | 0.957 | 1.33308 | 0.565 | 27.6 | 1.580 | 0.060 | 1.18 | 1.193 | 1.245 |
| 20H | 4 | 2.65 | 90 | 13.9 | 24.9 | 35.4 | 0.7 | 51.6 | 3.1 | 0.922 | 1.33300 | 0.521 | 25.7 | 1.553 | 0.060 | 1.08 | 1.099 | 1.241 |
| 20H | 7 | 2.59 | 100 | 12.7 | 29.6 | 40.8 | 0.7 | 43.7 | 4.7 | 0.923 | 1.33304 | 0.543 | 26.5 | 1.530 | 0.057 | 1.13 | 1.132 | 1.223 |
| 20G | 18 | 2.67 | 90 | 13.9 | 20.4 | 44.2 | 0.5 | 54.3 | 1.5 | 0.932 | 1.33306 | 0.554 | 26.5 | 1.545 | 0.058 | 1.15 | 1.146 | 1.217 |
| 20I | 1 | 2.65 | 90 | 14.2 | 20.3 | 40.2 | 0.5 | 51.4 | 1.2 | | 1.33307 | 0.559 | 27.6 | 1.571 | 0.060 | 1.13 | 1.143 | 1.205 |
| 20J | 6 | 2.67 | 90 | 13.9 | 25.4 | 35 | 0.7 | 45.1 | 3.6 | | 1.33306 | 0.554 | 26.7 | 1.469 | 0.055 | 1.20 | 1.178 | 1.313 |
| 20K | 7 | 2.65 | 90 | 13.9 | 24.5 | 35.2 | 0.7 | 53.8 | 1.9 | | 1.33305 | 0.548 | 26.8 | 1.634 | 0.062 | 1.11 | 1.121 | 1.347 |

Although only a few embodiments of this invention have been described above, it should be appreciated that many modifications can be made without departing from the spirit and scope of the invention. All such modifications are intended to be included within the scope of this invention, which is to be limited only by the following claims.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement, composition, or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated. Also, the various features discussed above and claimed below may be considered to be separate building blocks which may provide utility in and of themselves. Thus, it is contemplated that inventive devices and arrangements may be designed based on the teachings herein using virtually any combination or permutation of any one or more of these separate features without necessarily some or all of the other features. Accordingly, it is contemplated that tabletted products and their methods of production and use may be claimed using virtually any combination or permutation of any one or more of these features.

The invention claimed is:

1. A process for producing a coffee tablet for use in an automatic drip coffee maker (ADC) comprising:
    subjecting ground roast coffee to a multi-step compaction process including a pre-compression step having a first compaction pressure, wherein the ground roast coffee is compressed at a first compaction pressure between 10.6 MPa and 63.6 MPa, and a subsequent main compression step having a second compaction pressure, wherein there is a delay period of between 80-900 milliseconds after the pre-compression step and before the subsequent main compression step and no pressure is applied to the ground roast coffee during the delay period, wherein the pre-compression step is carried out at a lower compaction force but in the same compaction die as the subsequent main compression step so as to form an unbroken coffee tablet prior to use, wherein the coffee tablet exhibits a hardness when dry of at least about 40 N (Newtons), a friability when dry of no greater than about 6%, and readily disintegrates when contacted with hot water during brewing in the ADC.

2. The process of claim 1, wherein ten of the tablets, unbroken, are brewable with 1420 ml of water in an ADC having a water delivery rate of approximately 2.5-3.1 g/sec a consumable coffee beverage having an absorbance per gram of >0.07.

3. The process of claim 1, wherein a compaction force of the pre-compression step is about 50% to about 75% of a compaction force of the subsequent main compression step.

4. The process of claim 1, wherein the tablet contains sufficient coffee solid to make only a standard serving of brewed coffee.

5. The process of claim 1, wherein the tablet comprises greater than 99% coffee.

6. The process of claim 1, wherein the tablet has a mass of about 1.9-3.5 g.

7. The process of claim 1, wherein ten of the tablets, unbroken, are brewable with 1420 ml of water in an ADC having a water delivery rate of approximately 2.5-3.1 g/sec a consumable coffee beverage having a brew solids level of from about 0.3% to about 1.3%.

8. The process of claim 1, wherein approximately 26-30 grams of the tablets, unbroken, are brewable with 1420 ml of water in an ADC having a water delivery rate of approximately 2.5-3.1 g/sec a consumable coffee beverage having an absorbance value of about 1.7-2.5.

9. The process of claim 1, wherein when approximately 26 to 30 g of coffee tablets are brewed in an ADC having a water delivery rate of approximately 2.5-3.1 g/sec using approximately 1420 g of water, the ratio of coffee solids extracted during an initial 250 g of brewed coffee to the coffee solids extracted during a subsequent 250 g of brewed coffee immediately following the initial 250 g of brewed coffee is approximately 0.30-0.55.

10. The process of claim 1, wherein the pre-compression has a compression dwell time <25 milliseconds, and wherein the subsequent main compression step has a compression dwell time <25 milliseconds.

11. The process of claim 1, wherein:
  a pressure of the first compaction pressure is about 50% to about 60% of a second compaction pressure of the subsequent main compression step, with the subsequent main compression step being carried out at the second compaction pressure of greater than about 84.8 MPa and less than about 169.7 MPa;
  the tablet exhibits a hardness of at least about 50 N, a friability of no greater than about 3.5%, and a density of greater than or equal to 0.95 g/cm$^3$;
  the tablet comprises greater than 99% coffee, is essentially free of a binder, and has a mass of about 1.9 g to about 3.5 g; and
  approximately 26-30 grams of the tablets, unbroken, are brewable with 1420 ml of water in an automatic drip coffee maker having a water delivery rate of approximately 2.5-3.1 g/sec a consumable coffee beverage having: (a) a brew solids level of from about 0.3% to about 1.3%; (b) a yield of at least about 26%; (c) a brew absorbance of at least about 1.6; and (d) a ratio of absorbance of an initial 250 g portion of brewed coffee to an absorbance of a subsequent 250 g portion of brewed coffee immediately following the initial 250 g portion of approximately 0.33-0.57.

12. The process of claim 1, wherein the coffee tablet has a strength to withstand aspects of manufacture, handling, packaging, and transport without breakage.

* * * * *